United States Patent
Shimpo et al.

(10) Patent No.: US 10,557,499 B2
(45) Date of Patent: Feb. 11, 2020

(54) THRUST ROLLER BEARING AND BEARING DEVICE

(71) Applicant: NSK LTD., Tokyo (JP)

(72) Inventors: Yuki Shimpo, Takasaki (JP); Shigenori Murata, Takasaki (JP); Satoshi Masuda, Takasaki (JP)

(73) Assignee: NSK LTD., Tokyo (JP)

( * ) Notice: Subject to any disclaimer, the term of this patent is extended or adjusted under 35 U.S.C. 154(b) by 31 days.

(21) Appl. No.: 15/578,983

(22) PCT Filed: Jun. 3, 2016

(86) PCT No.: PCT/JP2016/066699
§ 371 (c)(1),
(2) Date: Apr. 9, 2018

(87) PCT Pub. No.: WO2016/195107
PCT Pub. Date: Dec. 8, 2016

(65) Prior Publication Data
US 2018/0266483 A1    Sep. 20, 2018

(30) Foreign Application Priority Data

Jun. 3, 2015  (JP) .................................. 2015-113534
Jun. 3, 2015  (JP) .................................. 2015-113535

(51) Int. Cl.
*F16C 19/30*  (2006.01)
*F16C 33/62*  (2006.01)
(Continued)

(52) U.S. Cl.
CPC .......... *F16C 19/305* (2013.01); *F16C 27/066* (2013.01); *F16C 33/586* (2013.01);
(Continued)

(58) Field of Classification Search
CPC ...... F16C 19/30; F16C 19/305; F16C 19/525; F16C 27/066; F16C 33/586; F16C 33/588; F16C 33/60; F16C 33/62; F16C 35/077
(Continued)

(56) References Cited

U.S. PATENT DOCUMENTS 3,934,956 A    1/1976  Pitner
3,951,482 A    4/1976  Blaydon et al.
(Continued)

FOREIGN PATENT DOCUMENTS

CN    101228362 A    7/2008
CN    202851665 U    4/2013
(Continued)

OTHER PUBLICATIONS

Translation of Kuromatsu, JP 2001200854, obtained Dec. 11, 2018.*
(Continued)

*Primary Examiner* — James Pilkington
(74) *Attorney, Agent, or Firm* — Sughrue Mion, PLLC

(57) ABSTRACT

A thrust roller bearing includes: a plurality of rollers which are radially arranged; a retainer having a pocket which is formed in a circular ring shape as a whole and rollingly retains the plurality of rollers; and at least one raceway ring which is provided with a race surface on which the plurality of rollers roll. The raceway ring includes an iron raceway ring and a resin raceway ring having insulating properties, and the iron raceway ring and the resin raceway ring are integrally assembled by being engaged with each other. In addition, the raceway ring may include a resin raceway ring having insulating properties and a pair of iron raceway rings disposed on both front and back surfaces of the resin
(Continued)

raceway ring, and the pair of iron raceway rings and the resin raceway ring may be integrally assembled by being engaged with each other.

6 Claims, 58 Drawing Sheets

(51) Int. Cl.
    *F16C 33/58*     (2006.01)
    *F16C 27/06*     (2006.01)
    *F16C 33/60*     (2006.01)

(52) U.S. Cl.
    CPC .............. *F16C 33/60* (2013.01); *F16C 33/62* (2013.01); *F16C 19/30* (2013.01); *F16C 33/588* (2013.01); *F16C 2202/30* (2013.01); *F16C 2208/00* (2013.01); *F16C 2300/02* (2013.01)

(58) Field of Classification Search
    USPC .................................................. 384/611, 620
    See application file for complete search history.

(56) References Cited

U.S. PATENT DOCUMENTS

| | | | |
|---|---|---|---|
| 4,733,979 A * | 3/1988 | Tsuruki | F16C 19/30 384/620 |
| 4,883,374 A | 11/1989 | Rhoads et al. | |
| 5,110,223 A * | 5/1992 | Koch | F16C 19/30 384/620 |
| 5,967,674 A * | 10/1999 | Reubelt | F16C 19/30 384/620 |
| 2009/0304318 A1 | 12/2009 | Konno et al. | |

FOREIGN PATENT DOCUMENTS

| | | |
|---|---|---|
| FR | 2.222.895 A5 | 10/1974 |
| FR | 2 299 554 A1 | 8/1976 |
| FR | 2 496 790 A1 | 6/1982 |
| JP | 57-124123 A | 8/1982 |
| JP | 4-75224 U | 6/1992 |
| JP | 4-210124 A | 7/1992 |
| JP | 5-89953 U | 12/1993 |
| JP | 7-310748 A | 11/1995 |
| JP | 8-100818 A | 4/1996 |
| JP | 2001-200854 A | 7/2001 |
| WO | WO2013143807 * | 10/2013 |

OTHER PUBLICATIONS

Translation of wo2013143807 obtained Mar. 2, 2019.*
International Search Report dated Aug. 30, 2017, by the International Searching Authority in counterpart International Application No. PCT/JP2016/066699 (PCT/ISA/210).
Written Opinion dated Aug. 30, 2017, by the International Searching Authority in counterpart International Application No. PCT/JP2016/066699 (PCT/ISA/237).
Communication dated May 30, 2018 issued by the European Patent Office in counterpart European Patent Application No. 16803538.4.
Communication dated Jan. 3, 2019, issued by the State Intellectual Property Office of P.R. China in counterpart Chinese Application No. 201680045469.4.

* cited by examiner

THRUST ROLLER BEARING AND BEARING DEVICE

TECHNICAL FIELD

The present invention relates to a thrust roller bearing and a bearing device.

BACKGROUND ART

In order to prevent occurrence of electrolytic corrosion due to a leakage current flowing between a rolling element and a raceway ring of a bearing from a housing or a shaft in an anti-electrolytic corrosion rolling bearing according to the related art, a film having insulating properties (insulating film) is provided on at least one surface of a housing or shaft, to which an outer ring and an inner ring are fitted, to break current from the outside.

For example, an anti-electrolytic corrosion rolling bearing is disclosed in Patent Document 1 in which an insulating film is formed on at least one of an outer ring and an inner ring to exhibit an anti-electrolytic corrosion effect, the insulating film being formed of a resin composition containing a total of 30 to 50 wt % of a fiber material such as glass fiber and a filler having a thermal conductivity of 10 W/m·K or more and a specific resistance of $10^{10}$ Ω·cm or more.

RELATED ART REFERENCE

Patent Document

Patent Document 1: JP-A-7-310748

SUMMARY OF THE INVENTION

Problems to be Solved by the Invention

In order to prevent electrolytic corrosion in the thrust roller bearing, it is considered that a resin raceway ring having insulating properties is disposed in an iron raceway ring to break a current and thus electrolytic corrosion is prevented from occurring in a roller and a raceway surface of the iron raceway ring. However, the resin raceway ring has low abrasion resistance and seizure resistance due to its nature as compared with bearing steel or peripheral parts of the steel subjected to quenching treatment. Therefore, when a difference in rotation occurs in a region where the resin raceway ring is in contact with the iron raceway ring or between mating members such as a housing, there is a possibility that damage occurs due to mechanical factors or thermal factors typified by abrasion or seizure. When the abrasion of the resin raceway ring occurs, the axial dimension of the thrust roller bearing varies, which may adversely affect the bearing performance.

The present invention has been made in view of the above-described problems and an object thereof is to provide a thrust roller bearing and a bearing device in which the resin raceway ring and the iron raceway ring are locked to each other to suppress occurrence of a rotational difference between the resin raceway ring and the iron raceway ring, whereby abrasion of the resin raceway ring is prevented, the resin raceway ring breaks a current, and electrolytic corrosion can be prevented from occurring in the roller and the raceway surface of the iron raceway ring.

Means for Solving the Problems

The above-described object of the present invention is achieved by the following configurations.

(1) A thrust roller bearing including:
a plurality of rollers which are radially arranged;
a retainer having a pocket which is formed in a circular ring shape as a whole and rollingly retains the plurality of rollers; and
at least one raceway ring which is provided with a race surface on which the plurality of rollers roll, wherein
the raceway ring includes an iron raceway ring and a resin raceway ring having insulating properties, and the iron raceway ring and the resin raceway ring are integrally assembled by being engaged with each other.

(2) A thrust roller bearing including:
a plurality of rollers which are radially arranged;
a retainer having a pocket which is formed in a circular ring shape as a whole and rollingly retains the plurality of rollers; and
at least one raceway ring which is provided with a race surface on which the plurality of rollers roll, wherein
the raceway ring includes a resin raceway ring having insulating properties and a pair of iron raceway rings disposed on both front and back surfaces of the resin raceway ring, and the pair of iron raceway rings and the resin raceway ring are integrally assembled by being engaged with each other.

(3) A bearing device in which the raceway ring of the thrust roller bearing according to (1) or (2) is engaged with a mating member so as not to rotate relative to the mating member.

(4) A raceway ring for a thrust roller bearing provided with a race surface on which a plurality of rollers radially held in a retainer roll, wherein
the raceway ring includes an iron raceway ring and a resin raceway ring having insulating properties, and the iron raceway ring and the resin raceway ring are integrally assembled by being engaged with each other.

(5) A raceway ring for a thrust roller bearing provided with a race surface on which a plurality of rollers radially held in a retainer roll, wherein
the raceway ring includes a resin raceway ring having insulating properties and a pair of iron raceway rings disposed on both front and back surfaces of the resin raceway ring, and the pair of iron raceway rings and the resin raceway ring are integrally assembled by being engaged with each other.

Advantages of the Invention

According to the thrust roller bearing of the present invention, since the raceway ring includes the iron raceway ring and the resin raceway ring which are integrally engaged with each other, the rotation of the resin raceway ring relative to the iron raceway ring can be suppressed, and abrasion of the resin raceway ring can be prevented. In addition, electrolytic corrosion can be prevented from occurring in the roller and the iron raceway ring.

In the bearing device, since the thrust roller bearing is engaged with the mating member so as not to rotate relative to the mating member, occurrence of a difference in rotation of the resin raceway ring with respect to the mating member can be suppressed and abrasion can be prevented.

According to the raceway ring for the thrust roller bearing of the present invention, since the resin raceway ring and the iron raceway ring are integrally formed by being engaged with each other, the rotation of the resin raceway ring relative to the iron raceway ring can be suppressed and abrasion of the resin raceway ring can be prevented. In addition, electrolytic corrosion can be prevented from occurring in the roller and the iron raceway ring.

MODES FOR CARRYING OUT THE INVENTION

Figure 1:
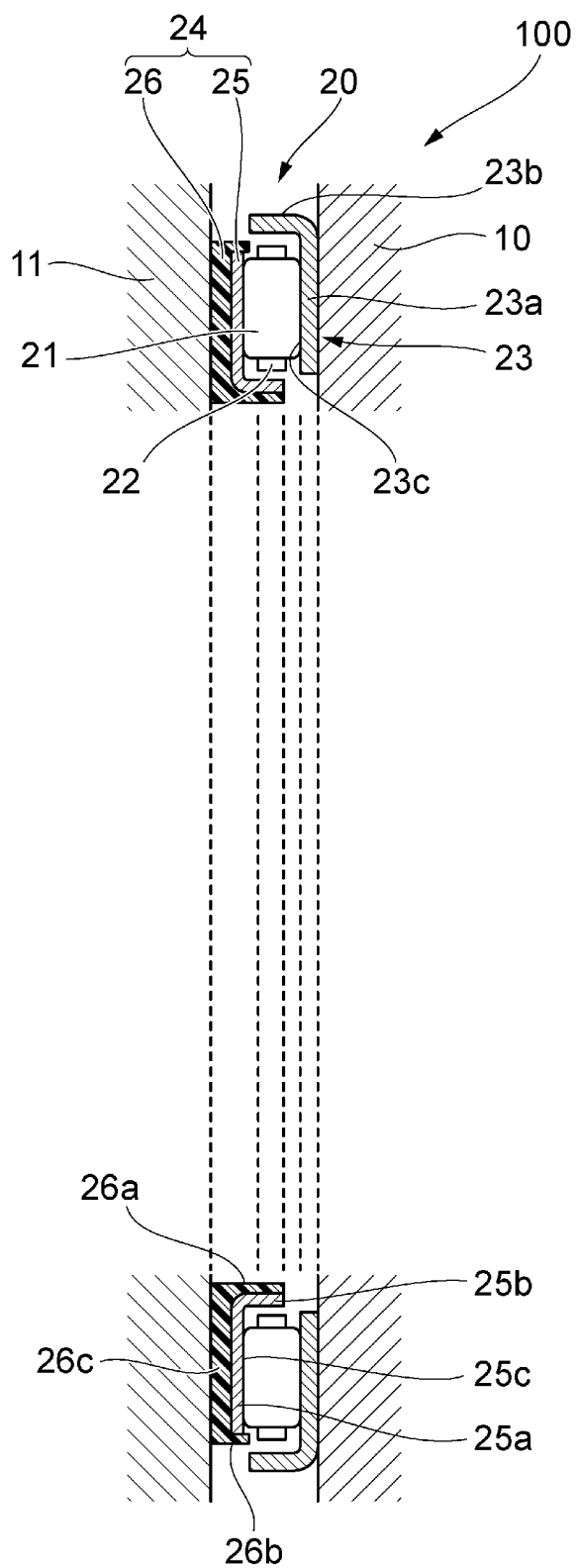
FIG. 1 is a cross-sectional view of a bearing device according to a first configuration example.

Preferred embodiments of a thrust roller bearing and a bearing device according to the present invention will be described below in detail with reference to the drawings. In the description of each configuration example, the same reference numerals are given to the same parts with respect to each constituent element, and illustration is omitted or redundant description is omitted or simplified.

First Configuration Example

FIG. 1 is a cross-sectional view of a bearing device 100 according to a first configuration example. The bearing device 100 includes mating members 10 and 11 such as a housing and a rotating shaft that rotate relative to each other, and a thrust roller bearing 20 that is mounted to be relatively rotatable while bearing a thrust load between the mating members 10 and 11.

The thrust roller bearing 20 includes a plurality of rollers 21 which is radially arranged, a retainer 22 having a pocket which is made in a circular ring shape as a whole and rollingly retains the plurality of rollers 21, and a first raceway ring 23 and a second raceway ring 24 which are bearing raceway rings for holding the plurality of rollers 21 in an axial direction. The first raceway ring 23 is formed by pressing a metal disk with a hole, and includes a circular ring-shaped annular plate portion 23a provided with a raceway surface 23c, on which the plurality of rollers 21 roll, and an outer cylindrical portion 23b in which an outer peripheral edge is bent toward the raceway surface 23c in an axial direction.

For the first raceway ring 23, steel obtained by subjecting case-hardening steel such as an SCM material to carbonitriding treatment or steel obtained by quenching SK85 (JIS G 4401) or the like which is carbon tool steel can be used.

Figure 2:
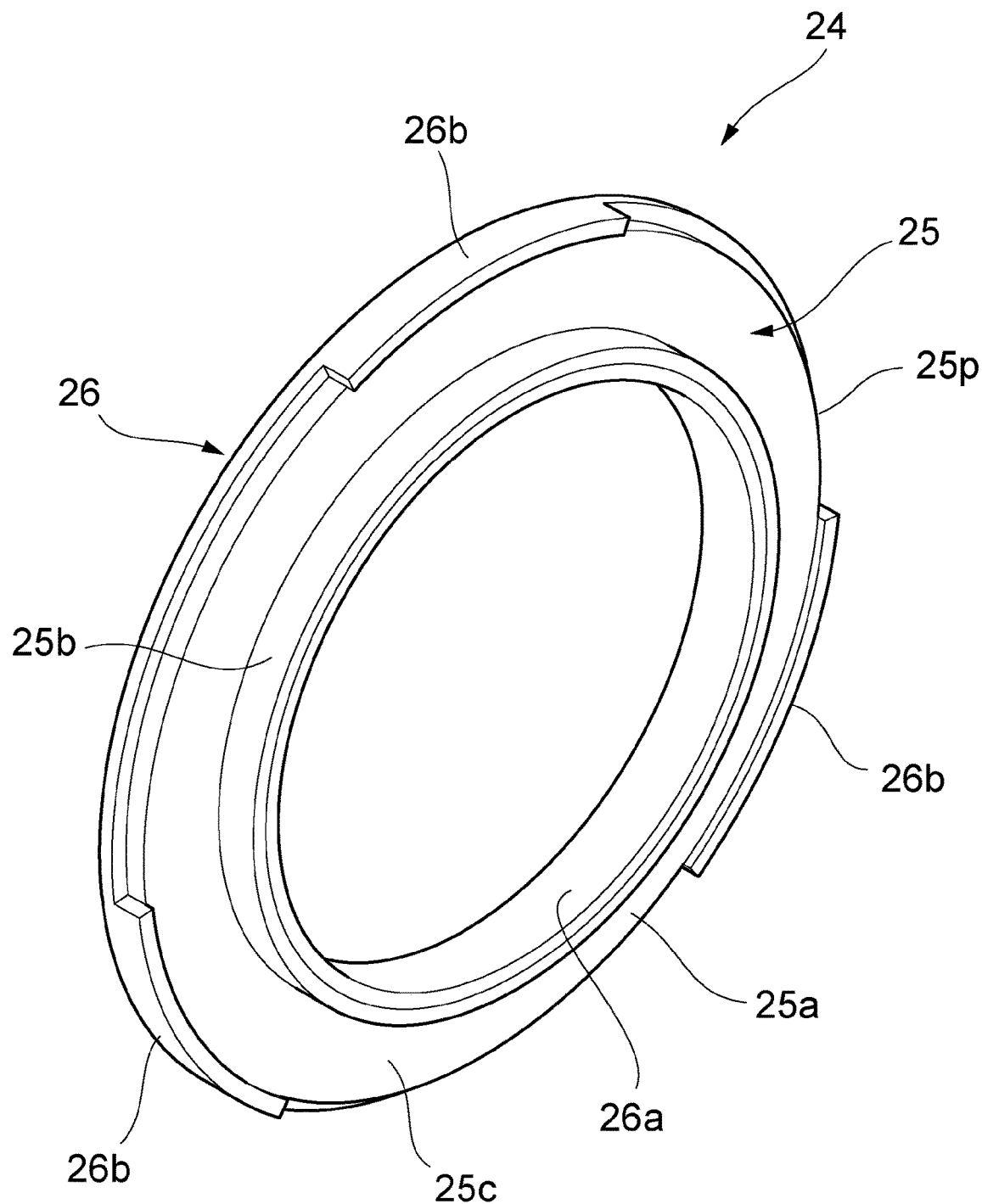
FIG. 2 is a perspective view of a second raceway ring of a thrust roller bearing illustrated in FIG. 1.
Figure 3:
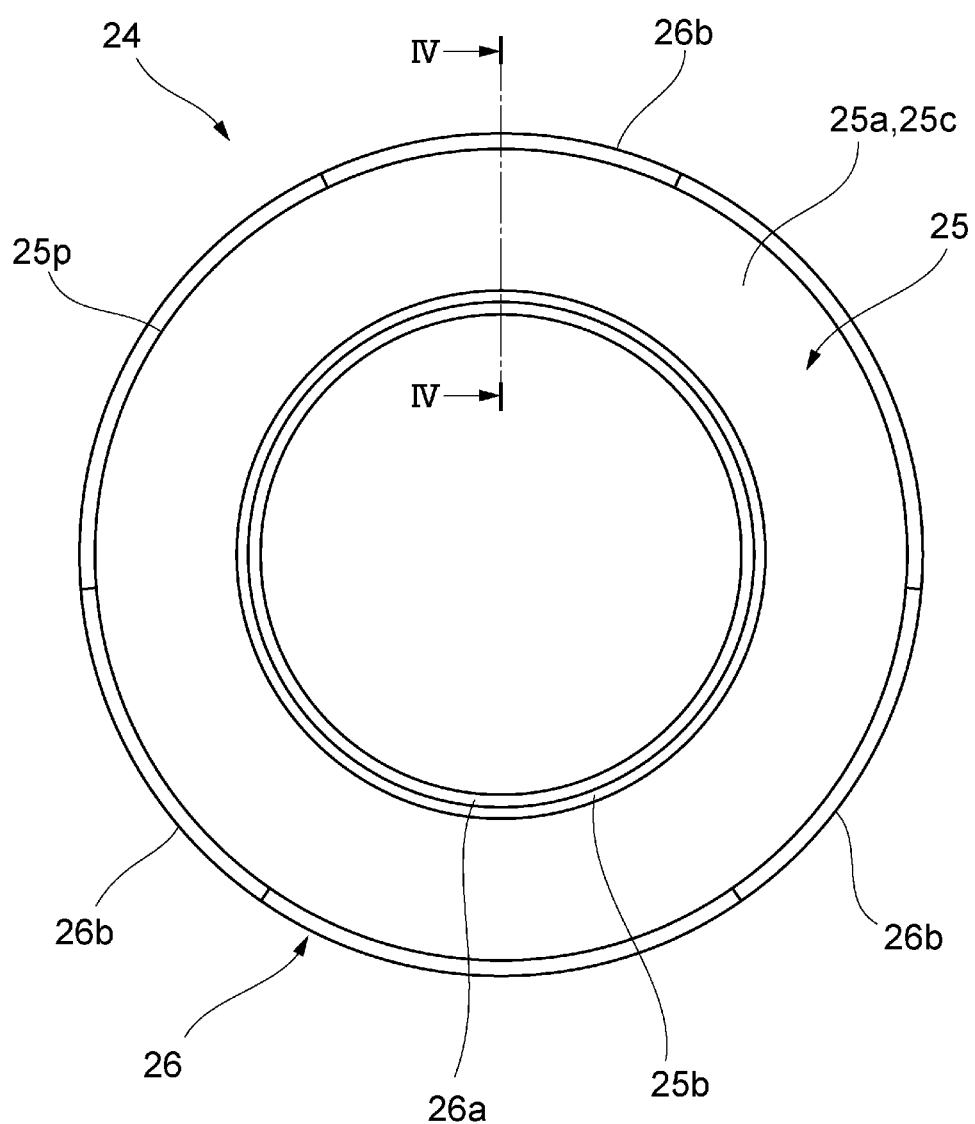
FIG. 3 is a front view of the second raceway ring illustrated in FIG. 2.
Figure 4:
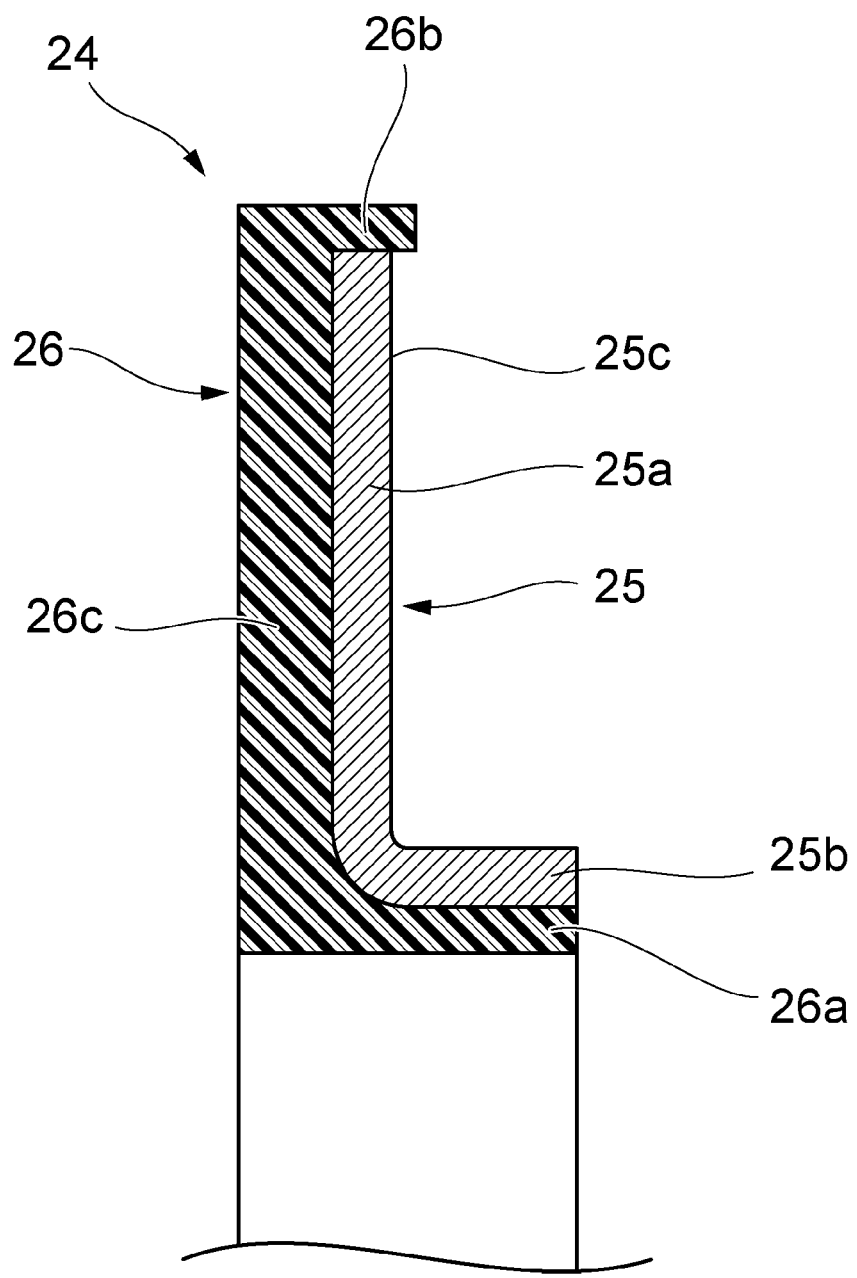
FIG. 4 is a cross-sectional view taken along line IV-IV illustrated in FIG. 3.

FIG. 2 is a perspective view of the second raceway ring 24 of the thrust roller bearing illustrated in FIG. 1, FIG. 3 is a front view of the raceway ring 24 illustrated in FIG. 2, and FIG. 4 is a cross-sectional view taken along line Iv-Iv illustrated in FIG. 3. As illustrated in FIGS. 2 to 4, the second raceway ring 24 is formed in which an iron raceway ring 25 and a resin raceway ring 26 are integrally assembled. The iron raceway ring 25 is formed by pressing a metal disk with a hole, and includes a circular ring-shaped annular plate portion 25a provided with a raceway surface 25c, on which a plurality of rollers 21 roll, and an inner cylindrical portion 25b in which an inner peripheral edge of a metal disk is bent toward the raceway surface 25c in an axial direction.

For the iron raceway ring 25, steel obtained by subjecting case-hardening steel such as an SCM material to carbonitriding treatment or steel obtained by quenching SK85 (JIS G 4401) or the like which is carbon tool steel can be used. The material of the iron raceway ring is also similar to that in other configuration examples.

The resin raceway ring 26 includes an annular plate portion 26c, an inner cylindrical portion 26a which is formed to extend from an inner peripheral edge of the annular plate portion 26c toward the raceway surface 25c in the axial direction and is externally fitted to the inner cylindrical portion 25b of the iron raceway ring 25 in a light interference fit manner, and locking claws 26b (see FIG. 2) which protrude from the outer peripheral edge of the annular plate portion 26c toward the raceway surface 25c in the axial direction and are formed at three positions with equal intervals in a circumferential direction. The locking claw 26b of the resin raceway ring 26 is locked to an outer peripheral edge 25p of the annular plate portion 25a of the iron raceway ring 25, so that the resin raceway ring 26 is assembled integrally with the iron raceway ring 25. The resin raceway ring 26 is formed of a resin insulating material typified by PPS (polyphenylene sulfide) resin, 6-6 nylon, or 4-6 nylon and has a minimum plate thickness t (see FIG. 4) of 0.1 mm or more in consideration of injection molding properties and insulating properties. Although depending on the size of the thrust roller bearing 20, the resin raceway ring 26 has a maximum plate thickness t of 1 mm to 5 mm, and the plate thickness of the resin raceway ring 26 is set within this thickness. The material and the plate thickness of the resin raceway ring are also similar to those in other configuration examples.

In this manner, the mating members 10 and 11 and the thrust roller bearing 20 are electrically insulated from each other by the resin raceway ring 26, which is made of an insulating resin material, disposed therebetween. Thus, electrolytic corrosion is prevented from occurring in the roller 21, the first raceway ring 23 made of an iron, and the iron raceway ring 25. In addition, the iron raceway ring 25 and the resin raceway ring 26 do not rotate relative to each other by integral assembling, and thus abrasion of the resin raceway ring 26 is prevented.

According to the thrust roller bearing 20 of this configuration, since the second raceway ring 24 is constituted with the iron raceway ring 25 and the resin raceway ring 26 which are integrally engaged with each other, the rotation of the resin raceway ring 26 relative to the iron raceway ring 25 can be suppressed and the abrasion of the resin raceway ring 26 can be prevented. Further, occurrence of electrolytic corrosion in the roller 21 and the iron raceway ring 25 can be prevented.

In the configuration example, the locking claws 26b are formed at three positions with equal intervals in the circumferential direction, but may be formed at two positions, four positions, or five or more positions. In addition, these locking claws may be disposed at irregular intervals. Instead of the locking claw 26b, a flange may be provided over the entire circumference.

Second Configuration Example

Figure 5:
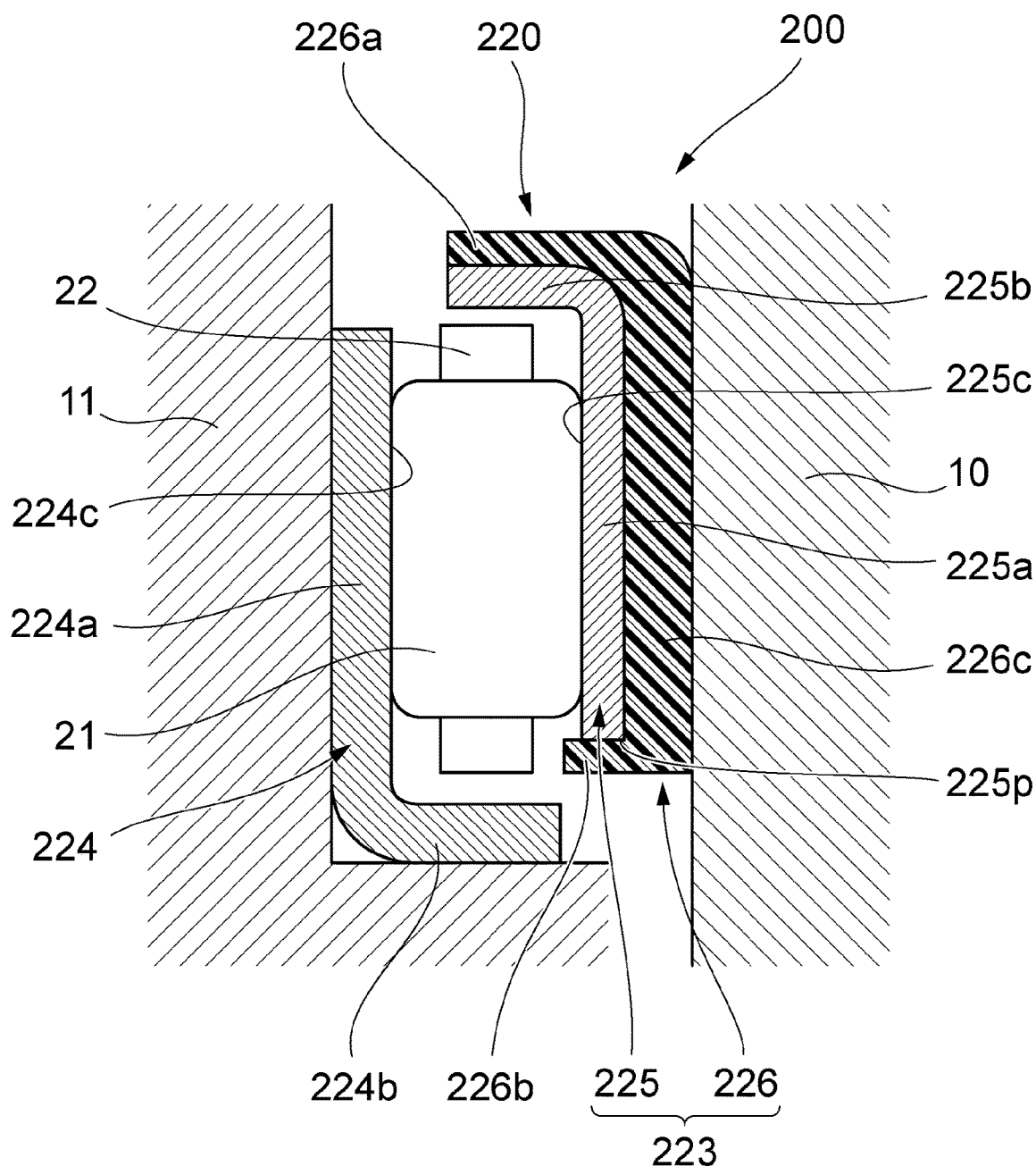
FIG. 5 is a cross-sectional view of a bearing device according to a second configuration example.

In the first configuration example, the second raceway ring is the insulating raceway ring, but the first raceway ring may be an insulating raceway ring. Such a bearing device 200 is illustrated in FIG. 5.

The bearing device 200 includes mating members 10 and 11 such as a housing and a rotating shaft that rotate relative to each other, and a thrust roller bearing 220 that is mounted to be relatively rotatable while bearing a thrust load between the mating members 10 and 11.

The thrust roller bearing 220 includes a plurality of rollers 21 which is radially arranged, a retainer 22 having a pocket which is made in a circular ring shape as a whole and rollingly retains the plurality of rollers 21, and a first raceway ring 223 and a second raceway ring 224 which hold the plurality of rollers 21 in an axial direction.

The second raceway ring 224 is formed by pressing a metal disk with a hole, and includes a circular ring-shaped annular plate portion 224a provided with a raceway surface 224c, on which the plurality of rollers 21 roll, and an inner cylindrical portion 224b in which an inner peripheral edge of a metal disk is bent toward the raceway surface in an axial direction. For the second raceway ring 224, steel obtained by subjecting case-hardening steel such as an SCM material to carbonitriding treatment or steel obtained by quenching SK85 (JIS G 4401) or the like which is carbon tool steel can be used.

The first raceway ring 223 is formed in which an iron raceway ring 225 and a resin raceway ring 226 are assembled integrally with each other. The iron raceway ring 225 is formed by pressing a metal disk with a hole, and includes a circular ring-shaped annular plate portion 225a provided with a raceway surface 225c, on which the plurality of rollers 21 roll, and an outer cylindrical portion 225b in which an outer peripheral edge of a metal disk is bent toward the raceway surface in the axial direction.

The resin raceway ring 226 includes an annular plate portion 226c, an outer cylindrical portion 226a which is formed to extend from an outer peripheral edge of the annular plate portion 226c toward the raceway surface in the axial direction and is externally fitted to the outer cylindrical portion 225b of the iron raceway ring 225 in a light interference fit manner, and locking claws 226b which protrude from the inner peripheral edge of the annular plate portion 226c toward the raceway surface 225c in the axial direction and are formed at three position with equal intervals in a circumferential direction. The locking claw 226b of the resin raceway ring 226 is locked to an inner peripheral edge 225p of the annular plate portion 225a of the iron raceway ring 225, so that the resin raceway ring 226 is assembled integrally with the iron raceway ring 225.

In the configuration example, the locking claws 226b are formed at three positions with equal intervals in the circumferential direction, but may be formed at two positions, four positions, or five or more positions. In addition, these locking claws may be disposed at irregular intervals. Instead of the locking claw 226b, a flange may be provided over the entire circumference.

Next, a modified example of the bearing device will be described.

Figure 6:
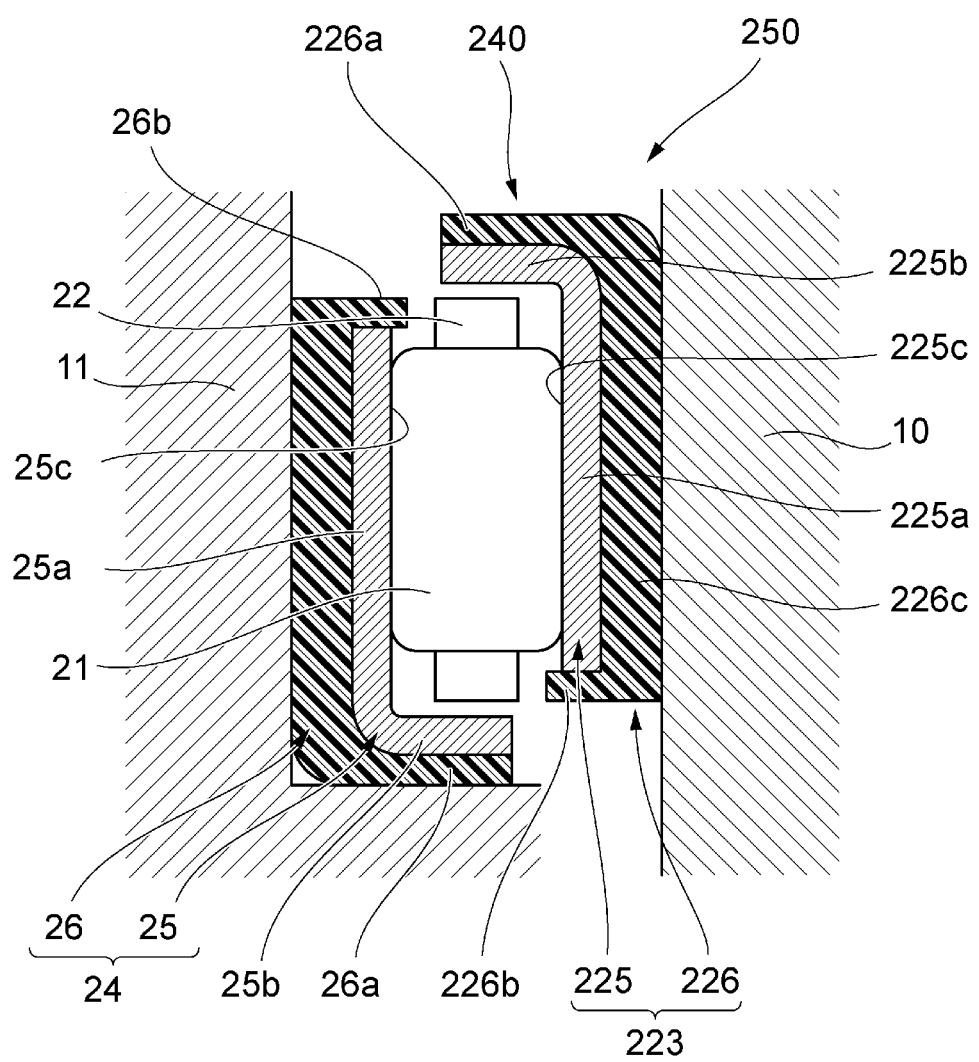
FIG. 6 is a cross-sectional view of a bearing device according to a modified example.

FIG. 6 is a cross-sectional view of a bearing device 250 according to a modified example of the first and second configuration examples.

The bearing device 250 according to the modified example includes mating members 10 and 11 that rotate relative to each other and a thrust roller bearing 240 that is mounted to be relatively rotatable while bearing a thrust load between the mating members 10 and 11.

The thrust roller bearing 240 includes a first raceway ring 223 similar to that of the second configuration example, a second raceway ring 24 similar to that of the first configuration example, a plurality of rollers 21, and a retainer 22.

According to this configuration, since a pair of resin raceway rings 226 and 26 are provided between the mating members 10 and 11, high insulating properties are exhibited, and occurrence of electrolytic corrosion in the iron raceway rings 225 and 25 is prevented even under a severe high voltage environment where dielectric breakdown is likely to occur.

In each configuration example described below, a resin raceway ring is provided in only one of the first raceway ring and the second raceway ring, but the resin raceway ring may be provided in both of the first raceway ring and the second raceway ring without being limited thereto. That is, as illustrated in FIG. 6, both of the first raceway ring and the second raceway ring may have a common configuration, and may include a resin raceway ring. In that case, it is possible to obtain the above-described insulating properties.

Third Configuration Example

A bearing device 300 according to a third configuration example will be described below.

Figure 7:
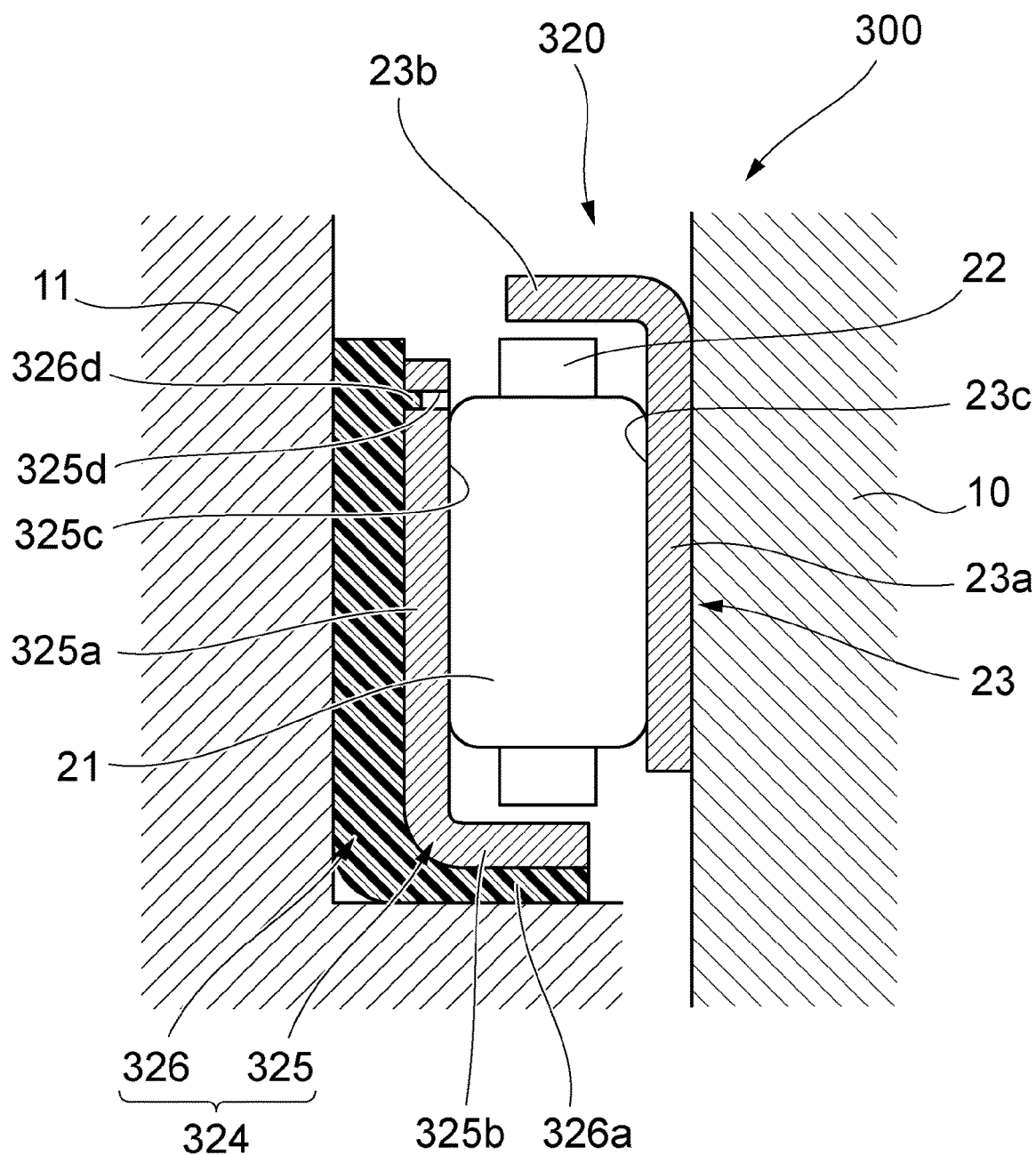
FIG. 7 is a cross-sectional view of a bearing device according to a third configuration example.

FIG. 7 is a cross-sectional view of a bearing device 300 according to a third configuration example. The bearing device 300 according to the third configuration example includes mating members 10 and 11 that rotate relative to each other and a thrust roller bearing 320 that is mounted to be relatively rotatable while bearing a thrust load between the mating members 10 and 11.

The thrust roller bearing 320 includes a plurality of rollers 21 which is radially arranged, a retainer 22 having a pocket which is made in a circular ring shape as a whole and rollingly retains the plurality of rollers 21, and a first raceway ring 323 and a second raceway ring 324 which hold the plurality of rollers 21 in an axial direction.

The second raceway ring 324 is formed in which an iron raceway ring 325 and a resin raceway ring 326 are integrally assembled.

Figure 8:
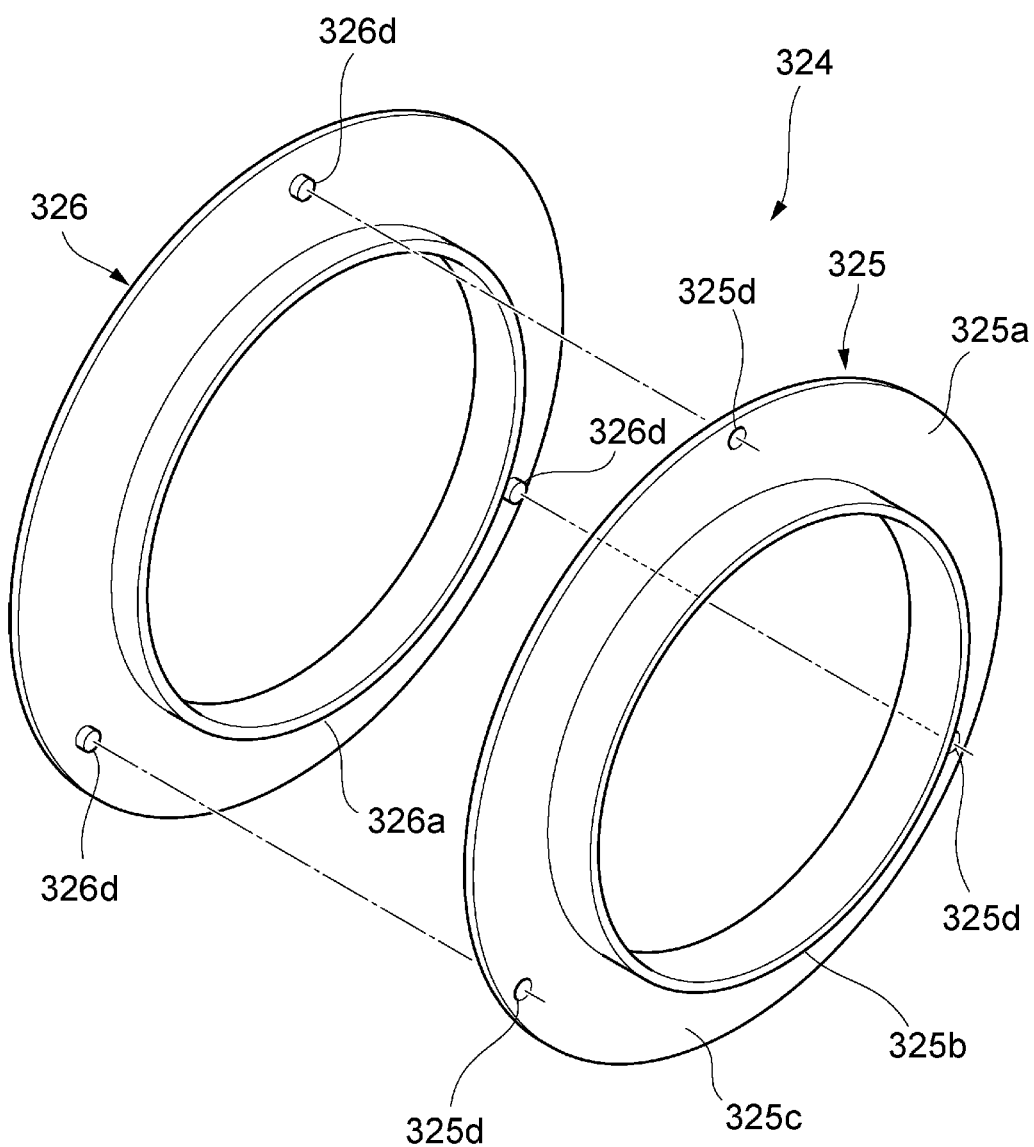
FIG. 8 is an exploded perspective view illustrating a state before a iron raceway ring and a resin raceway ring of a second raceway ring according to the third configuration example are engaged with each other.

FIG. 8 is an exploded perspective view illustrating a state before the iron raceway ring 325 and the resin raceway ring 326 of the second raceway ring 324 according to the third configuration example are engaged with each other.

The iron raceway ring 325 according to the configuration example is formed by pressing a metal disk with a hole, and includes a circular ring-shaped annular plate portion 325a provided with a raceway surface 325c, on which the plurality of rollers 21 roll, and an inner cylindrical portion 325b in which an inner peripheral edge of a metal disk is bent toward the raceway surface in an axial direction. Further, locking holes 325d are formed at three positions with equal intervals in the circumferential direction on an outer diameter side of the annular plate portion 325a.

The resin raceway ring 326 includes an annular plate portion 326c, an outer cylindrical portion 326a which is formed to extend from an inner peripheral edge of the annular plate portion 326c toward the raceway surface 325c in the axial direction and is externally fitted to the inner cylindrical portion 325b of the iron raceway ring 325 in a light interference fit manner, and pins 326d which protrude in the axial direction corresponding to the locking hole 325d at three positions on an outer diameter side of the annular plate portion 326c on the side of the raceway surface 325c.

The iron raceway ring 325 and the resin raceway ring 326 are overlapped with each other in a state where the pin 326d of the resin raceway ring 326 is fitted into the locking hole 325d of the iron raceway ring 325. Thus, the iron raceway ring 325 and the resin raceway ring 326 are integrally assembled.

Since the locking hole 325d of the iron raceway ring 325 and the pin 326d of the resin raceway ring 326 are provided radially outward of the region of the raceway surface 325c on which the roller 21 rolls, the rolling of the roller 21 is not inhibited. In addition, the locking hole 325d of the iron raceway ring 325 and the pin 326d of the resin raceway ring 326 can have an arbitrary shape without being limited to a circular shape illustrated in the drawing, but preferably have a similar shape in order to prevent abrasion, chipping, and cracking of projections. Further, the iron raceway ring 325 and the resin raceway ring 326 may be locked and non-separably coupled to each other in an interference fit manner.

In the configuration example, the locking holes 325d and the pins 326d are formed at three positions with equal intervals in the circumferential direction, but the number of the locking holes and the pins is not particularly limited. In addition, these locking holes and pins may be disposed at irregular intervals.

Fourth Configuration Example

A bearing device 400 according to a fourth configuration example will be described below.

Figure 9:
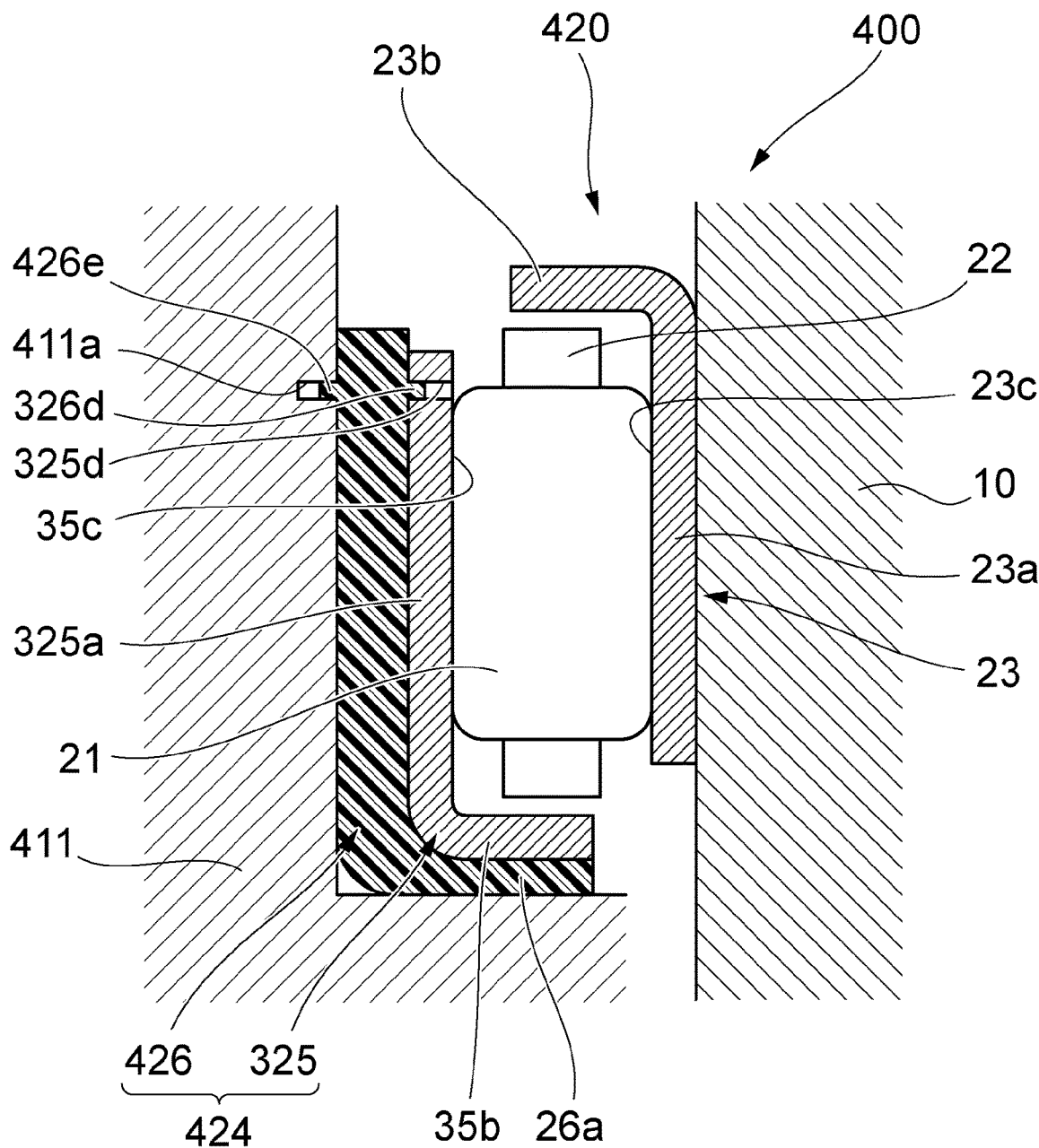
FIG. 9 is a cross-sectional view of a bearing device according to a fourth configuration example.

FIG. 9 is a cross-sectional view of the bearing device 400 according to the fourth configuration example. The bearing device 400 according to the fourth configuration example is similar to the bearing device 300 according to the third configuration example only except for a resin raceway ring 426 and a mating member 411 on which the resin raceway ring 426 is mounted.

The bearing device 400 includes mating members 10 and 411 such as a housing and a rotating shaft that rotate relative to each other, and a thrust roller bearing 420 that is mounted to be relatively rotatable while bearing a thrust load between the mating members 10 and 411.

The thrust roller bearing 420 includes a plurality of rollers 21 which is radially arranged, a retainer 22 having a pocket which is made in a circular ring shape as a whole and rollingly retains the plurality of rollers 21, and a first raceway ring 23 and a second raceway ring 424 which hold the plurality of rollers 21 in an axial direction.

Figure 10:
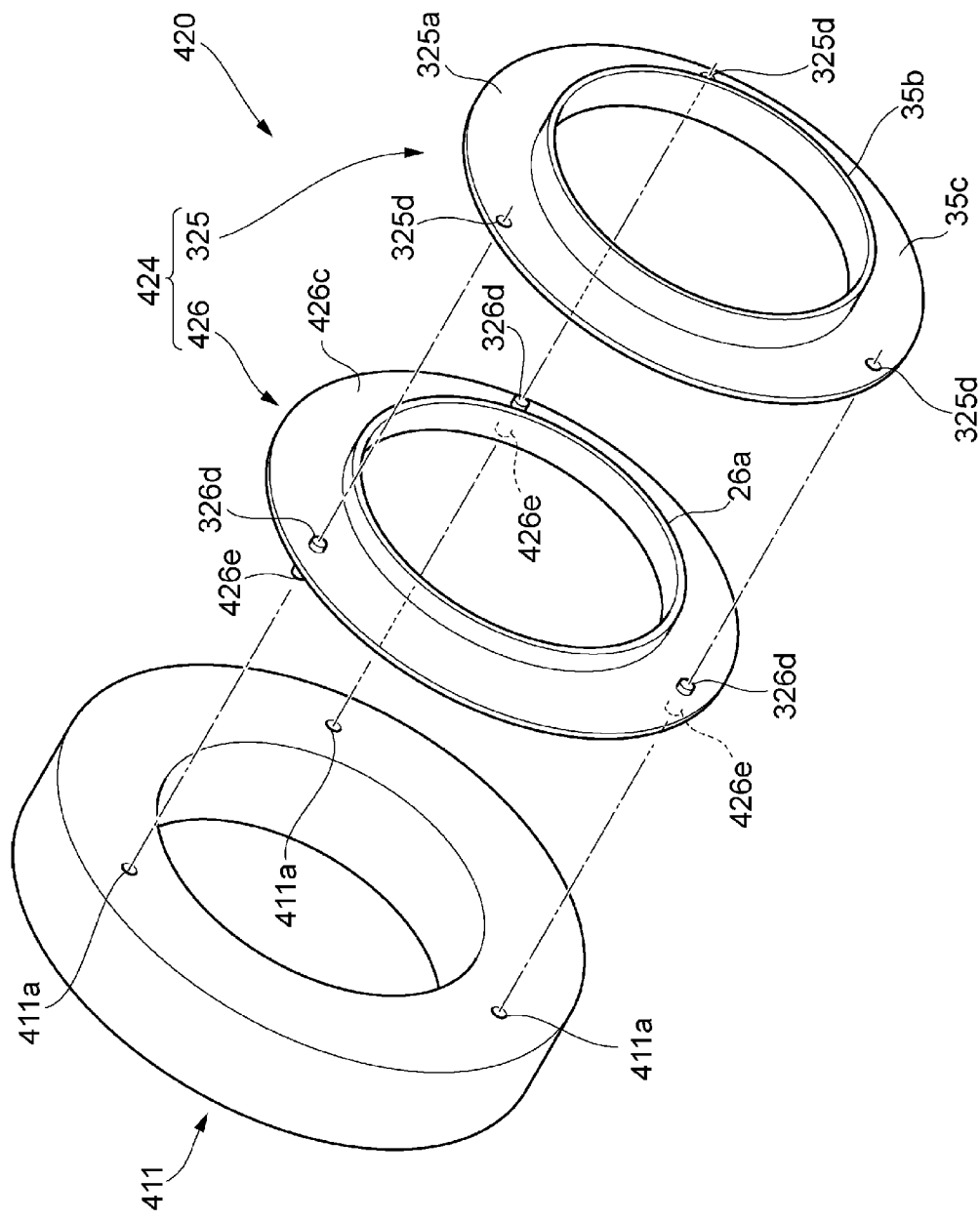
FIG. 10 is a perspective view illustrating a state in which a second raceway ring and a mating member illustrated in FIG. 9 are engaged with each other.

FIG. 10 is a perspective view illustrating an engaging state between the second raceway ring 424 and the mating member 411 illustrated in FIG. 9.

As illustrated in FIG. 10, three locking pins 426e are formed at equal intervals in the circumferential direction on the side opposite to the raceway surface of the resin raceway ring 426 to protrude in the axial direction. The mating member 411 is provided with a locking hole 411a corresponding to the locking pin 426e of the resin raceway ring 426. The locking pin 426e of the resin raceway ring 426 is integrally assembled and fitted into the locking hole 411a of the mating member 411.

The above-described pin 326d is formed on the raceway surface 246c of the resin raceway ring 426, and is fitted into the locking hole 325d of the iron raceway ring 325.

According to the bearing device 400 of the configuration example, since the second raceway ring 424 of the thrust roller bearing 420 is engaged with the mating member 411 so as not to rotate relative to each other, it is possible to obtain effects of suppressing a relative rotation of the resin raceway ring 426 with respect to the mating member 411 and preventing abrasion of the resin raceway ring 426, in addition to the effect described with respect to the thrust roller bearing 20 according to the first configuration example.

Fifth Configuration Example

Figure 11:
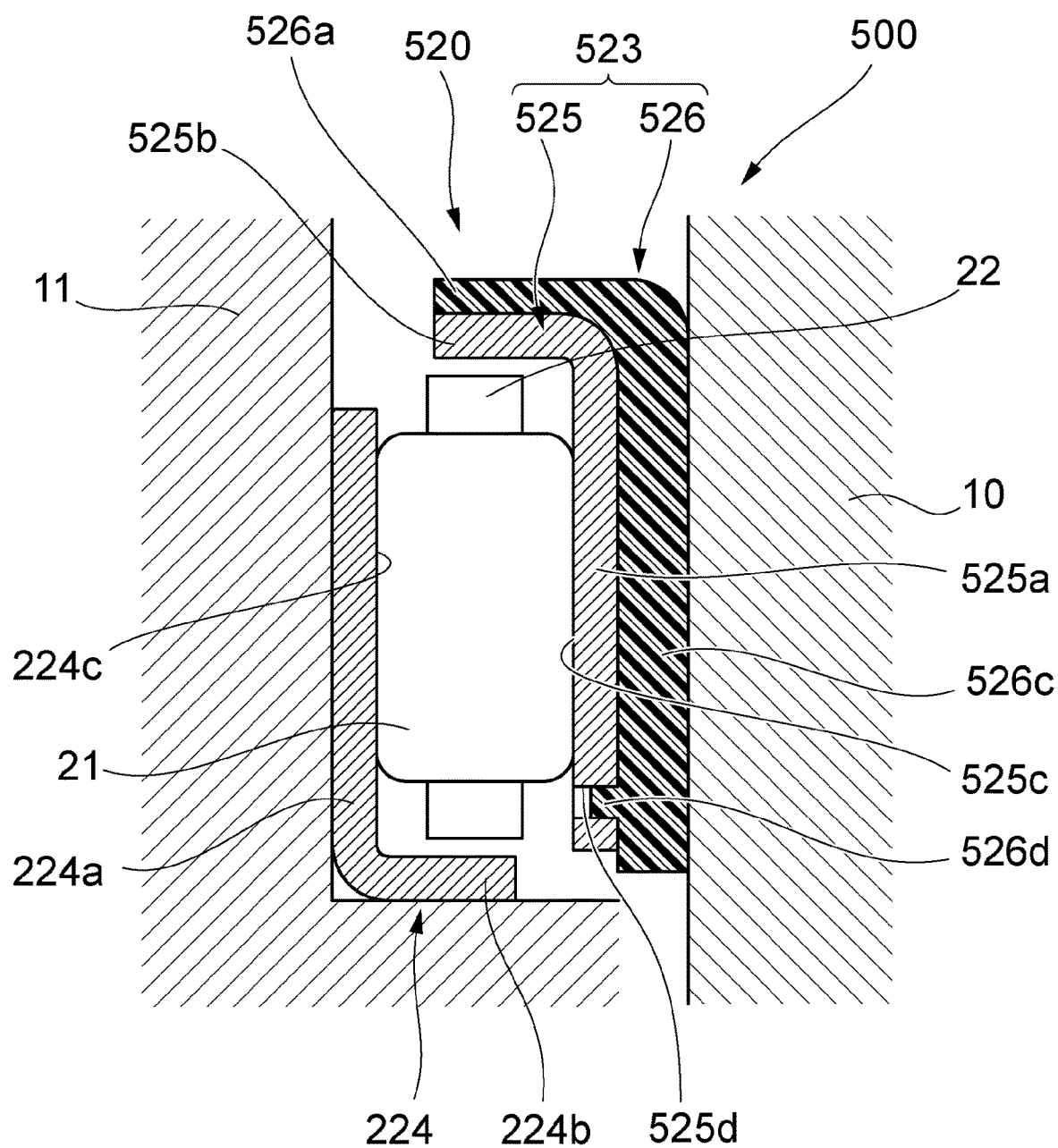
FIG. 11 is a cross-sectional view of a bearing device according to a fifth configuration example.

In the fourth configuration example, the second raceway ring is the insulating raceway ring, but the first raceway ring may be an insulating raceway ring. Such a bearing device 500 is illustrated in FIG. 11.

The bearing device 500 includes mating members 10 and 11 such as a housing and a rotating shaft that rotate relative to each other, and a thrust roller bearing 520 that is mounted to be relatively rotatable while bearing a thrust load between the mating members 10 and 11.

The thrust roller bearing 520 includes a plurality of rollers 21 which is radially arranged, a retainer 22 having a pocket which is made in a circular ring shape as a whole and rollingly retains the plurality of rollers 21, and a first raceway ring 523 and a second raceway ring 524 which hold the plurality of rollers 21 in an axial direction.

The first raceway ring 523 is formed in which an iron raceway ring 525 and a resin raceway ring 526 are assembled integrally with each other. The iron raceway ring 525 is formed by pressing a metal disk with a hole, and includes a circular ring-shaped annular plate portion 525a provided with a raceway surface 525c, on which the plurality of rollers 21 roll, and an outer cylindrical portion 525b in which an outer peripheral edge of a metal disk is bent toward the raceway surface 525c in the axial direction. Further, locking holes 525d are formed at three positions on an inner diameter side of the annular plate portion 525a with equal intervals in the circumferential direction.

The resin raceway ring 526 includes an annular plate portion 526c, an outer cylindrical portion 526a which is formed to extend from an outer peripheral edge of the annular plate portion 526c toward the raceway surface 525c in the axial direction and is externally fitted to the outer cylindrical portion 525b of the iron raceway ring 525 in a light interference fit manner, and pins 526d which protrude in the axial direction corresponding to the locking hole 525d at three positions on an inner diameter side of the annular plate portion 526c on the side of the raceway surface 525c. The iron raceway ring 525 and the resin raceway ring 526 are overlapped with each other in a state where the pin 526d of the resin raceway ring 526 is fitted into the locking hole 525d of the iron raceway ring 525. Thus, the iron raceway ring 525 and the resin raceway ring 526 are integrally assembled.

Since the locking hole 525d of the iron raceway ring 525 and the pin 526d of the resin raceway ring 526 are provided radially inward of the region of the raceway surface 225c on which the roller 21 rolls, the rolling of the roller 21 is not inhibited. In addition, the locking hole 525d of the iron raceway ring 525 and the pin 526d of the resin raceway ring 526 can have an arbitrary shape without being limited to a circular shape illustrated in the drawing, but preferably have a similar shape in order to prevent abrasion, chipping, and cracking of projections. Further, the iron raceway ring 525 and the resin raceway ring 526 may be locked and non-separably coupled to each other in an interference fit manner.

In the configuration example, the locking holes 525d and the pins 526d are formed at three positions with equal intervals in the circumferential direction, but the number of the locking holes and the pins is not particularly limited. In addition, these locking holes and pins may be disposed at irregular intervals.

Sixth Configuration Example

A bearing device 600 according to a sixth configuration example will be described below.

Figure 12:
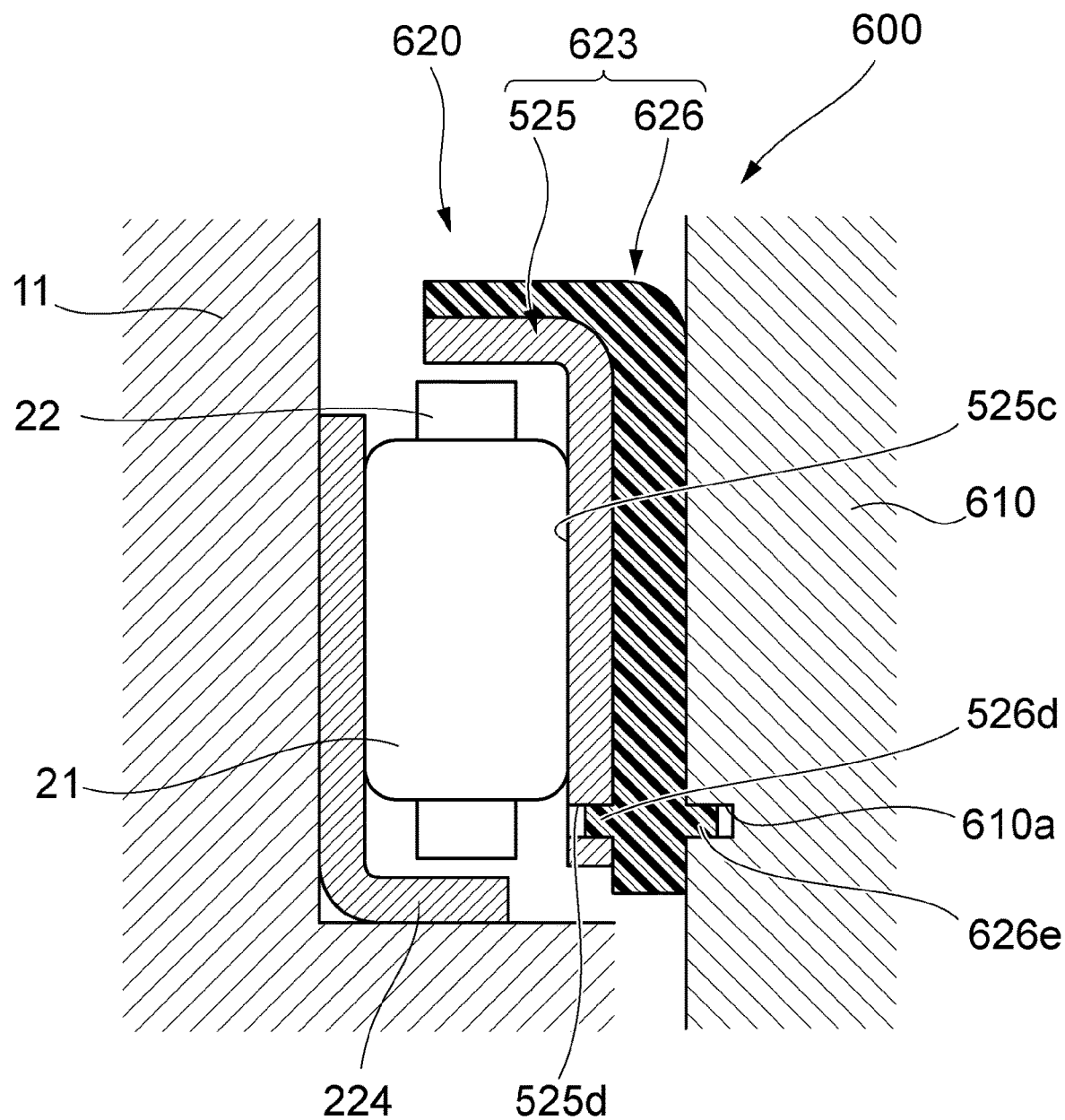
FIG. 12 is a cross-sectional view of a bearing device according to a sixth configuration example.

FIG. 12 is a cross-sectional view of the bearing device 400 according to the sixth configuration example.

The bearing device 600 according to the sixth configuration example is similar to the bearing device 500 according to the fifth configuration example only except for a resin raceway ring 626 and a mating member 610 on which the resin raceway ring 626 is mounted.

The bearing device 600 includes mating members 610 and 11 such as a housing and a rotating shaft that rotate relative to each other, and a thrust roller bearing 620 that is mounted to be relatively rotatable while bearing a thrust load between the mating members 610 and 11.

The thrust roller bearing 620 includes a plurality of rollers 21 which is radially arranged, a retainer 22 having a pocket which is made in a circular ring shape as a whole and rollingly retains the plurality of rollers 21, and a first raceway ring 63 and a second raceway ring 224 which hold the plurality of rollers 21 in an axial direction.

Three locking pins 626e are formed at equal intervals in the circumferential direction on the inner diameter side opposite to the raceway surface of the resin raceway ring 626 to protrude in the axial direction. The mating member 610 is provided with a locking hole 611a corresponding to the locking pin 626e of the resin raceway ring 626. The locking pin 626e of the resin raceway ring 626 is integrally assembled and fitted into the locking hole 610a of the mating member 610. Other configurations are the same as those in the fifth configuration example.

According to the bearing device 600 of the configuration example, since the first raceway ring 623 of the thrust roller bearing 620 is engaged with the mating member 610 so as not to rotate relative to each other, it is possible to obtain effects of suppressing a relative rotation of the resin raceway ring 626 with respect to the mating member 610 and preventing abrasion of the resin raceway ring 626, in addition to the effect described with respect to the thrust roller bearing 20 according to the first configuration example.

Seventh Configuration Example

A bearing device 700 according to a seventh configuration example will be described below.

Figure 13:
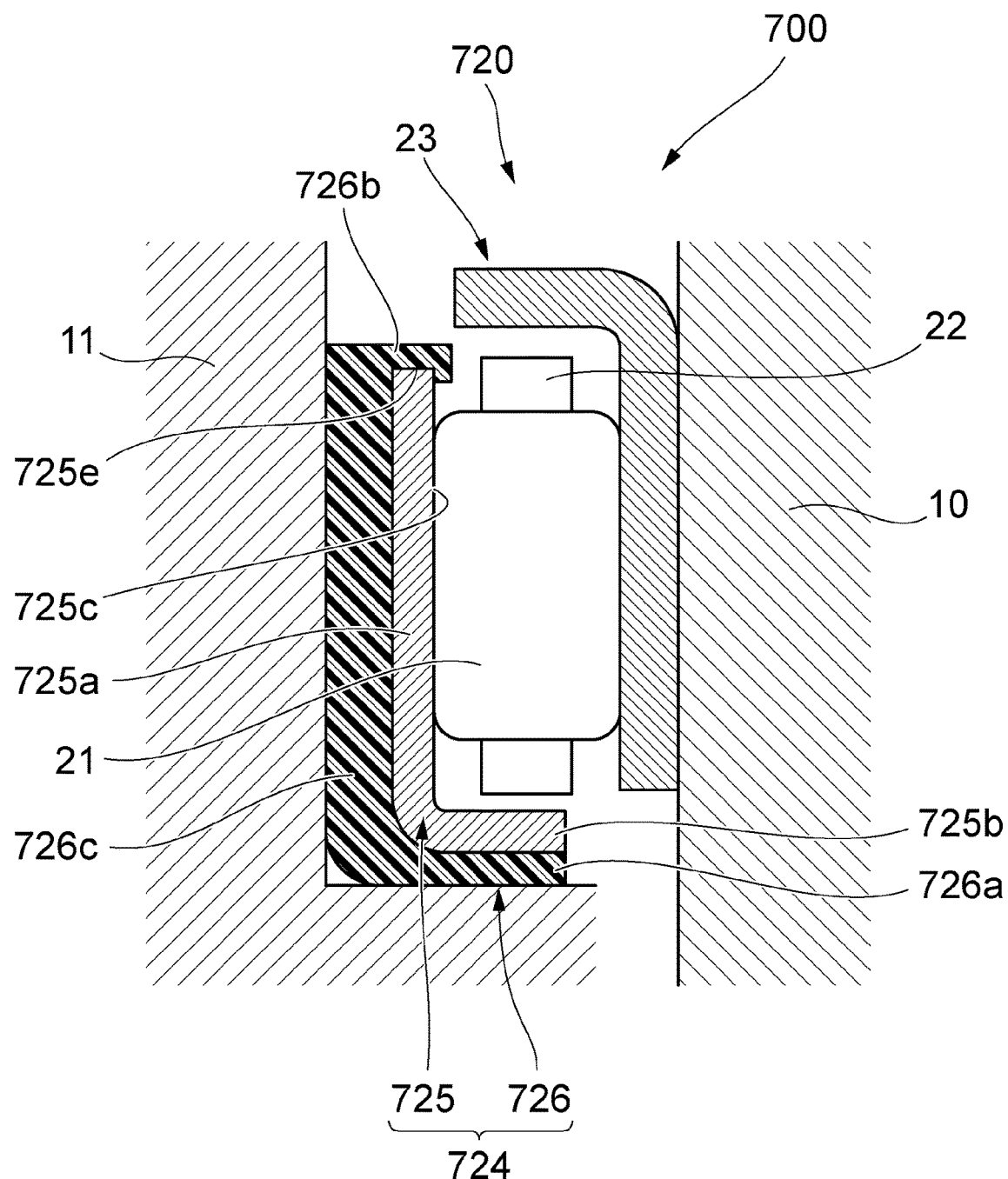
FIG. 13 is a cross-sectional view of a bearing device according to a seventh configuration example.
Figure 14:
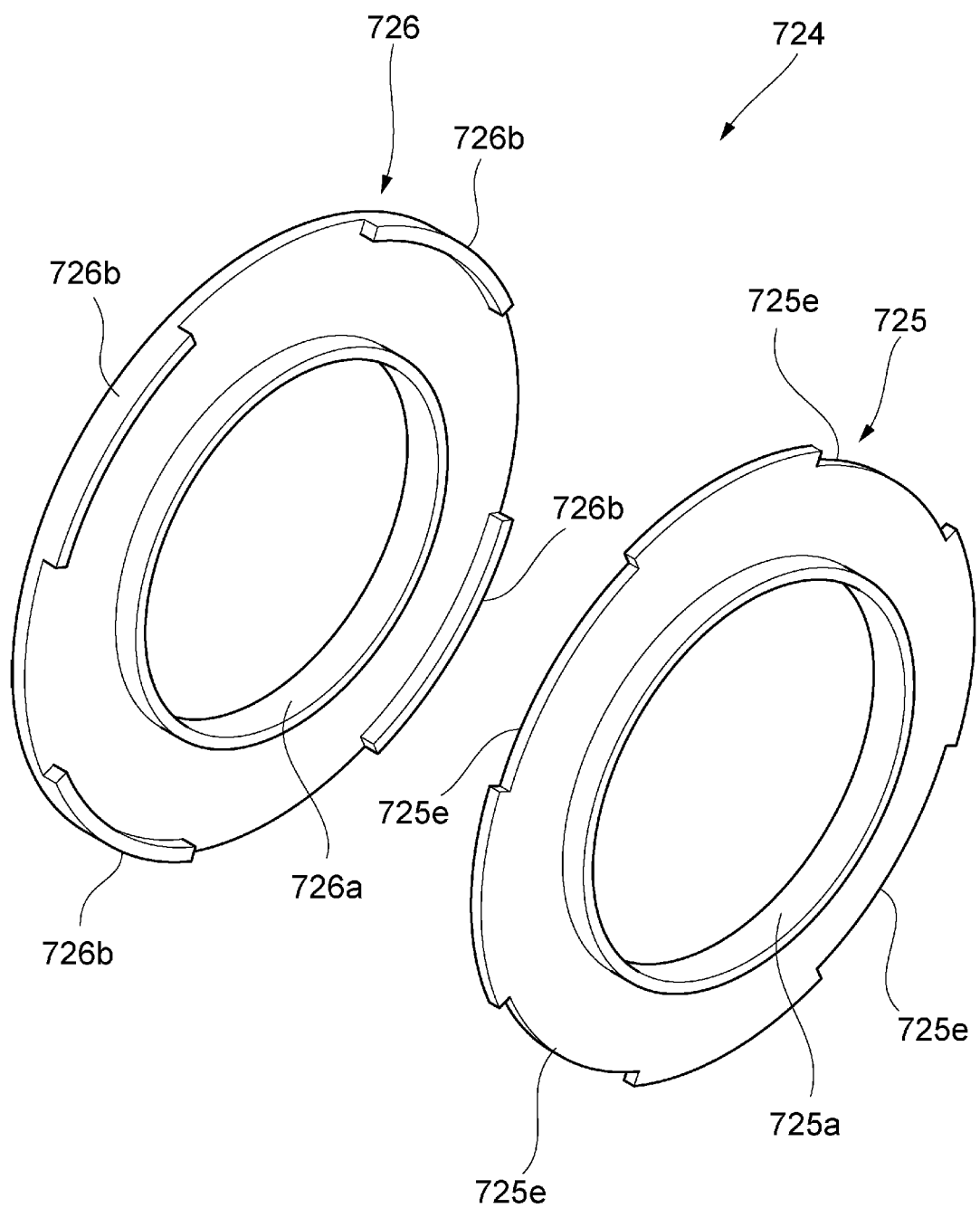
FIG. 14 is an exploded perspective view illustrating a state before a iron raceway ring and a resin raceway ring of a second raceway ring according to the seventh configuration example are engaged with each other.
Figure 15:
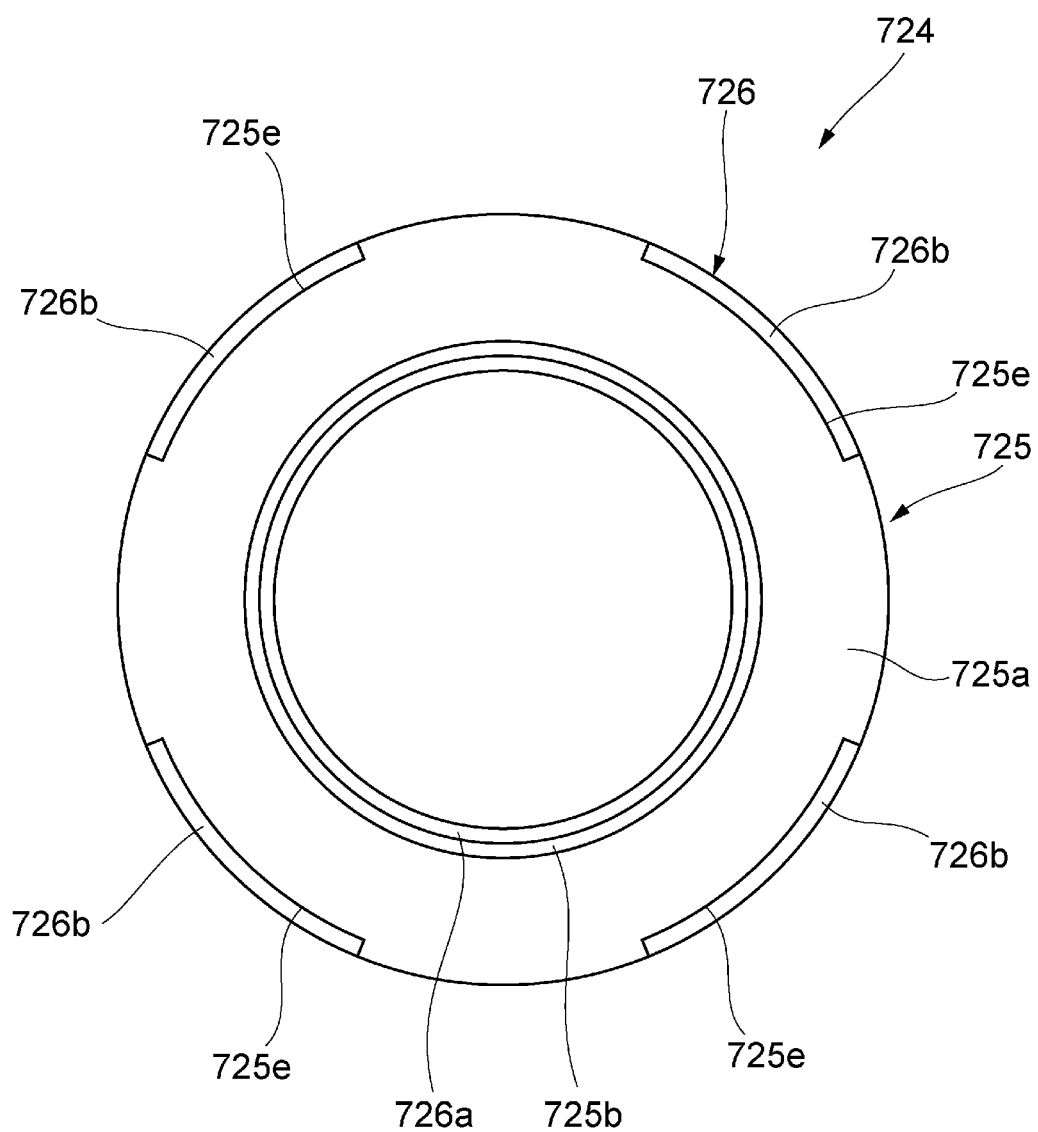
FIG. 15 is a front view of a second raceway ring in which an iron raceway ring and a resin raceway ring are assembled.

FIG. 13 is a cross-sectional view of the bearing device 700 according to the seventh configuration example, FIG. 14 is an exploded perspective view illustrating a state before an iron raceway ring 725 and a resin raceway ring 726 of a second raceway ring 724 according to the seventh configuration example are engaged with each other, and FIG. 15 is a front view of the second raceway ring 724 in which the iron raceway ring 725 and the resin raceway ring 726 are assembled.

The bearing device 700 includes mating members 10 and 11 such as a housing and a rotating shaft that rotate relative to each other, and a thrust roller bearing 720 that is mounted to be relatively rotatable while bearing a thrust load between the mating members 10 and 11.

The thrust roller bearing 720 includes a plurality of rollers 21 which is radially arranged, a retainer 22 having a pocket which is made in a circular ring shape as a whole and rollingly retains the plurality of rollers 21, and a first raceway ring 23 and a second raceway ring 724 which hold the plurality of rollers 21 in an axial direction.

The second raceway ring 724 is formed in which the iron raceway ring 725 and the resin raceway ring 726 are integrally assembled. The iron raceway ring 725 is formed by pressing a metal disk with a hole, and includes a circular ring-shaped annular plate portion 725a provided with a raceway surface 725c, on which the plurality of rollers 21 roll, and an inner cylindrical portion 725b in which an inner peripheral edge of a metal disk is bent toward the raceway surface 725c in the axial direction. Further, circumferential cutouts 725e are formed at four positions with equal intervals in the circumferential direction on an outer diameter side of the annular plate portion 725a.

The resin raceway ring 726 includes an annular plate portion 726c, an inner cylindrical portion 726a which is formed to extend from an inner peripheral edge of the annular plate portion 726c toward the raceway surface 725c in the axial direction and is externally fitted to the inner cylindrical portion 725b of the iron raceway ring 725 in a light interference fit manner, and four locking claws 726b which protrude toward the raceway surface 725c in the axial direction from an outer peripheral edge of the annular plate portion 726c and are formed at equal intervals in the circumferential direction.

As illustrated in FIG. 15, the inner cylindrical portion 726a of the resin raceway ring 726 is externally fitted to the inner cylindrical portion 725b of the iron raceway ring 725. In addition, the locking claw 726b of the resin raceway ring 726 is locked to the circumferential cutout 725e of the inner peripheral edge 225p on the annular plate portion 725a of the iron raceway ring 725. Thus, the resin raceway ring 226 is assembled integrally with the iron raceway ring 225. Other configurations and operations are the same as those of the thrust roller bearing 20 according to the first configuration example.

Eighth Configuration Example

A bearing device 800 according to an eighth configuration example will be described below.

Figure 16:
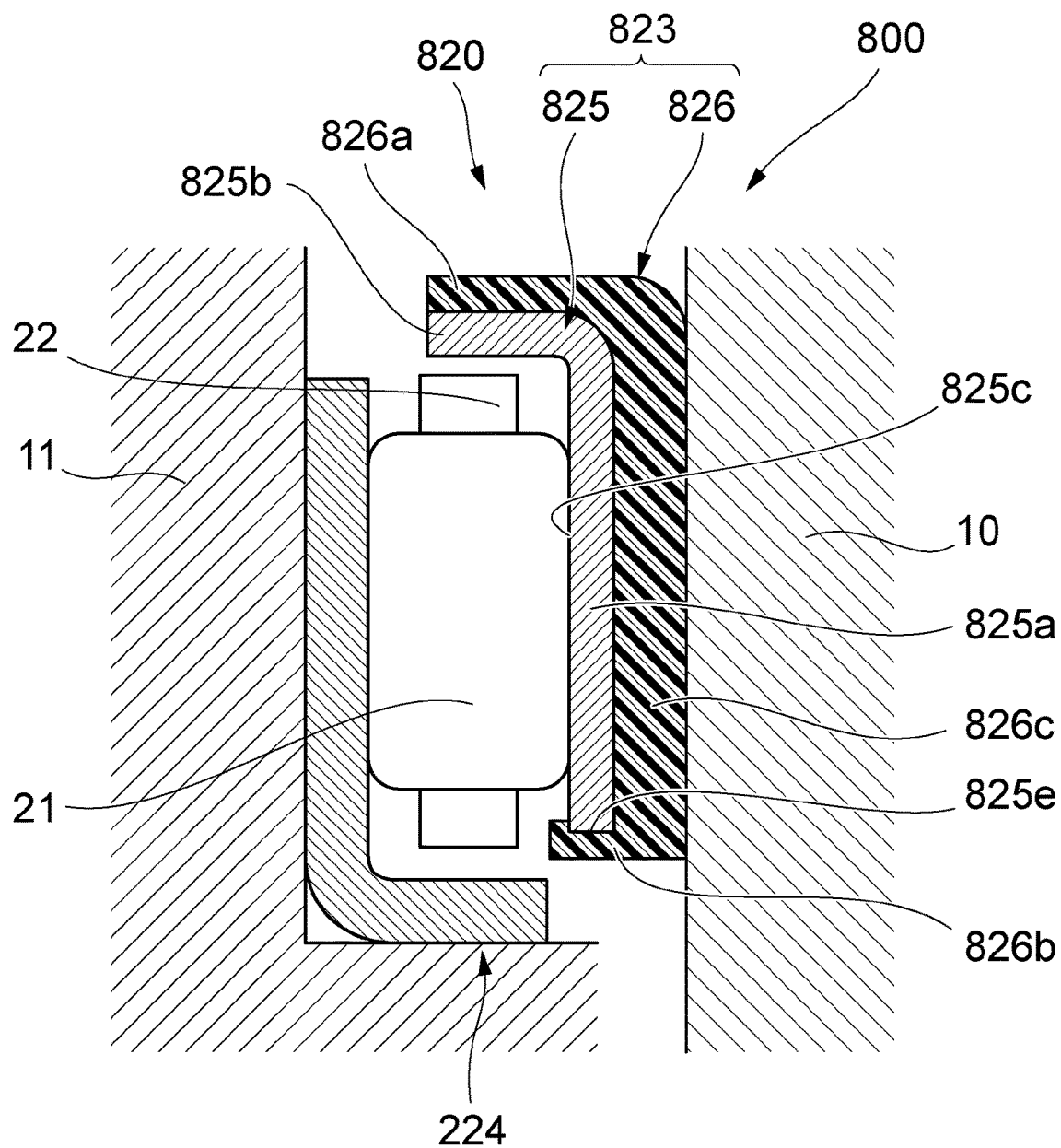
FIG. 16 is a cross-sectional view of a bearing device according to an eighth configuration example.

FIG. 16 is a cross-sectional view of the bearing device 800 according to the eighth configuration example.

The bearing device 800 includes mating members 10 and 11 such as a housing and a rotating shaft that rotate relative to each other, and a thrust roller bearing 820 that is mounted to be relatively rotatable while bearing a thrust load between the mating members 10 and 11.

The thrust roller bearing 820 includes a plurality of rollers 21 which is radially arranged, a retainer 22 having a pocket which is made in a circular ring shape as a whole and rollingly retains the plurality of rollers 21, and a first raceway ring 823 and a second raceway ring 224 which hold the plurality of rollers 21 in an axial direction.

Figure 17:
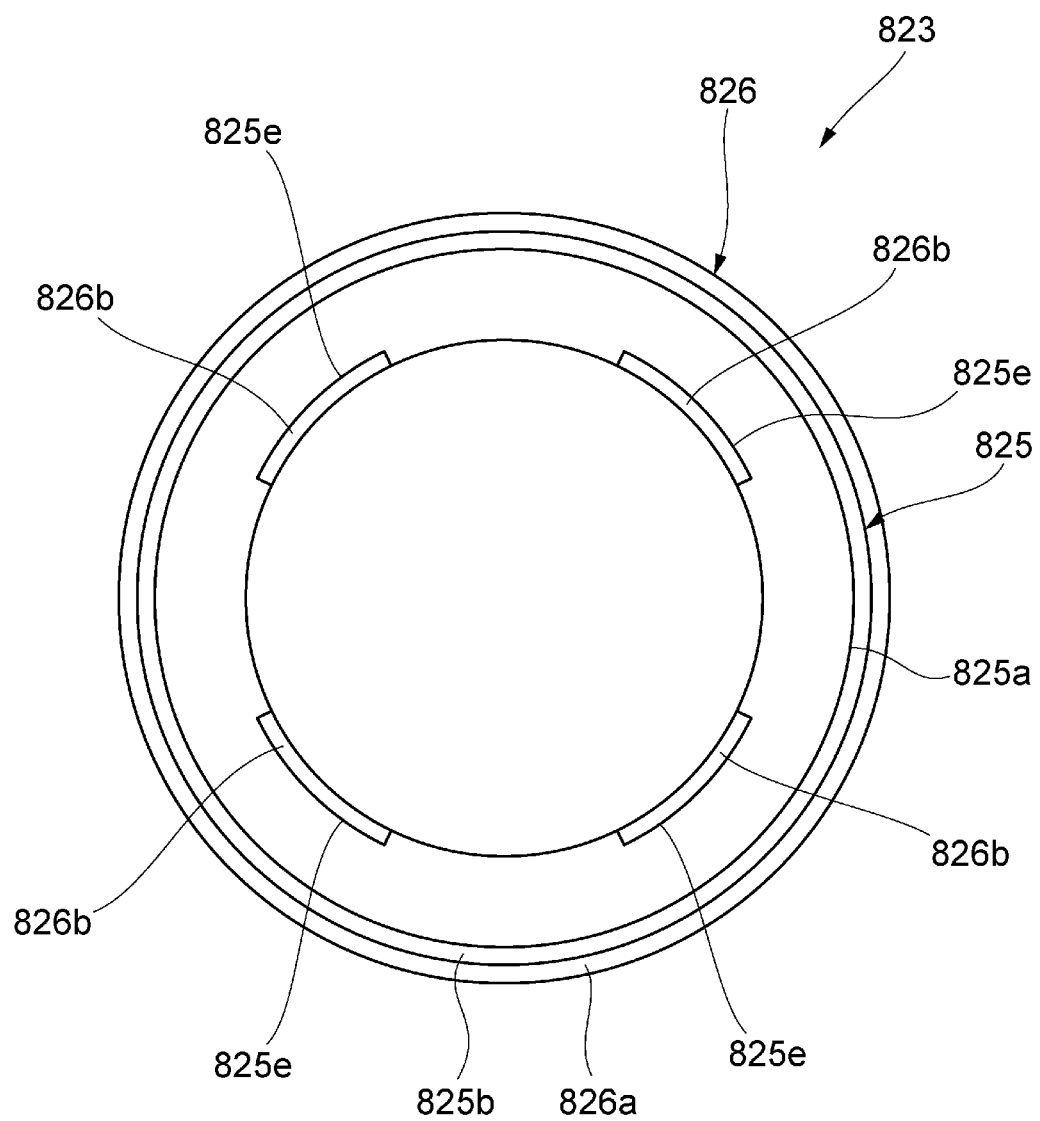
FIG. 17 is a front view of a first raceway ring in which an iron raceway ring and a resin raceway ring are assembled.

FIG. 17 is a front view of the first raceway ring 823 in which an iron raceway ring 825 and a resin raceway ring 826 are assembled.

As illustrated in FIGS. 16 and 17, the first raceway ring 823 is formed in which the iron raceway ring 825 and the resin raceway ring 826 are integrally assembled. The iron raceway ring 825 is formed by pressing a metal disk with a hole, and includes a circular ring-shaped annular plate portion 825a provided with a raceway surface 825c, on which the plurality of rollers 21 roll, and an outer cylindrical portion 825b in which an outer peripheral edge of a metal disk is bent toward the raceway surface 825c in the axial direction. Further, circumferential cutouts 825e are formed at four positions with equal intervals in the circumferential direction on an inner diameter side of the annular plate portion 825a.

The resin raceway ring 826 includes an annular plate portion 826c, an outer cylindrical portion 826a which is formed to extend from an outer peripheral edge of the annular plate portion 826c toward the raceway surface 825c in the axial direction and is externally fitted to the outer cylindrical portion 825b of the iron raceway ring 825 in a light interference fit manner, and four locking claws 826b which protrude toward the raceway surface 825c in the axial direction from an inner peripheral edge of the annular plate portion 826c and are formed at equal intervals in the circumferential direction.

The locking claw 826b of the resin raceway ring 826 is locked to the circumferential cutout 825e of the outer peripheral edge on the annular plate portion 725a of the iron raceway ring 825. Thus, the resin raceway ring 826 is assembled integrally with the iron raceway ring 825. Other configurations and operations are the same as those of the thrust roller bearing 20 according to the first configuration example.

Ninth Configuration Example

A bearing device 900 according to a ninth configuration example will be described below.

Figure 18:
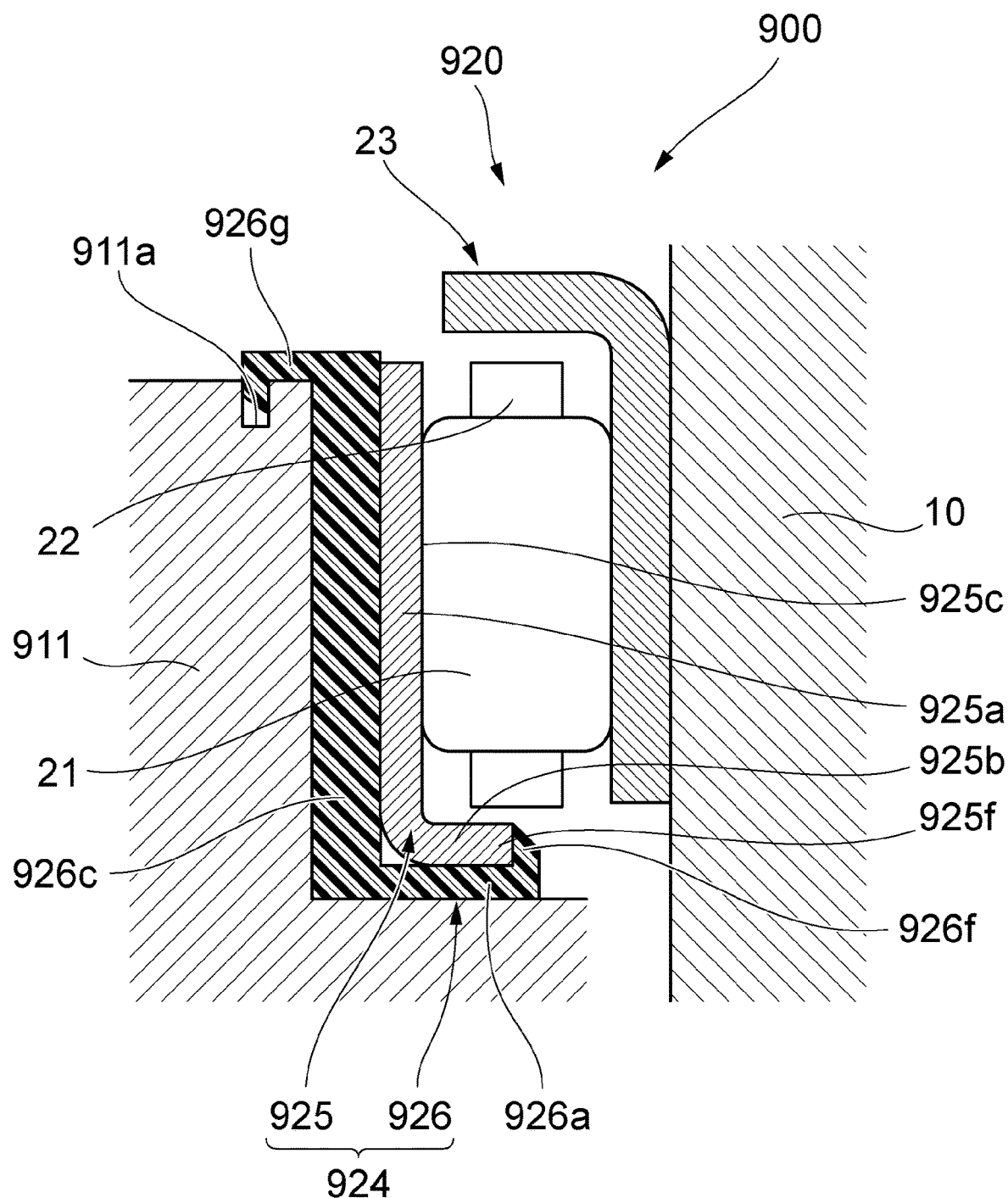
FIG. 18 is a cross-sectional view of a bearing device according to a ninth configuration example.

FIG. 18 is a cross-sectional view of the bearing device 900 according to the ninth configuration example.

The bearing device 900 includes mating members 10 and 911 such as a housing and a rotating shaft that rotate relative to each other, and a thrust roller bearing 920 that is mounted to be relatively rotatable while bearing a thrust load between the mating members 10 and 911.

The thrust roller bearing 920 includes a plurality of rollers 21 which is radially arranged, a retainer 22 having a pocket which is made in a circular ring shape as a whole and rollingly retains the plurality of rollers 21, and a first raceway ring 23 and a second raceway ring 924 which hold the plurality of rollers 21 in an axial direction.

Figure 19:
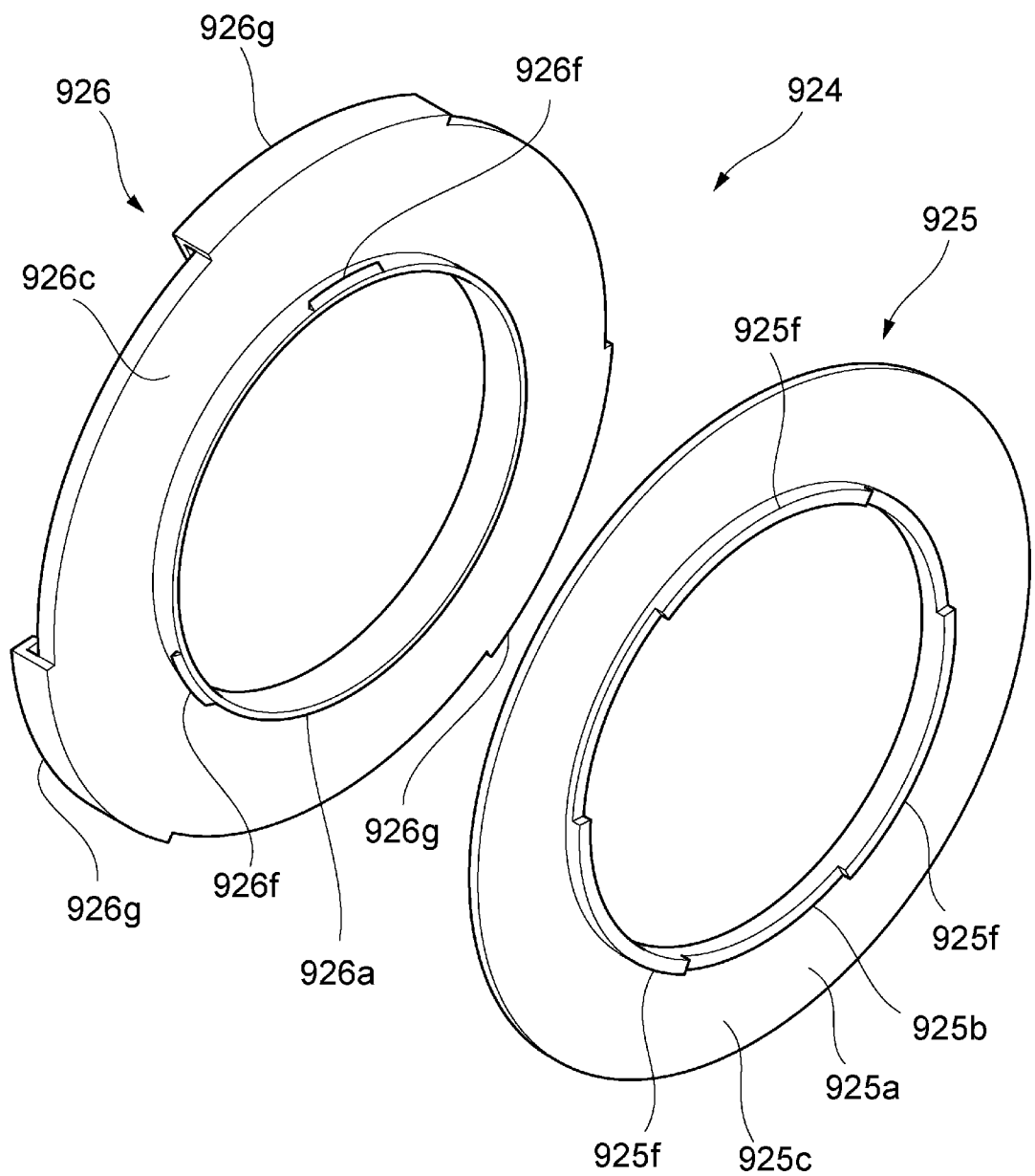
FIG. 19 is an exploded perspective view illustrating a state before an iron raceway ring and a resin raceway ring of a second raceway ring according to the ninth configuration example are engaged with each other.
Figure 20:
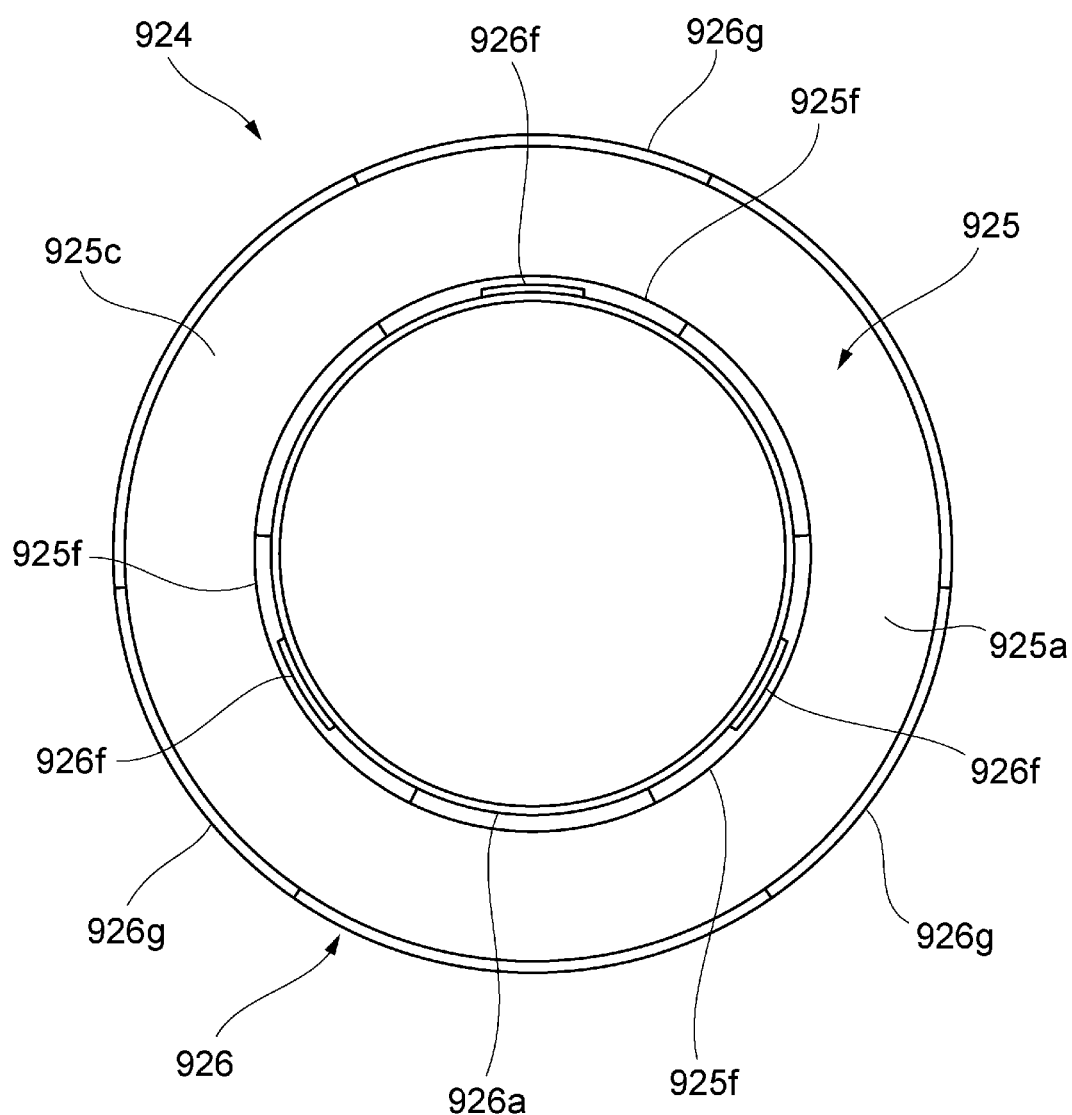
FIG. 20 is a front view of the second raceway ring in which the iron raceway ring and the resin raceway ring are assembled.

FIG. 19 is an exploded perspective view illustrating a state before an iron raceway ring 925 and a resin raceway ring 926 of the second raceway ring 924 according to the ninth configuration example are engaged with each other, and FIG. 20 is a front view of the second raceway ring 924 in which the iron raceway ring 925 and the resin raceway ring 926 are assembled.

The second raceway ring 924 is formed in which the iron raceway ring 925 and the resin raceway ring 926 are integrally assembled. The iron raceway ring 925 is formed by pressing a metal disk with a hole, and includes a circular ring-shaped annular plate portion 925a provided with a raceway surface 925c, on which the plurality of rollers 21 roll, and an inner cylindrical portion 925b in which an inner peripheral edge of a metal disk is bent toward the raceway surface 925c in the axial direction.

The resin raceway ring 926 includes an annular plate portion 926c, an outer cylindrical portion 926a which is formed to extend from an inner peripheral edge of the annular plate portion 926c toward the raceway surface 925c in the axial direction and is externally fitted to the inner cylindrical portion 925b of the iron raceway ring 925 in a light interference fit manner, three engaging portions 926g which are formed at equal intervals in the circumferential direction to protrude from an outer peripheral edge of the annular plate portion 926c toward the opposite side of the raceway surface in the axial direction, and locking claws 926f which are formed at a tip of the inner cylindrical portion 926a on the side of the raceway surface 925c in the axial direction to protrude outwards in a radial direction.

The engaging portion 926g is engaged with a recessed groove 911a formed in the mating member 911. The locking claws 926f are engaged with three projections 925f which are formed on the inner cylindrical portion 925b of the iron raceway ring 925 at equal intervals in the circumferential direction and protrude toward the raceway surface 925c in the axial direction. Thus, disengagement of the iron raceway ring 925 from the resin raceway ring 926 is prevented.

The engaging portion 926g and the locking claw 926f may have an arbitrary shape without being limited to the shape illustrated in the drawing, and the recessed groove 911a of the mating member 911 and the inner cylindrical portion 925b of the iron raceway ring 925 may have an end face which is arbitrarily changeable in a shape or an attachment form.

According to such a configuration, due to elastic deformation of the locking claw 926f of the resin raceway ring 926, the locking claw 926f is locked to the projection 925f of the inner cylindrical portion 925b of the iron raceway ring 925 and the resin raceway ring 926 is assembled integrally with the iron raceway ring 925. Thus, the resin raceway ring 926 and the iron raceway ring 925 can be reliably fixed to each other with a simple assembling process.

Tenth Configuration Example

Next, a bearing device 1000 according to a tenth configuration example will be described.

Figure 21:
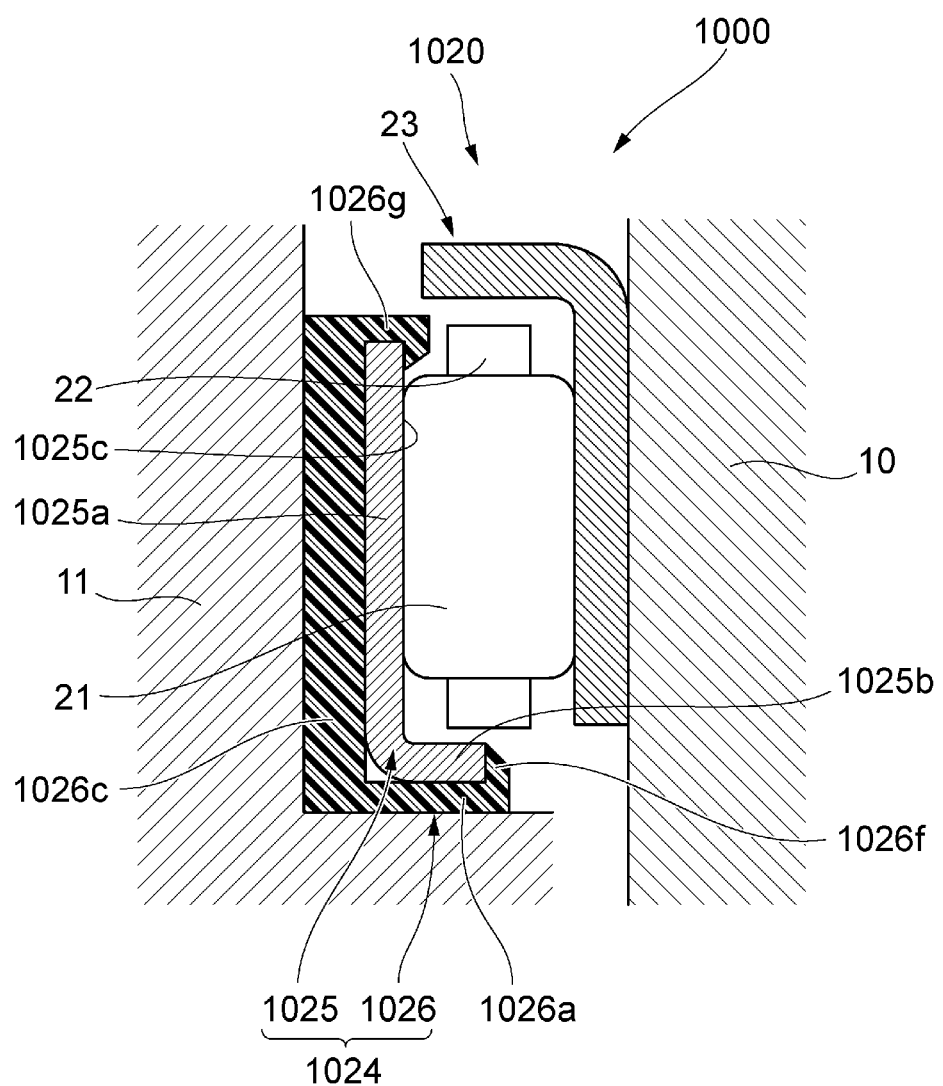
FIG. 21 is a cross-sectional view of a bearing device according to a tenth configuration example.

FIG. 21 is a cross-sectional view of the bearing device 1000 according to the tenth configuration example. The bearing device 1000 according to the tenth configuration example is similar to the bearing device 900 according to the ninth configuration example except for an iron raceway ring 1025 and a resin raceway ring 1026.

The bearing device 1000 includes mating members 10 and 11 such as a housing and a rotating shaft that rotate relative to each other, and a thrust roller bearing 1020 that is mounted to be relatively rotatable while bearing a thrust load between the mating members 10 and 11.

The thrust roller bearing 1020 includes a plurality of rollers 21 which is radially arranged, a retainer 22 having a pocket which is made in a circular ring shape as a whole and rollingly retains the plurality of rollers 21, and a first raceway ring 23 and a second raceway ring 1024 which hold the plurality of rollers 21 in an axial direction.

The second raceway ring 1024 having such a configuration is formed in which an iron raceway ring 1025 and a resin raceway ring 1026 are integrally assembled. The iron raceway ring 1025 is formed by pressing a metal disk with a hole, and includes a circular ring-shaped annular plate portion 1025a provided with a raceway surface 1025c, on which the plurality of rollers 21 roll, and an inner cylindrical portion 1025b in which an inner peripheral edge of a metal disk is bent toward the raceway surface 1025c in the axial direction.

The resin raceway ring 1026 includes an annular plate portion 1026c, an outer cylindrical portion 1026a which is formed to extend from an inner peripheral edge of the annular plate portion 1026c toward the raceway surface 1025c in the axial direction and is externally fitted to the inner cylindrical portion 1025b of the iron raceway ring 1025 in a light interference fit manner, three engaging portions 1026g which are formed at equal intervals in the circumferential direction to protrude from an outer peripheral edge of the annular plate portion 1026c toward the raceway surface in the axial direction, and locking claws 1026f which are formed at a tip of the inner cylindrical portion 1026a on the side of the raceway surface 1025c in the axial direction to protrude inwards in a radial direction.

The engaging portion 1026g is engaged with the outer peripheral edge of the annular plate portion 1026c of the iron raceway ring 1025. Similarly to the ninth configuration example, the locking claws 1026f are engaged with the mating member 1011 and the iron raceway ring 1025. Thus, the resin raceway ring 926 is assembled integrally with the iron raceway ring 925.

Eleventh Configuration Example

A bearing device 1100 according to an eleventh configuration example will be described below.

Figure 22:
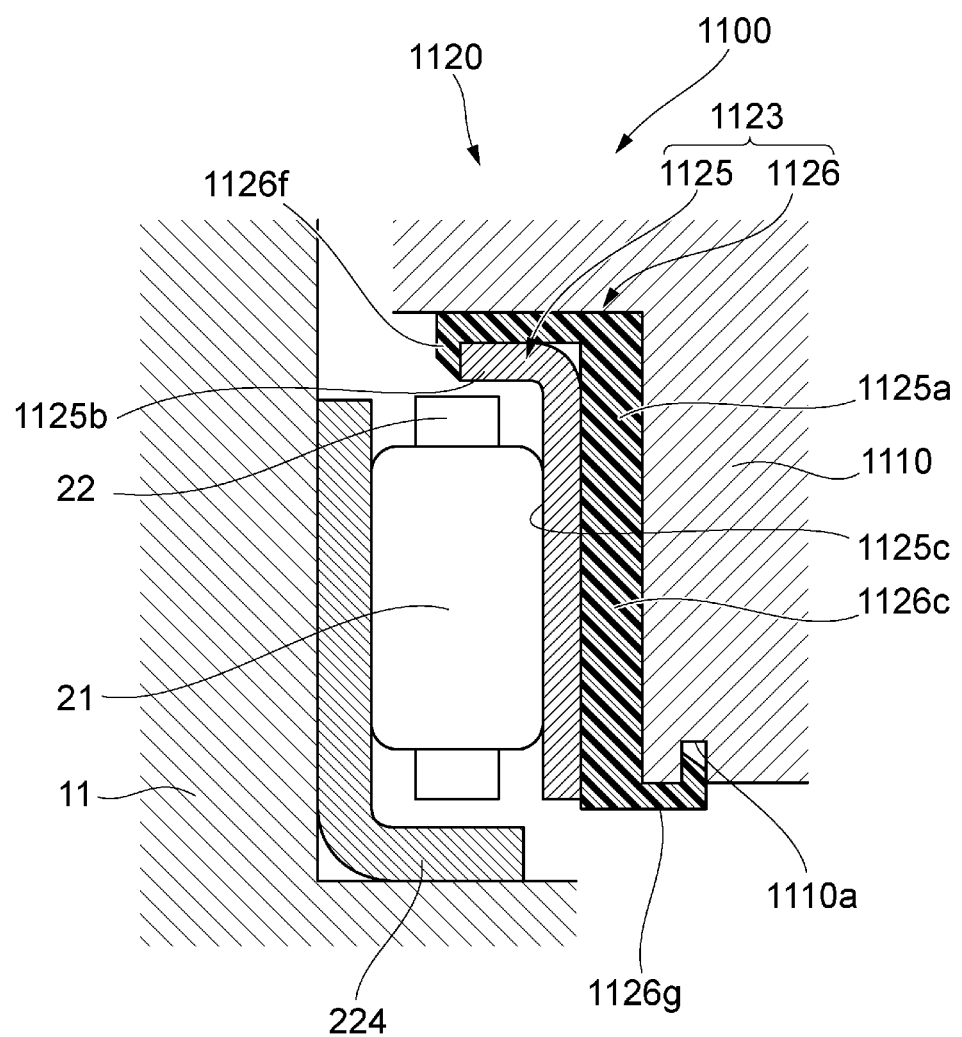
FIG. 22 is a cross-sectional view of a bearing device according to an eleventh configuration example.

FIG. 22 is a cross-sectional view of the bearing device 1100 according to the tenth configuration example.

The bearing device 1100 includes mating members 1110 and 11 such as a housing and a rotating shaft that rotate relative to each other, and a thrust roller bearing 1120 that is mounted to be relatively rotatable while bearing a thrust load between the mating members 1110 and 11.

The thrust roller bearing 1120 includes a plurality of rollers 21 which is radially arranged, a retainer 22 having a pocket which is made in a circular ring shape as a whole and rollingly retains the plurality of rollers 21, and a first raceway ring 1123 and a second raceway ring 224 which hold the plurality of rollers 21 in an axial direction.

The first raceway ring 1123 is formed in which an iron raceway ring 1125 and a resin raceway ring 1126 are integrally assembled. The iron raceway ring 1125 is formed by pressing a metal disk with a hole, and includes a circular ring-shaped annular plate portion 1125a provided with a raceway surface 1125c, on which the plurality of rollers 21 roll, and an outer cylindrical portion 1125b in which an outer peripheral edge of a metal disk is bent toward the raceway surface in the axial direction.

The resin raceway ring 1126 includes an annular plate portion 1126c, an outer cylindrical portion 1126a which is formed to extend from an outer peripheral edge of the annular plate portion 1126c toward the raceway surface 1125c in the axial direction and is externally fitted to the outer cylindrical portion 1125b of the iron raceway ring 1125 in a light interference fit manner, three engaging portions 1126g which are formed at equal intervals in the circumferential direction to protrude from an inner peripheral edge of the annular plate portion 1126c toward the opposite side of the raceway surface in the axial direction, and locking claws 1126f which are formed at a tip of the outer cylindrical portion 1126a on the side of the raceway surface 1125c in the axial direction to protrude inwards in a radial direction.

The engaging portion 1126g is engaged with a recessed groove 1110a formed in the mating member 1110, and the locking claws 1126f are engaged with the outer cylindrical portion 1125b of the iron raceway ring 1125 in the same manner as the locking claws 926f of the ninth configuration example. Thus, disengagement of the iron raceway ring 1125 from the resin raceway ring 1126 is prevented.

Even in such a configuration, the engaging portion 1126g and the locking claw 1126f may have an arbitrary shape without being limited to the shape illustrated in the drawing, and the recessed groove 1110a of the mating member 1110 and the outer cylindrical portion 1125b of the iron raceway ring 1125 may have an end face which is arbitrarily changeable in a shape or an attachment form.

Twelfth Configuration Example

Next, a bearing device 1200 according to a twelfth configuration example will be described.

Figure 23:
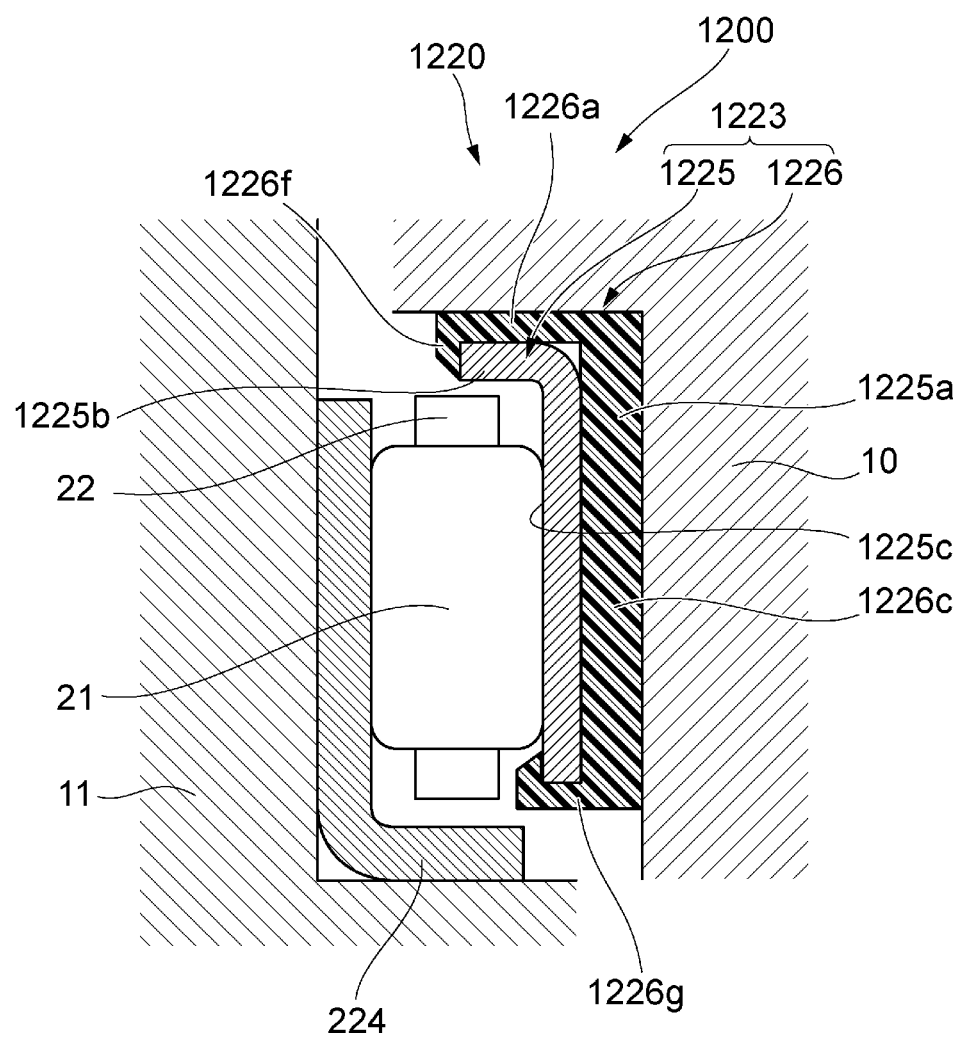
FIG. 23 is a cross-sectional view of a bearing device according to a twelfth configuration example.

FIG. 23 is a cross-sectional view of the bearing device 1200 according to the twelfth configuration example. The bearing device 1200 according to the twelfth configuration example is similar to the bearing device 1100 according to the eleventh configuration example except for an iron raceway ring 1125, a resin raceway ring 1126, and a mating member 10 on which the resin raceway ring 1126 is mounted.

The bearing device 1200 includes mating members 10 and 11 such as a housing and a rotating shaft that rotate relative to each other, and a thrust roller bearing 1220 that is mounted to be relatively rotatable while bearing a thrust load between the mating members 10 and 11.

The thrust roller bearing 1220 includes a plurality of rollers 21 which is radially arranged, a retainer 22 having a pocket which is made in a circular ring shape as a whole and rollingly retains the plurality of rollers 21, and a first raceway ring 1223 and a second raceway ring 224 which hold the plurality of rollers 21 in an axial direction.

The first raceway ring 1223 is formed in which an iron raceway ring 1225 and a resin raceway ring 1226 are integrally assembled. The iron raceway ring 1225 is formed by pressing a metal disk with a hole, and includes a circular ring-shaped annular plate portion 1225a provided with a raceway surface 1225c, on which the plurality of rollers 21 roll, and an outer cylindrical portion 1225b in which an outer peripheral edge of a metal disk is bent toward the raceway surface in the axial direction.

The resin raceway ring 1226 includes an annular plate portion 1226c, an outer cylindrical portion 1226a which is formed to extend from an outer peripheral edge of the annular plate portion 1126c toward the raceway surface 1225c in the axial direction and is externally fitted to the outer cylindrical portion 1225b of the iron raceway ring 1225 in a light interference fit manner, three engaging portions 1226g which are formed at equal intervals in the circumferential direction to protrude from an inner peripheral edge of the annular plate portion 1226c toward the raceway surface 1225c in the axial direction, and locking claws 1226f which are formed at a tip of the outer cylindrical portion 1226a on the side of the raceway surface 1225c in the axial direction to protrude inwards in a radial direction.

The engaging portion 1226g is engaged with the inner peripheral edge of the annular plate portion 1225a of the iron raceway ring 1125. Similarly to the eleventh configuration example, the locking claws 1226f are engaged with the mating member 10 and the iron raceway ring 1225. Thus, the resin raceway ring 1226 is assembled integrally with the iron raceway ring 1225.

Thirteenth Configuration Example

A bearing device 1300 according to a thirteenth configuration example will be described below.

Figure 24:
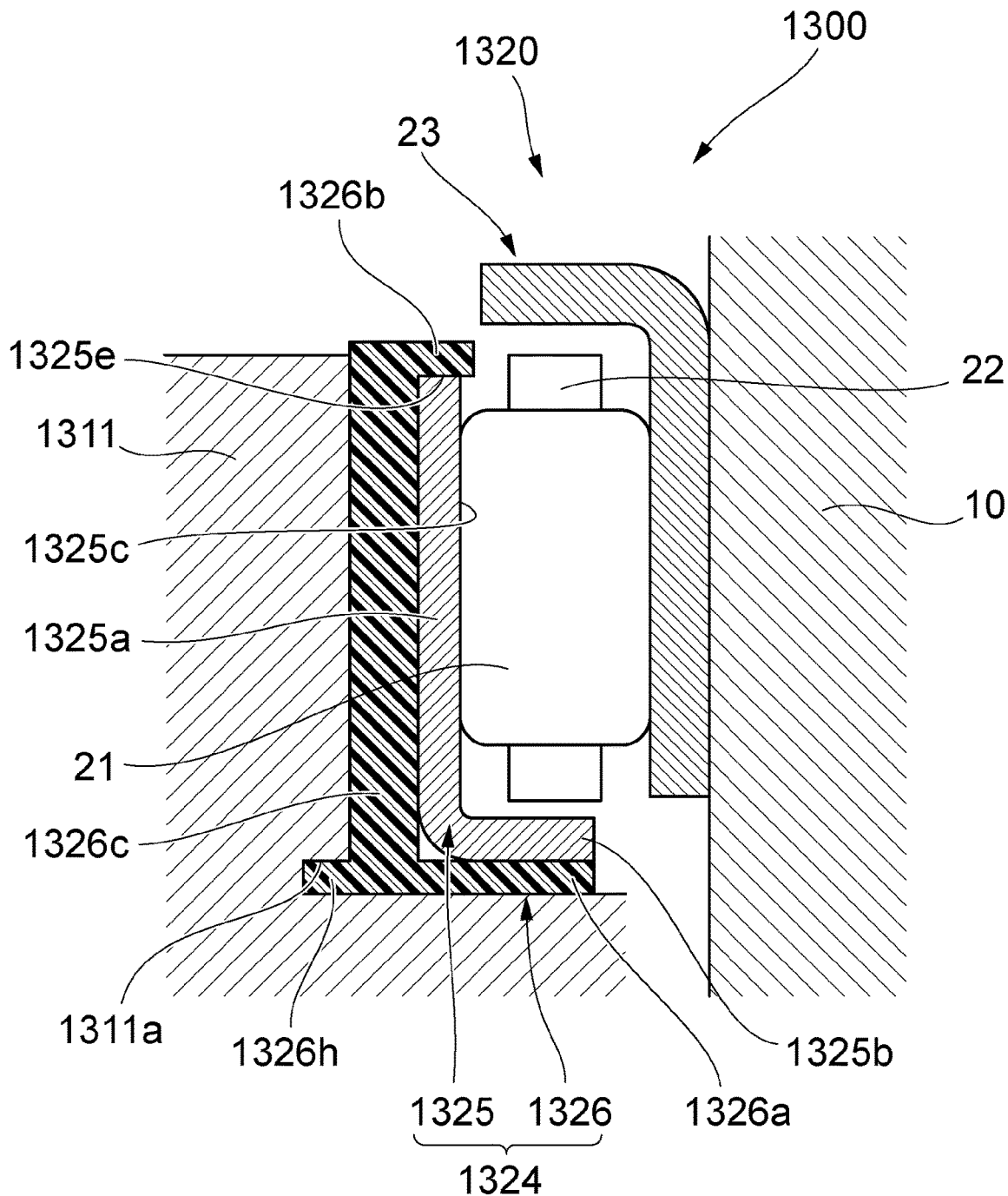
FIG. 24 is a cross-sectional view of a bearing device according to a thirteenth configuration example.

FIG. 24 is a cross-sectional view of the bearing device 1300 according to the thirteenth configuration example.

The bearing device 1300 includes mating members 10 and 1311 such as a housing and a rotating shaft that rotate relative to each other, and a thrust roller bearing 1320 that is mounted to be relatively rotatable while bearing a thrust load between the mating members 10 and 1311.

The thrust roller bearing 1320 includes a plurality of rollers 21 which is radially arranged, a retainer 22 having a pocket which is made in a circular ring shape as a whole and rollingly retains the plurality of rollers 21, and a first raceway ring 23 and a second raceway ring 1324 which hold the plurality of rollers 21 in an axial direction.

The second raceway ring 1324 is formed in which an iron raceway ring 1325 and a resin raceway ring 1326 are integrally assembled. The iron raceway ring 1325 is formed by pressing a metal disk with a hole, and includes a circular ring-shaped annular plate portion 1325a provided with a raceway surface 1325c, on which the plurality of rollers 21 roll, and an inner cylindrical portion 1325b in which an inner peripheral edge of a metal disk is bent toward the raceway surface 1325c in the axial direction.

The resin raceway ring 1326 includes an annular plate portion 1326c, an inner cylindrical portion 1326a which is formed to extend from an inner peripheral edge of the annular plate portion 1326c toward the raceway surface 1325c in the axial direction and is externally fitted to the inner cylindrical portion 1325b of the iron raceway ring 1325 in a light interference fit manner, and three arcuate locking projections 1326h which are formed at equal intervals in the circumferential direction to protrude from an inner peripheral edge of the annular plate portion 1326c toward the opposite side of the raceway surface in the axial direction.

Figure 25:
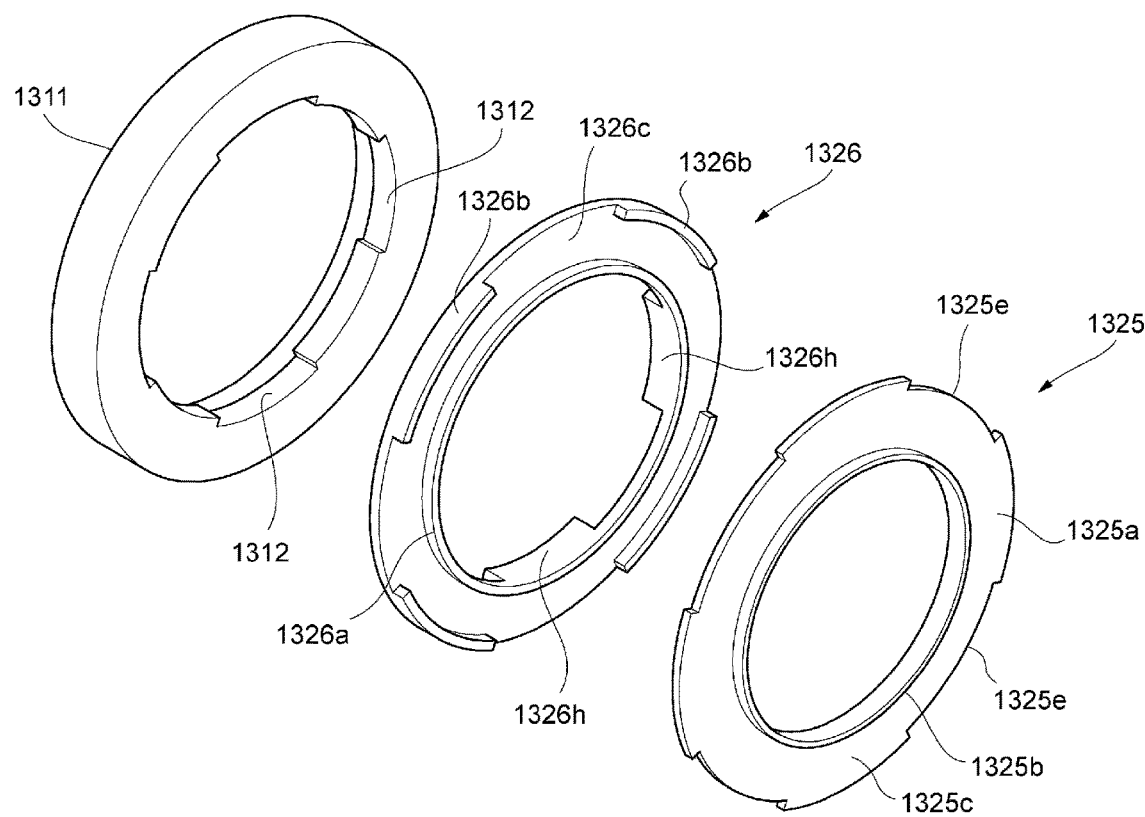
FIG. 25 is an exploded perspective view illustrating a state before an iron raceway ring and a resin raceway ring of a second raceway ring according to the thirteenth configuration example are engaged with each other.
Figure 26:
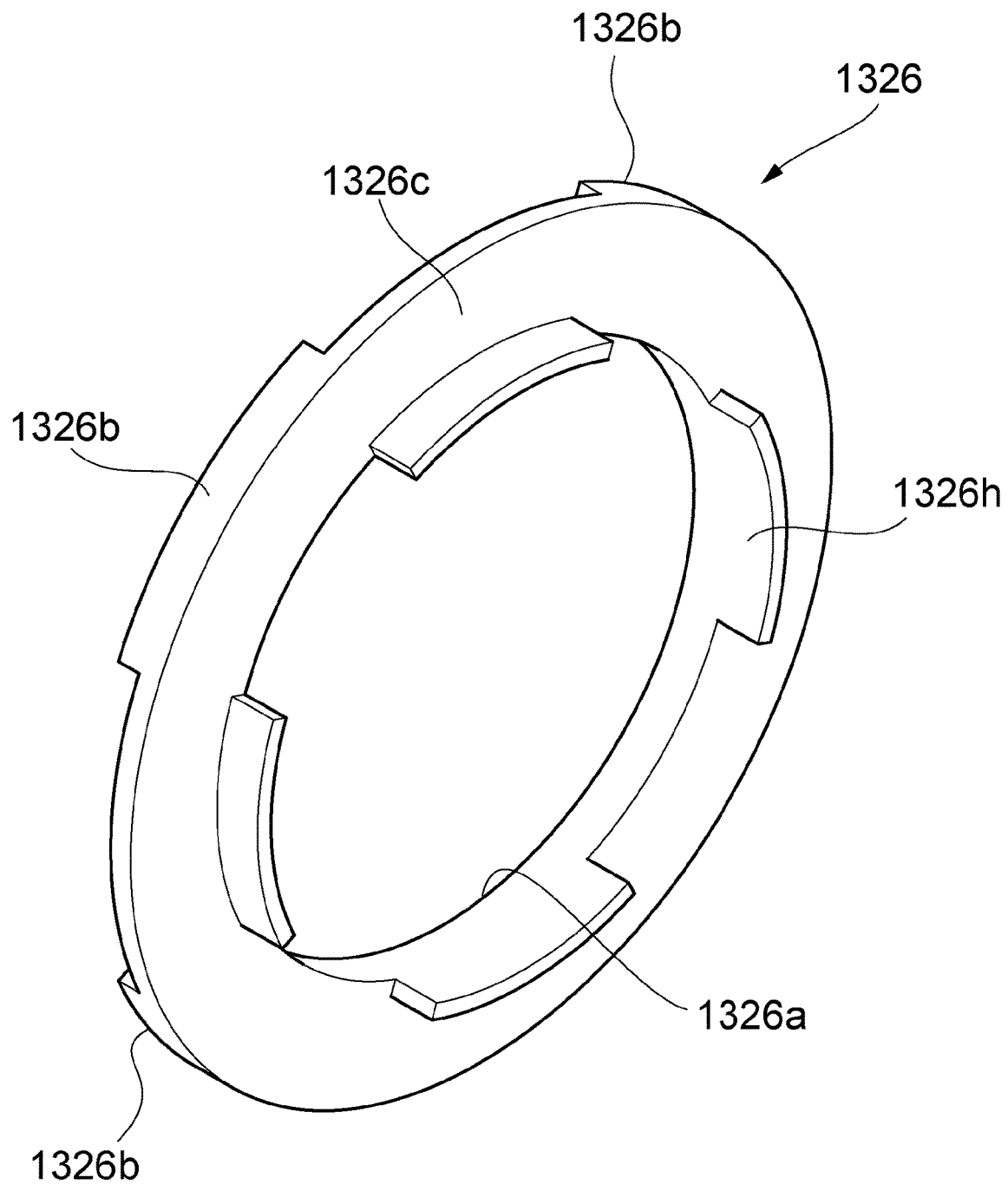
FIG. 26 is a perspective view of a resin raceway ring illustrated in FIG. 25 as viewed from the mating member.
Figure 27:
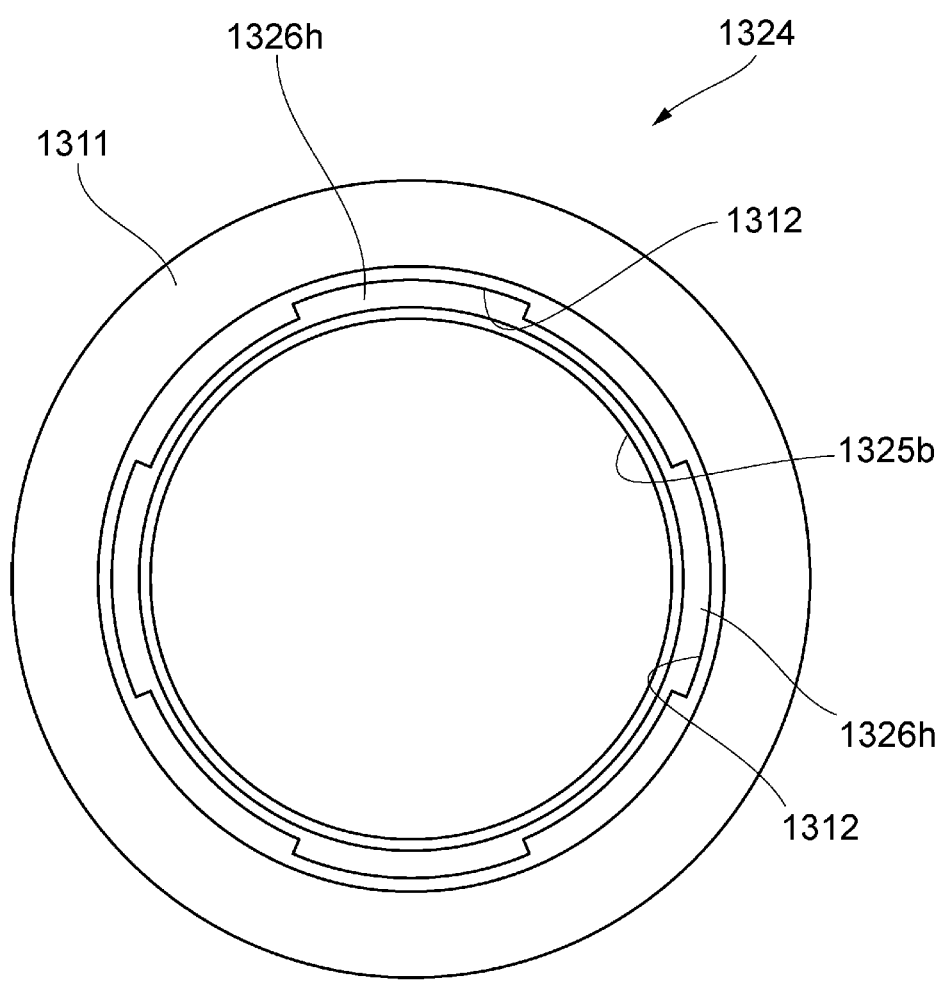
FIG. 27 is a front view of the second raceway ring assembled to the mating member.

FIG. 25 is an exploded perspective view illustrating a state before the iron raceway ring 1325 and the resin raceway ring 1326 of the second raceway ring 1324 according to the thirteenth configuration example are engaged with the mating member 1311, FIG. 26 is a perspective view of the resin raceway ring 1326 illustrated in FIG. 25 as viewed from the mating member 1311, and FIG. 27 is a front view of the second raceway ring 1324 assembled to the mating member 1311.

As illustrated in FIG. 26, on a back surface (on the side of the mating member 1311) of the resin raceway ring 1326, the arcuate locking projections 1326h are formed at four positions with equal intervals in the circumferential direction to protrude toward the opposite side in the axial direction of the inner cylindrical portion 1326a formed on the inner peripheral edge of the annular plate portion 1326c.

As illustrated in FIG. 25, the mating member 1311 is formed with four arcuate recesses 1312 formed at equal intervals in the circumferential direction so as to correspond to the arcuate locking projections 1326h of the resin raceway ring 1326.

As illustrated in FIG. 25, the iron raceway ring 1325 is formed with the inner cylindrical portion 1325b, in which the inner peripheral edge thereof is bent toward the raceway surface 1325c in the axial direction, and four circumferential cutouts 1325e corresponding to the locking claws 1326b of the resin raceway ring 1326 and formed on the outer peripheral edge of the circular ring-shaped annular plate portion 1325a at equal intervals in the circumferential direction.

The resin raceway ring 1326 is assembled integrally with the iron raceway ring 1325 in such a manner that the locking claw 1326b is locked to the circumferential cutout 1325e and the inner cylindrical portion 1326a is internally fitted to the inner cylindrical portion 1325b of the iron raceway ring 1325. Then, the assembled second raceway ring 1324 is engaged with the mating member 1311 in such a manner that the arcuate locking projections 1326h of the resin raceway ring 1326 are inserted into the arcuate recesses 1312. Thus, the resin raceway ring 1326 is prevented from rotating relative to both the mating member 1311 and the iron raceway ring 1325.

Fourteenth Configuration Example

Next, a bearing device 1400 according to a fourteenth configuration example will be described.

Figure 28:
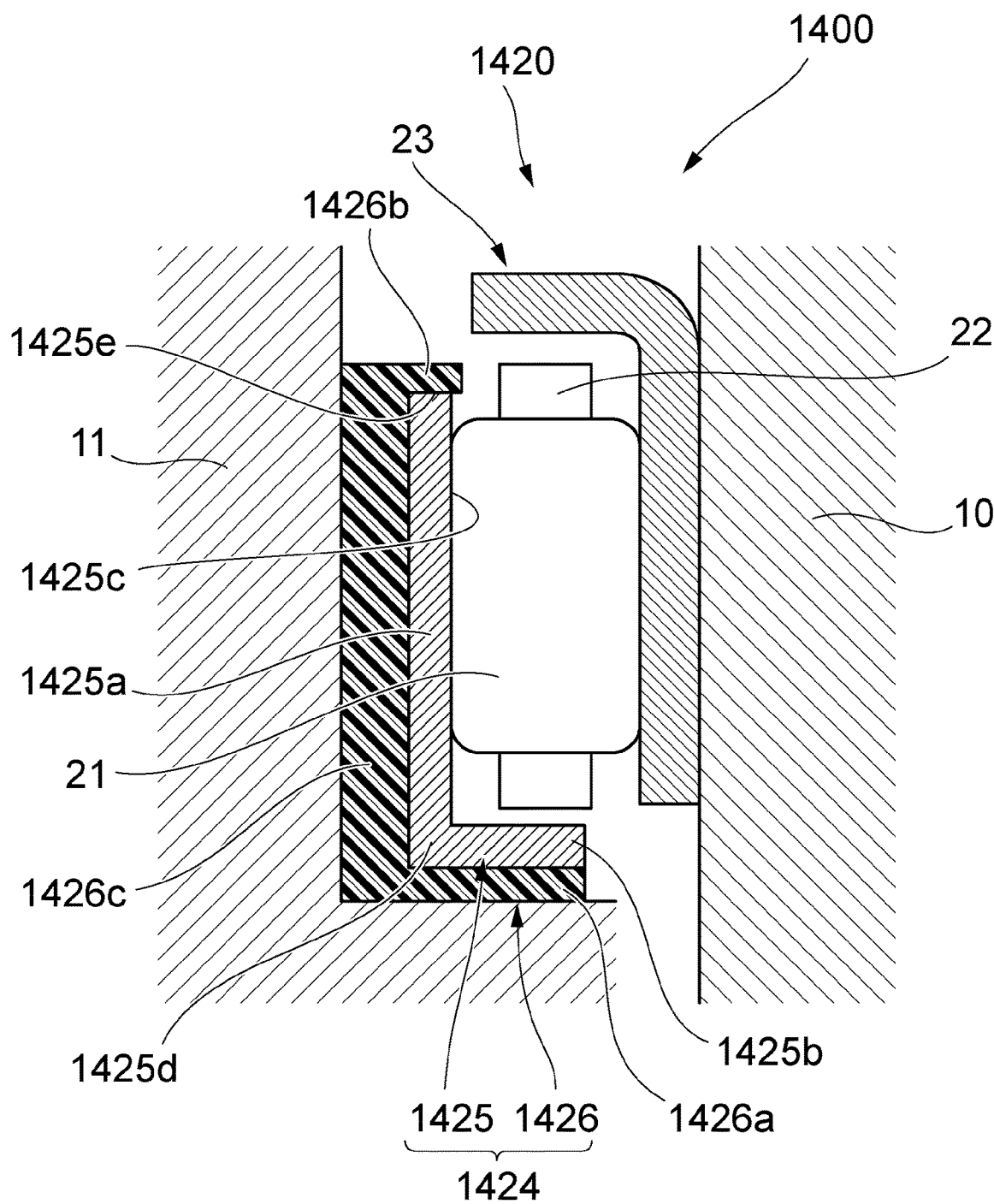
FIG. 28 is a cross-sectional view of a bearing device according to a fourteenth configuration example.

FIG. 28 is a cross-sectional view of the bearing device 1400 according to the fourteenth configuration example. The bearing device 1400 according to the fourteenth configuration example is similar to the bearing device 1300 according to the thirteenth configuration example except for an iron raceway ring 1425, a resin raceway ring 1426, and a mating member 11 on which the resin raceway ring 1426 is mounted.

The bearing device 1400 includes mating members 10 and 11 such as a housing and a rotating shaft that rotate relative to each other, and a thrust roller bearing 1420 that is mounted to be relatively rotatable while bearing a thrust load between the mating members 10 and 11.

The thrust roller bearing 1420 includes a plurality of rollers 21 which is radially arranged, a retainer 22 having a pocket which is made in a circular ring shape as a whole and rollingly retains the plurality of rollers 21, and a first raceway ring 23 and a second raceway ring 1424 which hold the plurality of rollers 21 in an axial direction.

The first raceway ring 1423 is formed in which an iron raceway ring 1425 and a resin raceway ring 1426 are integrally assembled.

The iron raceway ring 1425 is formed by pressing a metal disk with a hole, and includes a circular ring-shaped annular plate portion 1425a provided with a raceway surface 1425c, on which the plurality of rollers 21 roll, and an inner cylindrical portion 1425b in which an inner peripheral edge of a metal disk is bent toward the raceway surface in the axial direction.

The resin raceway ring 1426 includes an annular plate portion 1426c, an inner cylindrical portion 1426a which is formed to extend from an inner peripheral edge of the annular plate portion 1426c toward the raceway surface 1425c in the axial direction and is externally fitted to the inner cylindrical portion 1425b of the iron raceway ring 1425 in a light interference fit manner, and three arcuate locking projections 1426h which are formed at equal intervals in the circumferential direction to protrude from an inner peripheral edge of the annular plate portion 1426c toward the raceway surface 1435c in the axial direction. A locking claw 1426b of the resin raceway ring 1426 is locked to an outer peripheral edge 1425e of the annular plate portion 1425a of the iron raceway ring 1425, and thus the resin raceway ring 1426 is assembled integrally with the iron raceway ring 1425.

Figure 29:
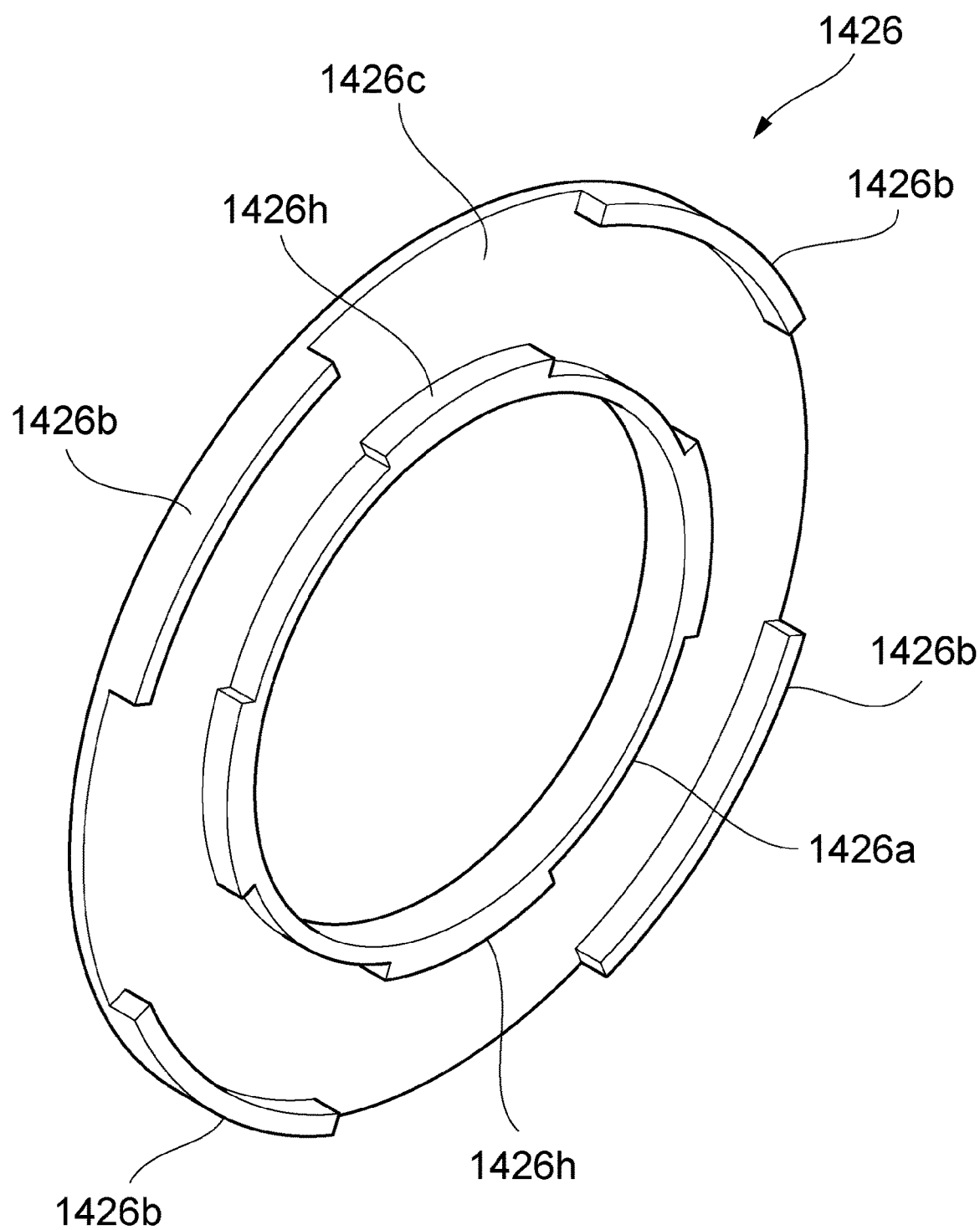
FIG. 29 is a perspective view of a resin raceway according to the fourteenth configuration example.
Figure 30:
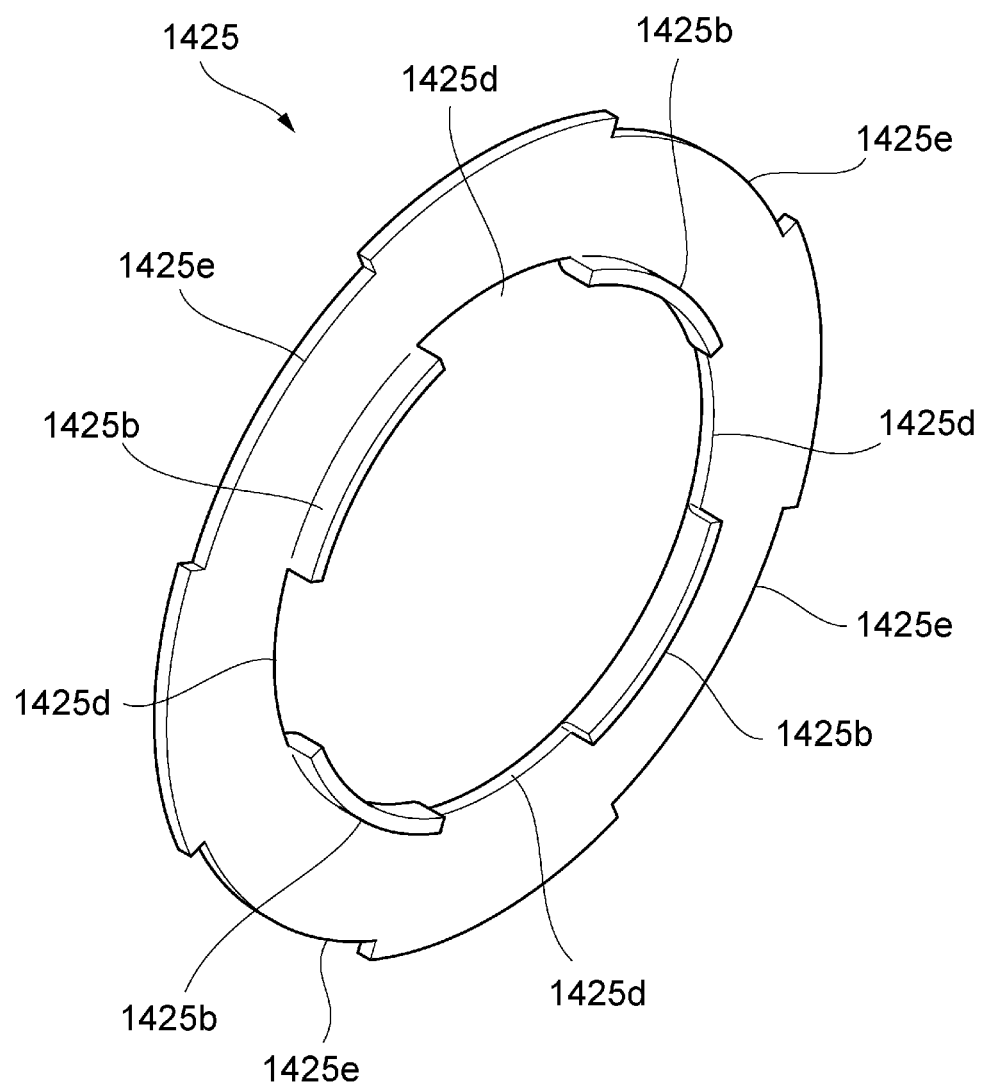
FIG. 30 is a perspective view of an iron raceway ring.

FIG. 29 is a perspective view of the resin raceway ring 1426 according to the fourteenth configuration example, and FIG. 30 is a perspective view of the iron raceway ring 1425. The resin raceway ring 1426 of such a configuration has a configuration in which the arcuate locking projection 1326h of the resin raceway ring 1326 according to the thirteenth configuration example is formed on the side of the inner cylindrical portion 1426a. Further, circumferential cutouts 1425d to be engaged with the arcuate locking projections 1426h of the resin raceway ring 1426 are formed in the inner cylindrical portion 1425b of the iron raceway ring 1425.

The locking claw 1426b of the resin raceway ring 1426 is locked to the circumferential cutout 1425e of the iron raceway ring 1425, and the arcuate locking projection 1426h provided on a part of the inner cylindrical portion 1426a is inserted into the circumferential cutout 1425d of the iron raceway ring 1425 to be engaged with each other. Thus, the resin raceway ring 1426 is prevented from rotating relative to the iron raceway ring 1425.

Fifteenth Configuration Example

Next, a bearing device 1500 according to a fifteenth configuration example will be described.

Figure 31:
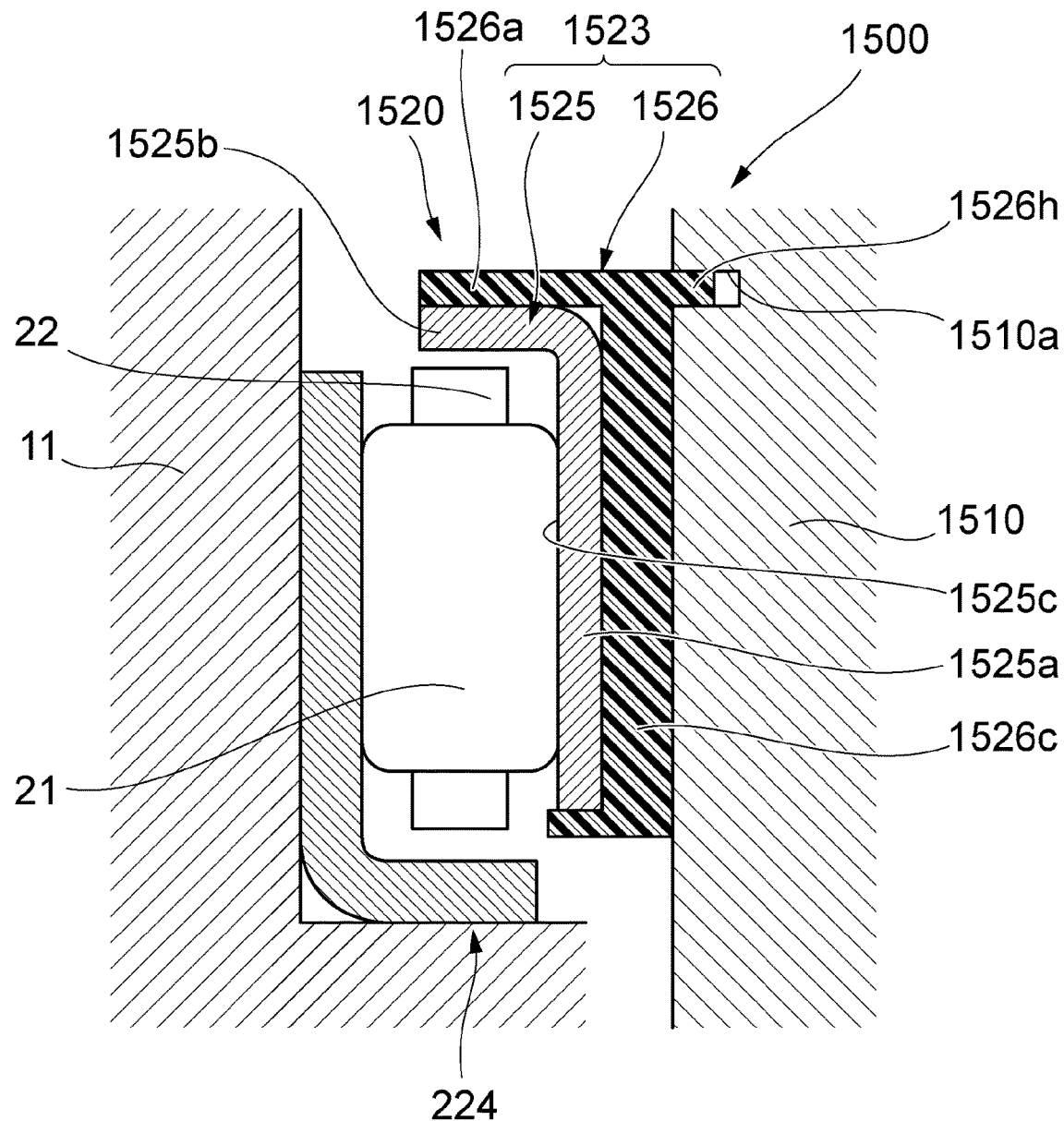
FIG. 31 is a cross-sectional view of a bearing device according to a fifteenth configuration example.

FIG. 31 is a cross-sectional view of the bearing device 1500 according to the fifteenth configuration example.

The bearing device 1500 includes mating members 1510 and 11 such as a housing and a rotating shaft that rotate relative to each other, and a thrust roller bearing 1520 that is mounted to be relatively rotatable while bearing a thrust load between the mating members 1510 and 11.

The thrust roller bearing 1520 includes a plurality of rollers 21 which is radially arranged, a retainer 22 having a pocket which is made in a circular ring shape as a whole and rollingly retains the plurality of rollers 21, and a first raceway ring 1523 and a second raceway ring 224 which hold the plurality of rollers 21 in an axial direction.

The first raceway ring 1523 is formed in which an iron raceway ring 1525 and a resin raceway ring 1526 are integrally assembled. The iron raceway ring 1525 is formed by pressing a metal disk with a hole, and includes a circular ring-shaped annular plate portion 1525a provided with a raceway surface 1525c, on which the plurality of rollers 21 roll, and an outer cylindrical portion 1525b in which an outer peripheral edge of a metal disk is bent toward the raceway surface 1525c in the axial direction.

The resin raceway ring 1526 includes an annular plate portion 1526c, an inner cylindrical portion 1526a which is formed to extend from an outer peripheral edge of the annular plate portion 1526c toward the raceway surface 1525c in the axial direction and is externally fitted to the outer cylindrical portion 1525b of the iron raceway ring 1525 in a light interference fit manner, and three arcuate locking projections 1526h which are formed at equal intervals in the circumferential direction to protrude from an outer peripheral edge of the annular plate portion 1526c toward the opposite side of the raceway surface in the axial direction.

The engagement structure between the arcuate locking projection 1526h and the mating member 1510 is the same as the engagement structure between the arcuate locking projection 1326h and the mating member 1311 according to the thirteenth configuration example. In addition, an inner periphery of the iron raceway ring 1525 is locked to an inner periphery of the annular plate portion 1526c.

Thus, the resin raceway ring 1526 is prevented from rotating relative to both the mating member 1510 and the iron raceway ring 1525.

Sixteenth Configuration Example

A bearing device 1600 according to a sixteenth configuration example will be described below.

Figure 32:
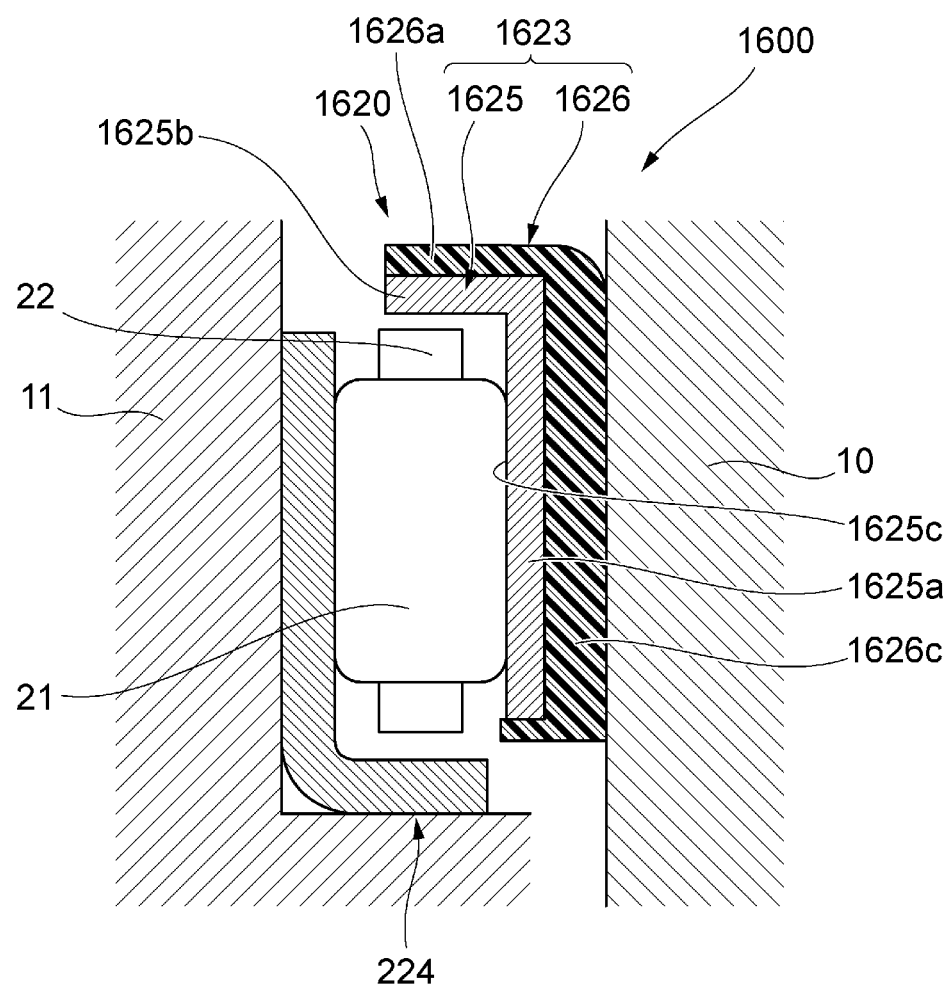
FIG. 32 is a cross-sectional view of a bearing device according to a sixteenth configuration example.

FIG. 32 is a cross-sectional view of the bearing device 1600 according to the sixteenth configuration example. The bearing device 1600 according to the sixteenth configuration example is similar to the bearing device 1500 according to the fifteenth configuration example except for an iron raceway ring 1525, a resin raceway ring 1526, and a mating member 11 to which the resin raceway ring 1526 is mounted.

The bearing device 1600 includes mating members 10 and 11 such as a housing and a rotating shaft that rotate relative to each other, and a thrust roller bearing 1620 that is mounted to be relatively rotatable while bearing a thrust load between the mating members 10 and 11.

The thrust roller bearing 1620 includes a plurality of rollers 21 which is radially arranged, a retainer 22 having a pocket which is made in a circular ring shape as a whole and rollingly retains the plurality of rollers 21, and a first raceway ring 1623 and a second raceway ring 224 which hold the plurality of rollers 21 in an axial direction.

The first raceway ring 1623 is formed in which an iron raceway ring 1625 and a resin raceway ring 1626 are integrally assembled. The iron raceway ring 1625 is formed by pressing a metal disk with a hole, and includes a circular ring-shaped annular plate portion 1625a provided with a raceway surface 1625c, on which the plurality of rollers 21 roll, and an outer cylindrical portion 1625b in which an outer peripheral edge of a metal disk is bent toward the raceway surface 1625c in the axial direction.

The resin raceway ring 1626 includes an annular plate portion 1626c, an inner cylindrical portion 1626a which is formed to extend from an outer peripheral edge of the annular plate portion 1626c toward the raceway surface 1625c in the axial direction and is externally fitted to the outer cylindrical portion 1625b of the iron raceway ring 1625 in a light interference fit manner, and three arcuate locking projections 1626h which are formed at equal intervals in the circumferential direction to protrude from an outer peripheral edge of the annular plate portion 1626c toward the raceway surface 1625c in the axial direction.

In the outer cylindrical portion 1625b of the iron raceway ring 1625, circumferential cutouts 1625d to be engaged with the arcuate locking projections 1626h of the resin raceway ring 1626 are formed.

The engagement structure between the arcuate locking projection 1626h and the circumferential cutout 1625d is similar to the engagement structure between the arcuate locking projection 1426h and the circumferential cutout 1425d according to the fourteenth configuration example except that a position in a radial direction is different. Further, an inner periphery of the iron raceway ring 1625 is locked to an inner periphery of the annular plate portion 1626c.

Thus, the resin raceway ring 1626 is prevented from rotating relative to the iron raceway ring 1625.

Each of the resin raceway rings described above may have any shape without being particularly limited as long as it can be assembled not to rotate relative to the iron raceway ring and the mating member.

FIGS. 33A, 33B, and 33C and FIGS. 34A, 34B, and 34C are cross-sectional views illustrating various modified examples of resin raceway rings.

Figure 33A:
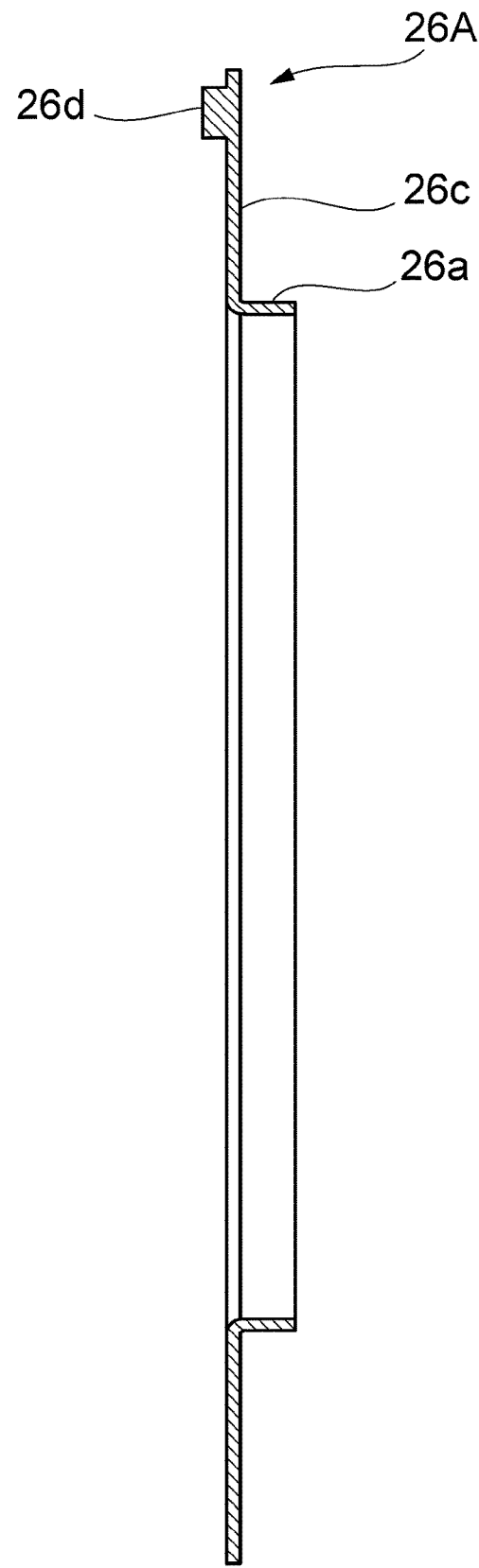
FIG. 33A is a cross-sectional view illustrating various modified examples of a resin raceway ring.
Figure 33B:
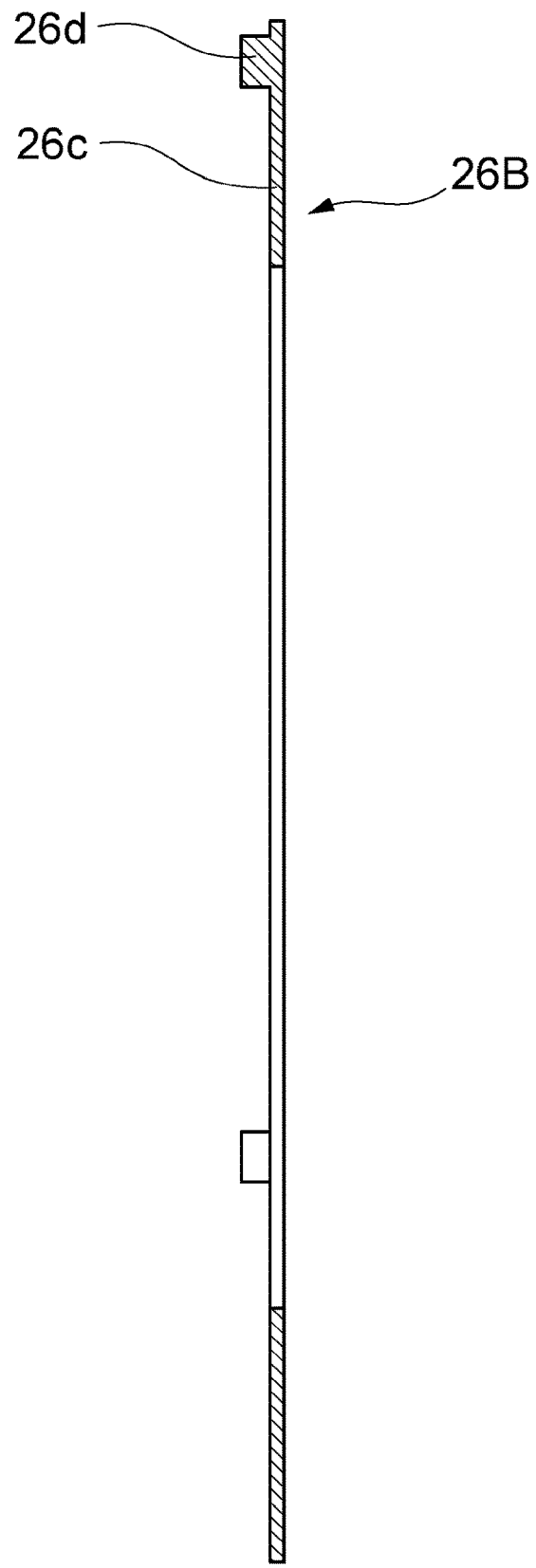
FIG. 33B is a cross-sectional view illustrating various modified examples of a resin raceway ring.
Figure 33C:
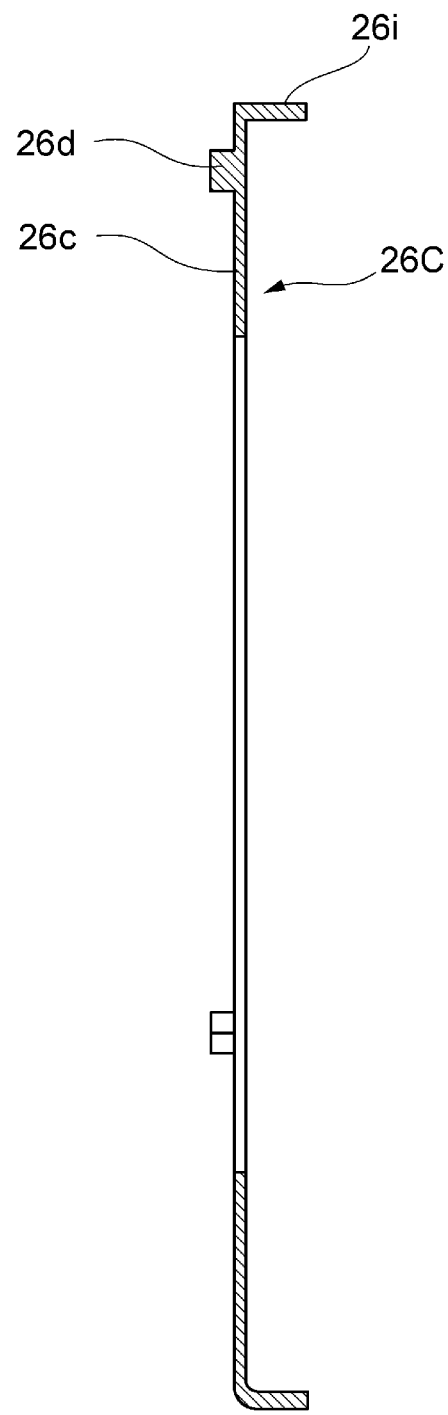
FIG. 33C is a cross-sectional view illustrating various modified examples of a resin raceway ring.

FIG. 33A illustrates a resin raceway ring 26A with an inner cylindrical portion 26a including a pin 26d engaged with a locking hole formed in an iron raceway ring or a mating member, FIG. 33B illustrates a flat-shaped resin raceway ring 26B including a pin 26d, and FIG. 33C illustrates a resin raceway ring 26C with an outer cylindrical portion 26i including a pin 26d.

Figure 34A:
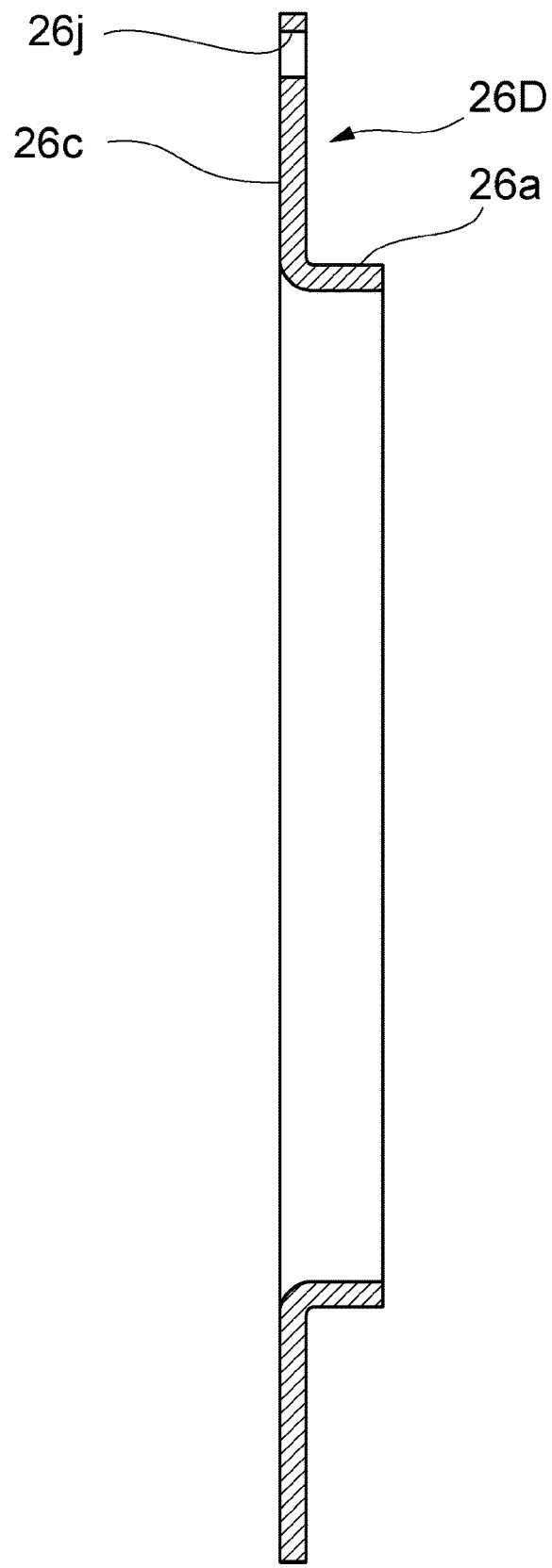
FIG. 34A is a cross-sectional view illustrating various modified examples of a resin raceway ring.
Figure 34B:
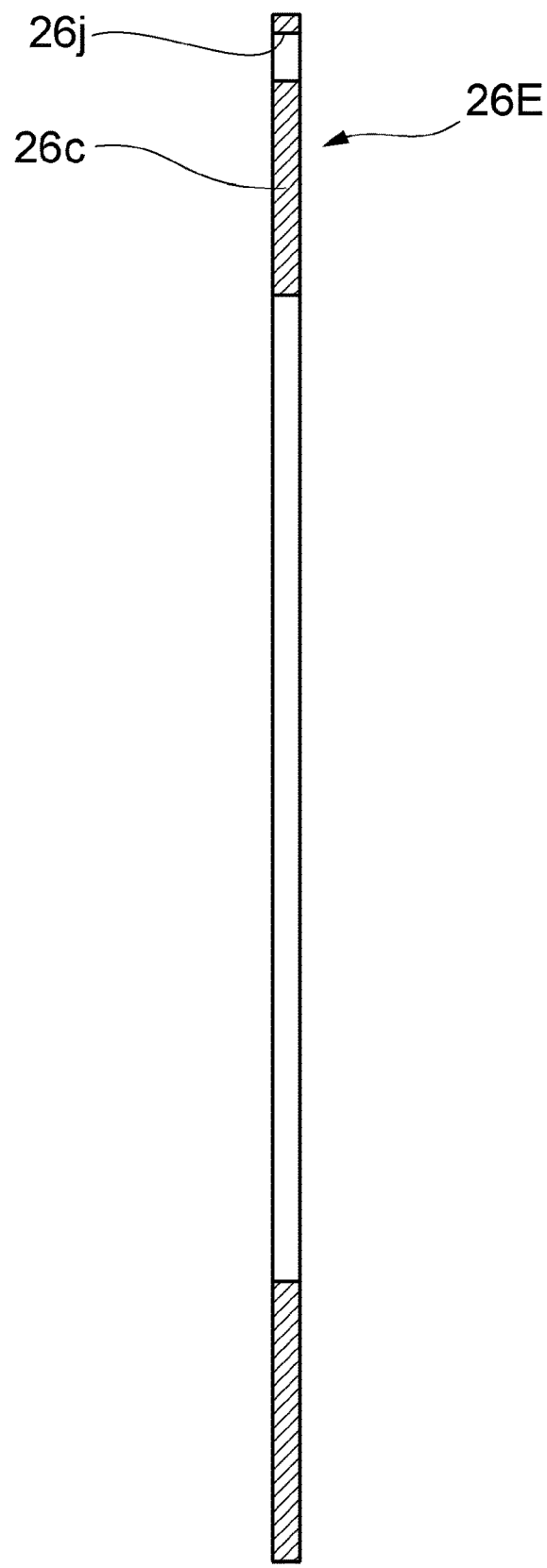
FIG. 34B is a cross-sectional view illustrating various modified examples of a resin raceway ring.
Figure 34C:
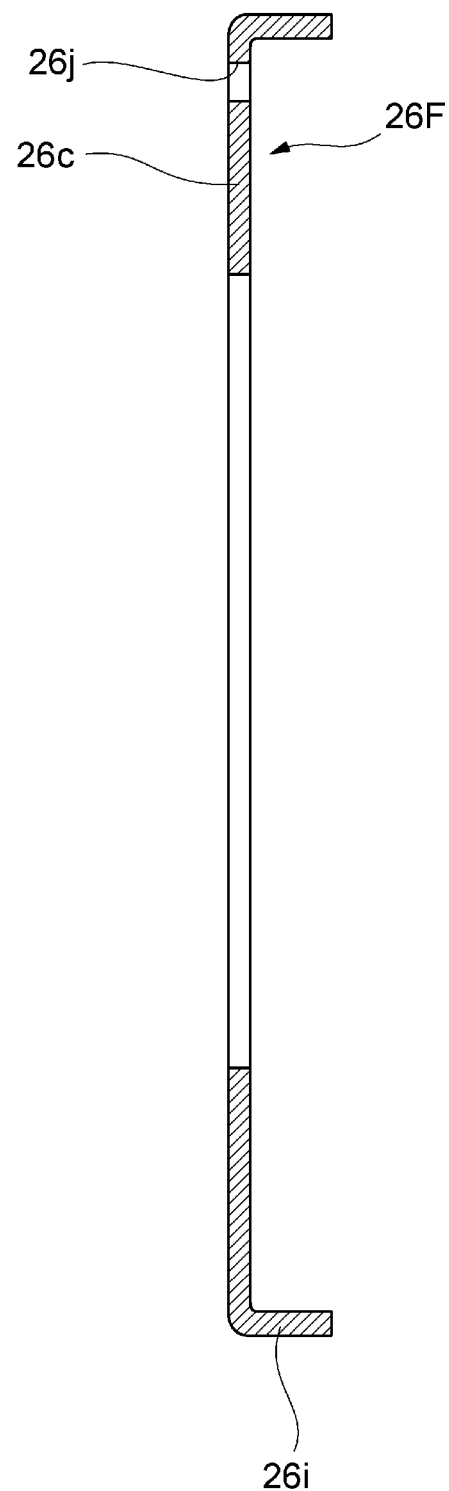
FIG. 34C is a cross-sectional view illustrating various modified examples of a resin raceway ring.

FIG. 34A illustrates a resin raceway ring 26D with an inner cylindrical portion 26a in which a part of an outer periphery thereof is provided with an engaging hole 26j instead of the pin 26d illustrated in FIG. 33A, FIG. 34B illustrates a flat-shaped resin raceway ring 26E including an engaging hole 26j, and FIG. 34C illustrates a resin raceway ring 26F with an outer cylindrical portion 26i including an engaging hole 26j.

Seventeenth Configuration Example

A bearing device 1700 according to a seventeenth configuration example will be described below.

Figure 35:
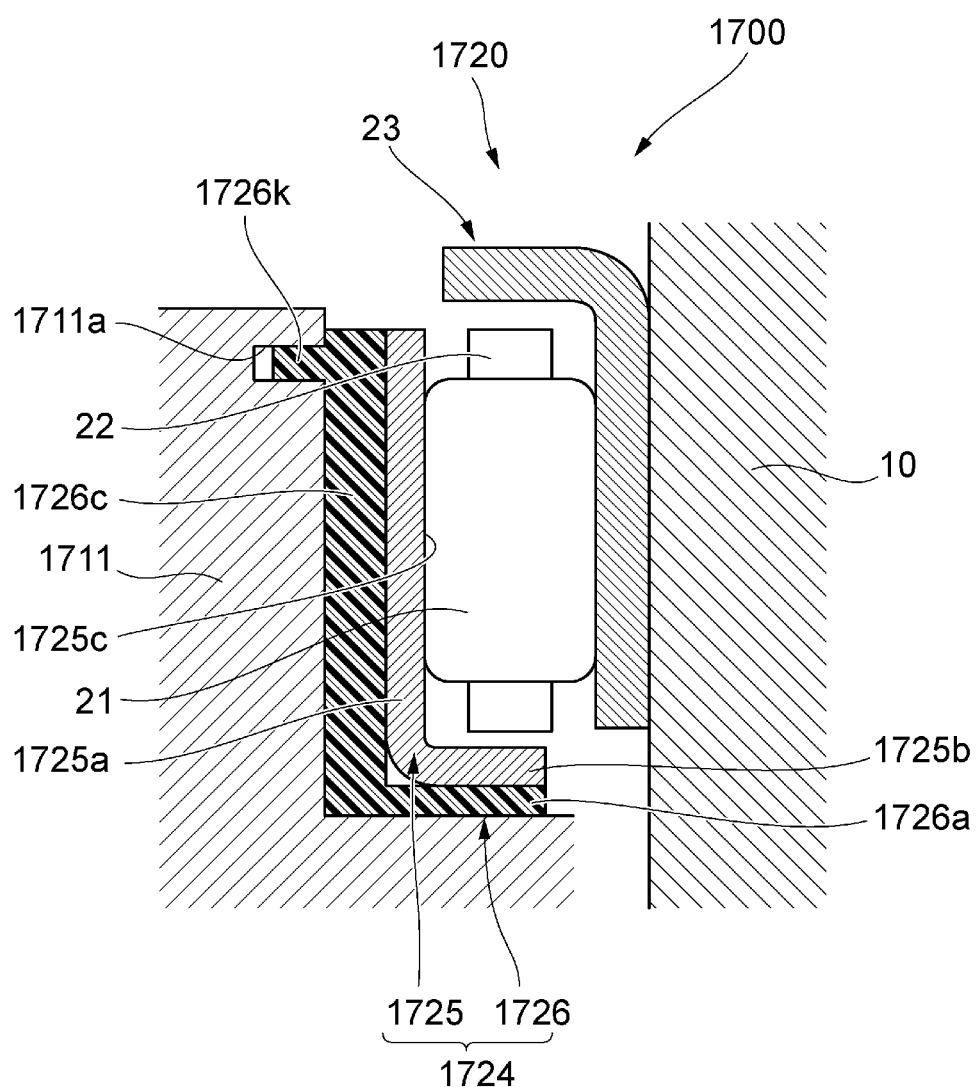
FIG. 35 is a cross-sectional view of a bearing device according to a seventeenth configuration example.

FIG. 35 is a cross-sectional view of the bearing device 1700 according to the seventeenth configuration example.

The bearing device 1700 includes mating members 10 and 1711 such as a housing and a rotating shaft that rotate relative to each other, and a thrust roller bearing 1720 that is mounted to be relatively rotatable while bearing a thrust load between the mating members 10 and 1711.

The thrust roller bearing 1720 includes a plurality of rollers 21 which is radially arranged, a retainer 22 having a pocket which is made in a circular ring shape as a whole and rollingly retains the plurality of rollers 21, and a first raceway ring 23 and a second raceway ring 1724 which hold the plurality of rollers 21 in an axial direction.

The second raceway ring 1724 is formed in which an iron raceway ring 1725 and a resin raceway ring 1726 are assembled integrally with each other. The iron raceway ring 1725 is formed by pressing a metal disk with a hole, and includes a circular ring-shaped annular plate portion 1725a provided with a raceway surface 1725c, on which the plurality of rollers 21 roll, and an inner cylindrical portion 1725b in which an inner peripheral edge of a metal disk is bent toward the raceway surface 1725c in the axial direction.

The resin raceway ring 1726 includes an annular plate portion 1726c, an inner cylindrical portion 1726a which is formed to extend from an inner peripheral edge of the annular plate portion 1726c toward the raceway surface 1725c in the axial direction and is externally fitted to the inner cylindrical portion 1725b of the iron raceway ring 1725 in a light interference fit manner, and three prismatic projections 1726k which are formed at equal intervals in the circumferential direction to protrude from an outer peripheral edge of the annular plate portion 1726c toward the opposite side of the raceway surface in the axial direction.

Figure 36:
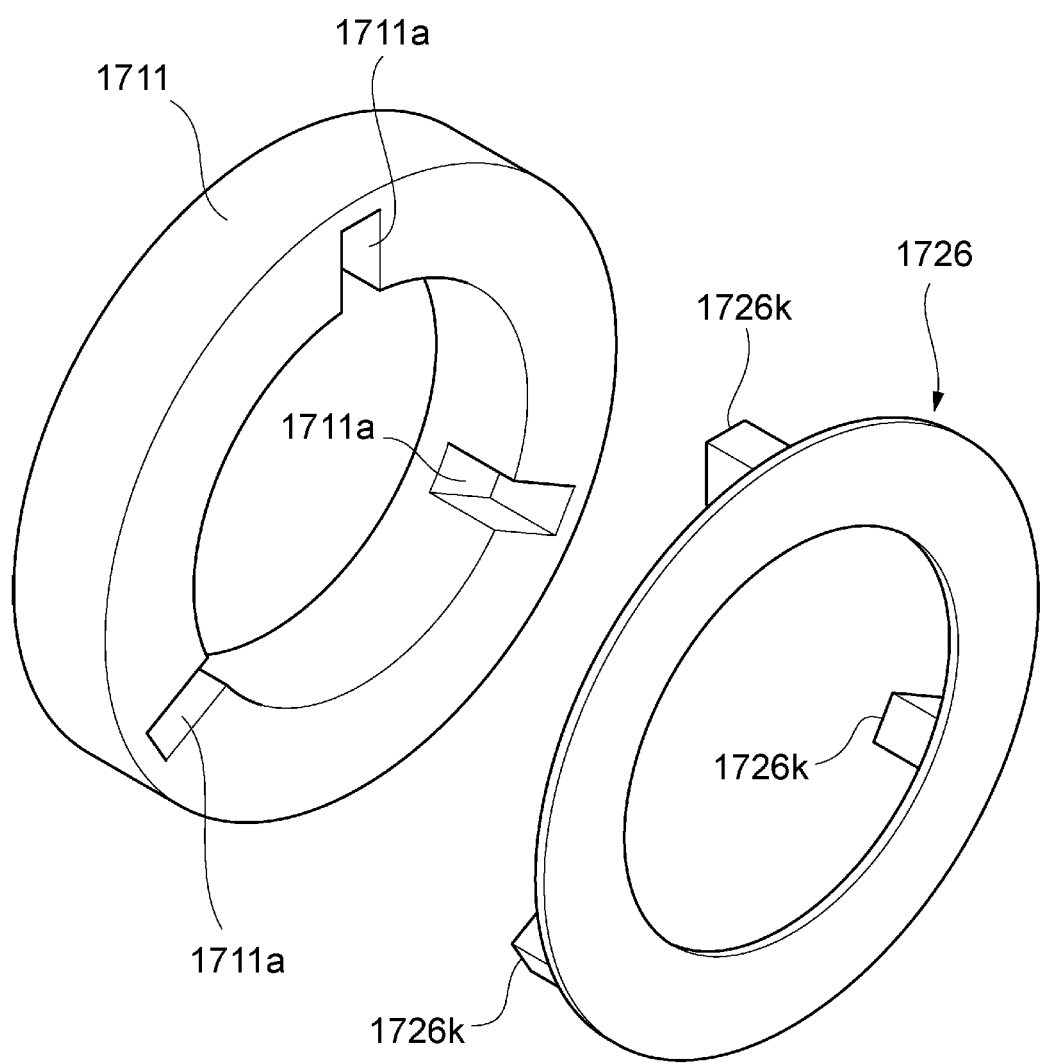
FIG. 36 is a perspective view of a main part illustrating a state of engagement between a resin raceway ring and a mating member according to the seventeenth configuration example.

FIG. 36 is a perspective view of a main part illustrating a state of engagement between the resin raceway ring 1726 and the mating member 1711 according to the seventeenth configuration example. Three prismatic projections 1726k protruding in the axial direction from the back surface side of the resin raceway ring 1726 (the side of the mating member 1711) are inserted into grooves 1711a formed at three positions corresponding to the mating member 1711.

The resin raceway ring 1726 is assembled to the mating member 1711 so as to be relatively non-rotatable when the prismatic projection 1726k is fitted and assembled to the groove 1713.

Eighteenth Configuration Example

A bearing device 1800 according to an eighteenth configuration example will be described below.

Figure 37:
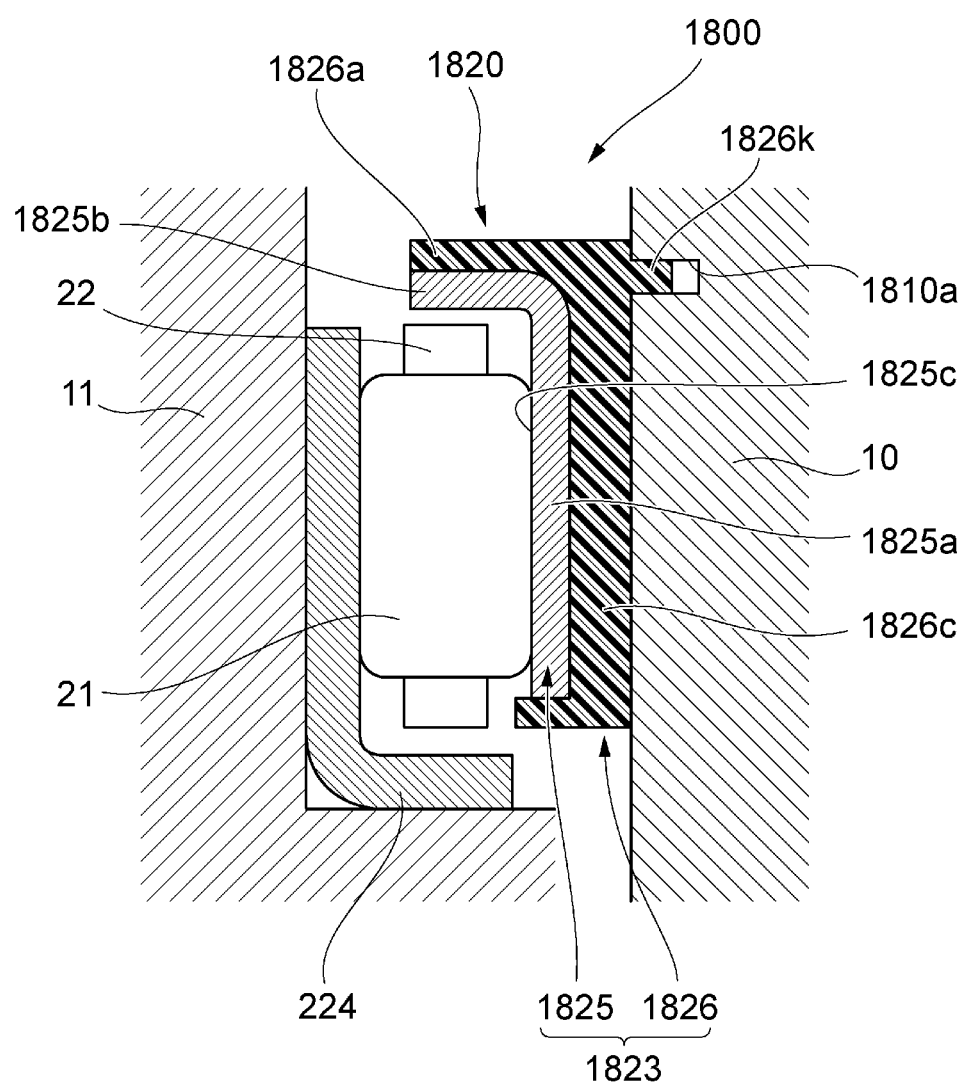
FIG. 37 is a cross-sectional view of a bearing device according to an eighteenth configuration example.

FIG. 37 is a cross-sectional view of the bearing device 1800 according to the eighteenth configuration example. The bearing device 1800 according to the eighteenth configuration example is similar to the bearing device 1700 according to the seventeenth configuration example except that the first raceway ring and the second raceway ring are switched on the contrary to the bearing device 1700 according to the seventeenth configuration example and assembled to a mating member 1810 so as to be relatively non-rotatable.

The bearing device 1800 includes mating members 1810 and 11 such as a housing and a rotating shaft that rotate relative to each other, and a thrust roller bearing 1820 that is mounted to be relatively rotatable while bearing a thrust load between the mating members 1810 and 11.

The thrust roller bearing 1820 includes a plurality of rollers 21 which is radially arranged, a retainer 22 having a pocket which is made in a circular ring shape as a whole and rollingly retains the plurality of rollers 21, and a first raceway ring 1823 and a second raceway ring 224 which hold the plurality of rollers 21 in an axial direction.

The first raceway ring 1823 is formed in which an iron raceway ring 1825 and a resin raceway ring 1826 are assembled integrally with each other. The iron raceway ring 1825 is formed by pressing a metal disk with a hole, and includes a circular ring-shaped annular plate portion 1825a provided with a raceway surface 1825c, on which the plurality of rollers 21 roll, and an outer cylindrical portion 1825b in which an outer peripheral edge of a metal disk is bent toward the raceway surface 1825c in the axial direction.

The resin raceway ring 1826 includes an annular plate portion 1826c, an outer cylindrical portion 1826a which is formed to extend from an outer peripheral edge of the annular plate portion 1826c toward the raceway surface 1825c in the axial direction and is externally fitted to the outer cylindrical portion 1825b of the iron raceway ring 1825 in a light interference fit manner, and three prismatic projections 1826k which are formed at equal intervals in the circumferential direction to protrude from an outer peripheral edge of the annular plate portion 1826c toward the opposite side of the raceway surface in the axial direction.

The mating member 1810 is formed with grooves 1810a at three positions corresponding to three prismatic projections 1826k protruding in the axial direction from the back surface side of the resin raceway ring 1826 (the side of the mating member 1810).

The resin raceway ring 1826 is assembled to the mating member 1810 so as to be relatively non-rotatable when the three prismatic projections 1826k is fitted and assembled to the grooves 1810a.

Nineteenth Configuration Example

A bearing device 190 according to a nineteenth configuration example will be described below.

Figure 38:
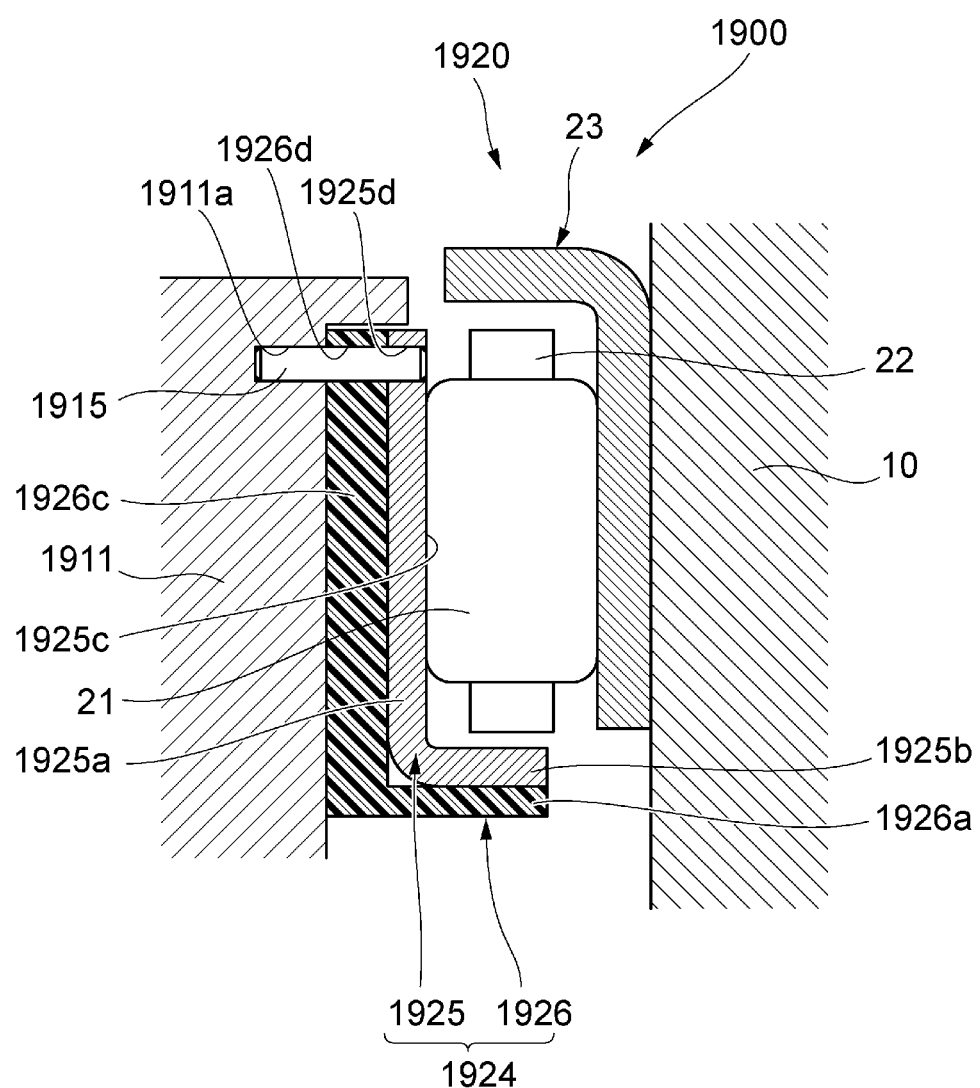
FIG. 38 is a cross-sectional view of a bearing device according to a nineteenth configuration example.
Figure 39:
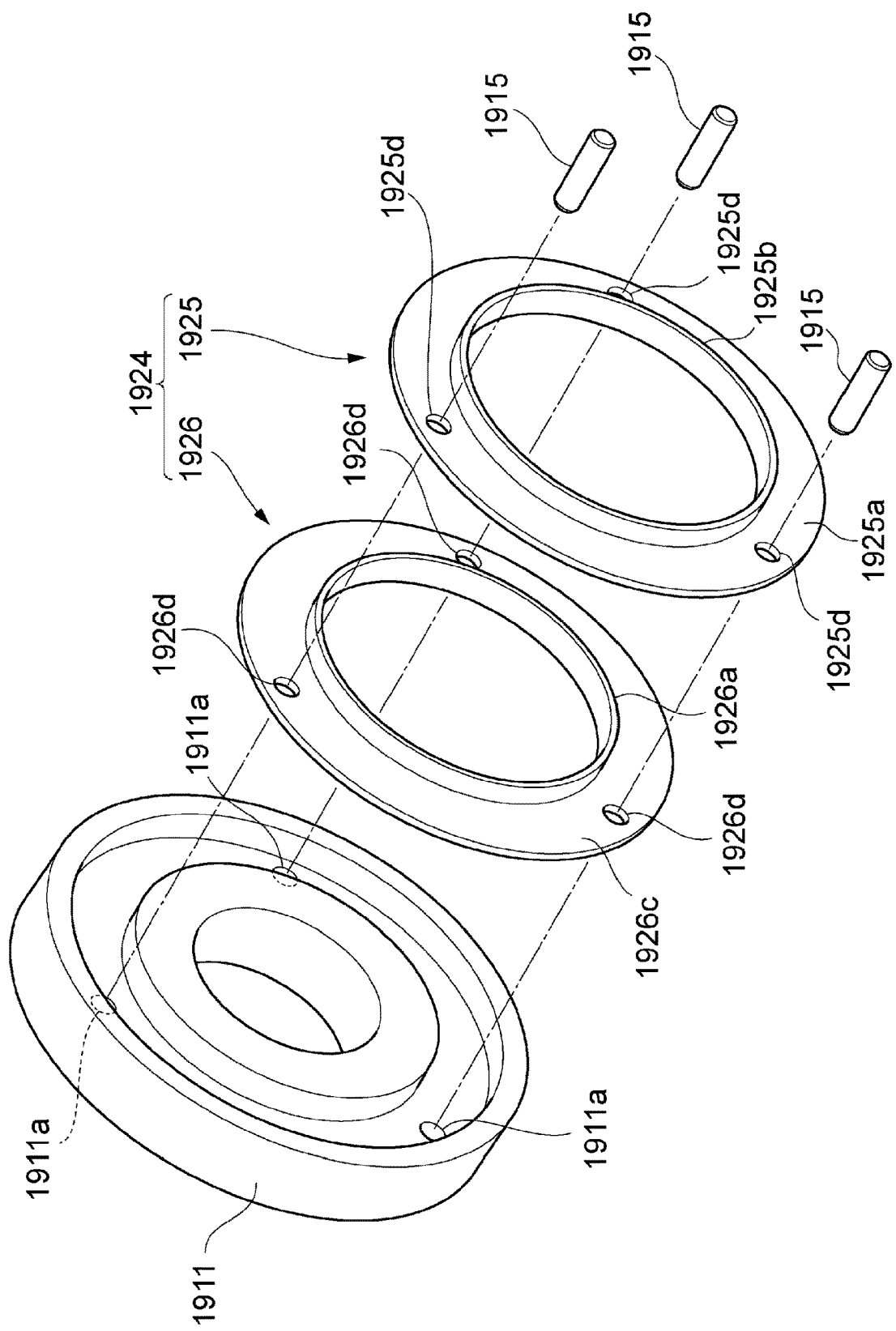
FIG. 39 is an exploded perspective view of a second raceway ring and a mating member.

FIG. 38 is a cross-sectional view of the bearing device 1900 according to the nineteenth configuration example, and FIG. 39 is an exploded perspective view of a second raceway ring 1924 and a mating member 1911.

The bearing device 1900 includes mating members 10 and 1911 such as a housing and a rotating shaft that rotate relative to each other, and a thrust roller bearing 1920 that is mounted to be relatively rotatable while bearing a thrust load between the mating members 10 and 1911.

The thrust roller bearing 1920 includes a plurality of rollers 21 which is radially arranged, a retainer 22 having a pocket which is made in a circular ring shape as a whole and rollingly retains the plurality of rollers 21, and a first raceway ring 23 and a second raceway ring 1924 which hold the plurality of rollers 21 in an axial direction.

The second raceway ring 1924 is formed in which an iron raceway ring 1925 and a resin raceway ring 1926 are assembled integrally with each other. The iron raceway ring 1925 is formed by pressing a metal disk with a hole, and includes a circular ring-shaped annular plate portion 1925a provided with a raceway surface 1925c, on which the plurality of rollers 21 roll, and an inner cylindrical portion 1925b in which an inner peripheral edge of a metal disk is bent toward the raceway surface 1925c in the axial direction.

The resin raceway ring 1926 includes an annular plate portion 1926c and an inner cylindrical portion 1926a which is formed to extend from an inner peripheral edge of the annular plate portion 1926c toward the raceway surface 1925c in the axial direction and is externally fitted to the inner cylindrical portion 1925b of the iron raceway ring 1925 in a light interference fit manner.

Through holes 1925d and 1926d are formed at equal intervals in the circumferential direction on outer peripheries of the iron raceway ring 1925 and the resin raceway ring 1926. Further, pin holes 1911a are formed in the mating member 1911 at three positions corresponding to the through holes 1925d and 1926d of the second raceway ring 1924.

After the through holes 1925d and 1926d of the second raceway ring 1924 are arranged in alignment with the pin holes 1911a of the mating member 1911, and fixing pins 1915 are inserted into the through holes 1925d and 1926d and the pin holes 1911a. Thus, the second raceway ring 1924 is assembled to the mating member 1911 so as to be relatively non-rotatable.

Twentieth Configuration Example

A bearing device 2000 according to a twentieth configuration example will be described below.

Figure 40:
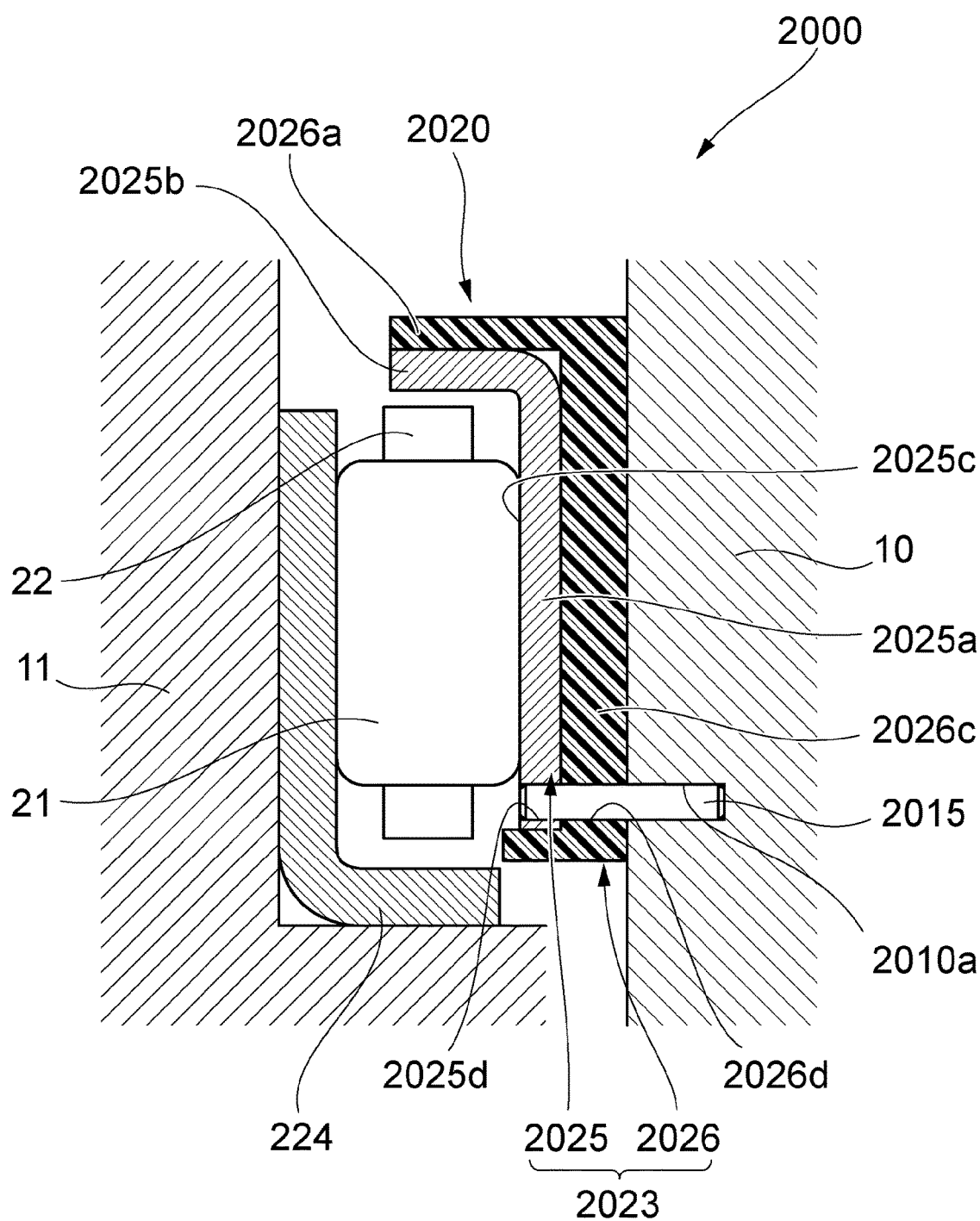
FIG. 40 is a cross-sectional view of a bearing device according to a twentieth configuration example.

FIG. 40 is a cross-sectional view of the bearing device 2000 according to the twentieth configuration example. The bearing device 2000 according to the twentieth configuration example is similar to the bearing device 1900 according to the nineteenth configuration example except that the first raceway ring and the second raceway ring are switched on the contrary to the bearing device 1900 according to the nineteenth configuration example and assembled to a mating member 2010 so as to be relatively non-rotatable.

The bearing device 2000 includes mating members 2010 and 11 such as a housing and a rotating shaft that rotate relative to each other, and a thrust roller bearing 2020 that is mounted to be relatively rotatable while bearing a thrust load between the mating members 2010 and 11.

The thrust roller bearing 2020 includes a plurality of rollers 21 which is radially arranged, a retainer 22 having a pocket which is made in a circular ring shape as a whole and rollingly retains the plurality of rollers 21, and a first raceway ring 2023 and a second raceway ring 224 which hold the plurality of rollers 21 in an axial direction.

The first raceway ring 2023 is formed in which an iron raceway ring 2025 and a resin raceway ring 2026 are assembled integrally with each other. The iron raceway ring 2025 is formed by pressing a metal disk with a hole, and includes a circular ring-shaped annular plate portion 2025a provided with a raceway surface 2025c, on which the plurality of rollers 21 roll, and an outer cylindrical portion 2025b in which an outer peripheral edge of a metal disk is bent toward the raceway surface 2025c in the axial direction.

The resin raceway ring 2026 includes an annular plate portion 2026c and an outer cylindrical portion 2026a which is formed to extend from an outer peripheral edge of the annular plate portion 2026c toward the raceway surface 2025c in the axial direction and is externally fitted to the outer cylindrical portion 2025b of the iron raceway ring 2025 in a light interference fit manner.

Through holes 2025d and 2026d are formed at equal intervals in the circumferential direction on inner peripheries of the iron raceway ring 2025 and the resin raceway ring 2026. Further, pin holes 2010a are formed in the mating member 2010 at three positions corresponding to the through holes 2025d and 2026d of the first raceway ring 2023.

After the through holes 2025d and 2026d of the first raceway ring 2023 are arranged in alignment with the pin holes 2010a of the mating member 2010, and fixing pins 2015 are inserted into the through holes 2025d and 2026d and the pin holes 2010a. Thus, the first raceway ring 2023 is assembled to the mating member 2010 so as to be relatively non-rotatable.

Twenty-First Configuration Example

A bearing device 2100 according to a twenty-first configuration example will be described below.

Figure 41:
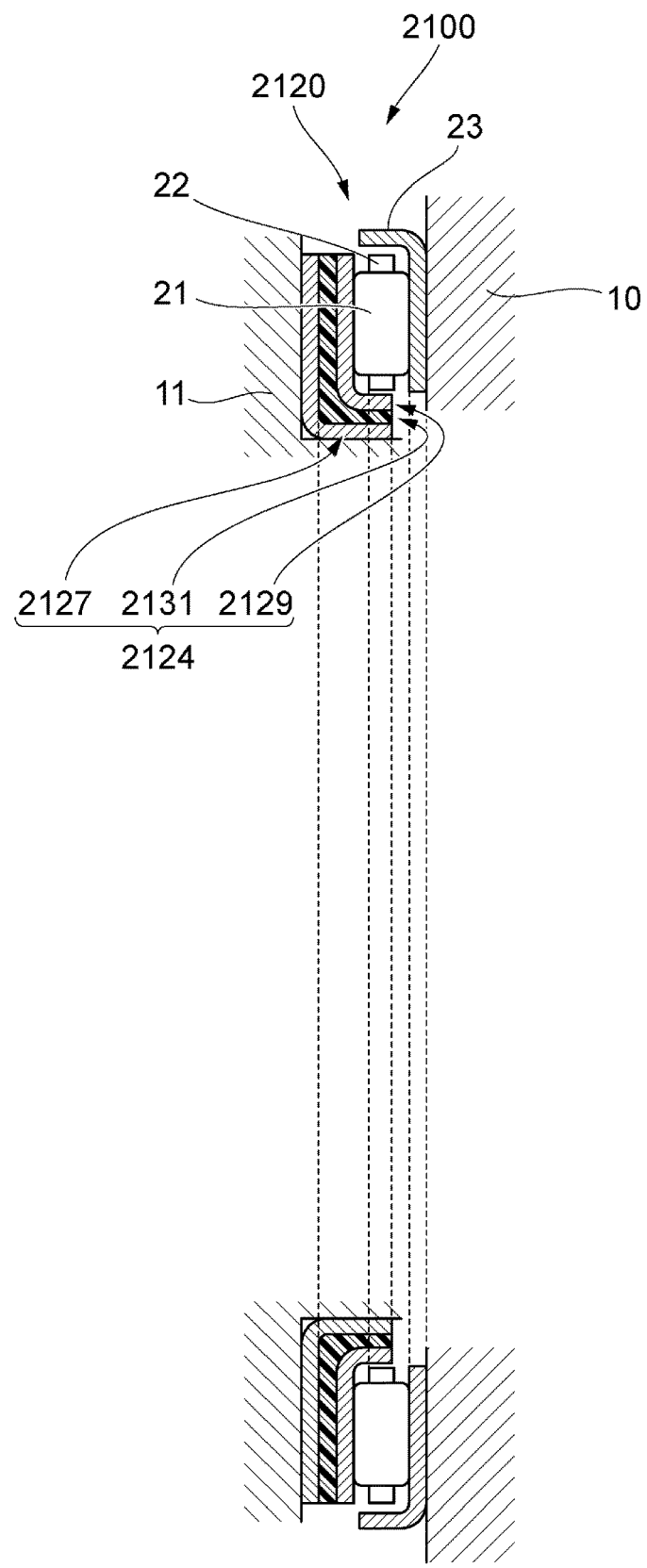
FIG. 41 is a cross-sectional view of a bearing device according to a twenty-first configuration example.

FIG. 41 is a cross-sectional view of the bearing device 2100 according to the twenty-first configuration example.

The bearing device 2100 includes mating members 10 and 11 such as a housing and a rotating shaft that rotate relative to each other, and a thrust roller bearing 2120 that is mounted to be relatively rotatable while bearing a thrust load between the mating members 10 and 11.

The thrust roller bearing 2020 includes a plurality of rollers 21 which is radially arranged, a retainer 22 having a pocket which is made in a circular ring shape as a whole and rollingly retains the plurality of rollers 21, and a first raceway ring 23 and a second raceway ring 2124 which hold the plurality of rollers 21 in an axial direction.

Figure 42:
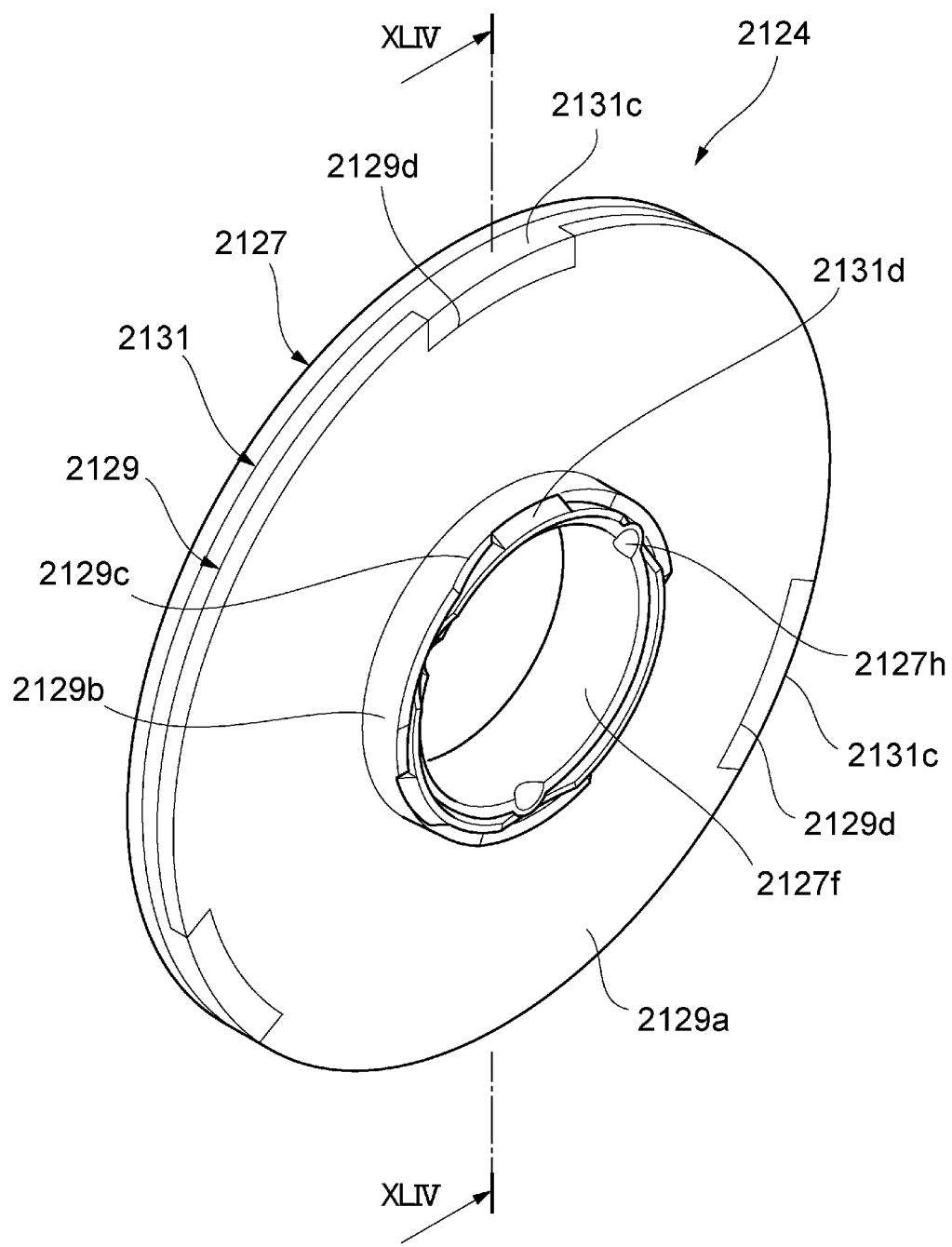
FIG. 42 is a perspective view of a second raceway ring of a thrust roller bearing according to the twenty-first configuration example as viewed from the back side.
Figure 43:
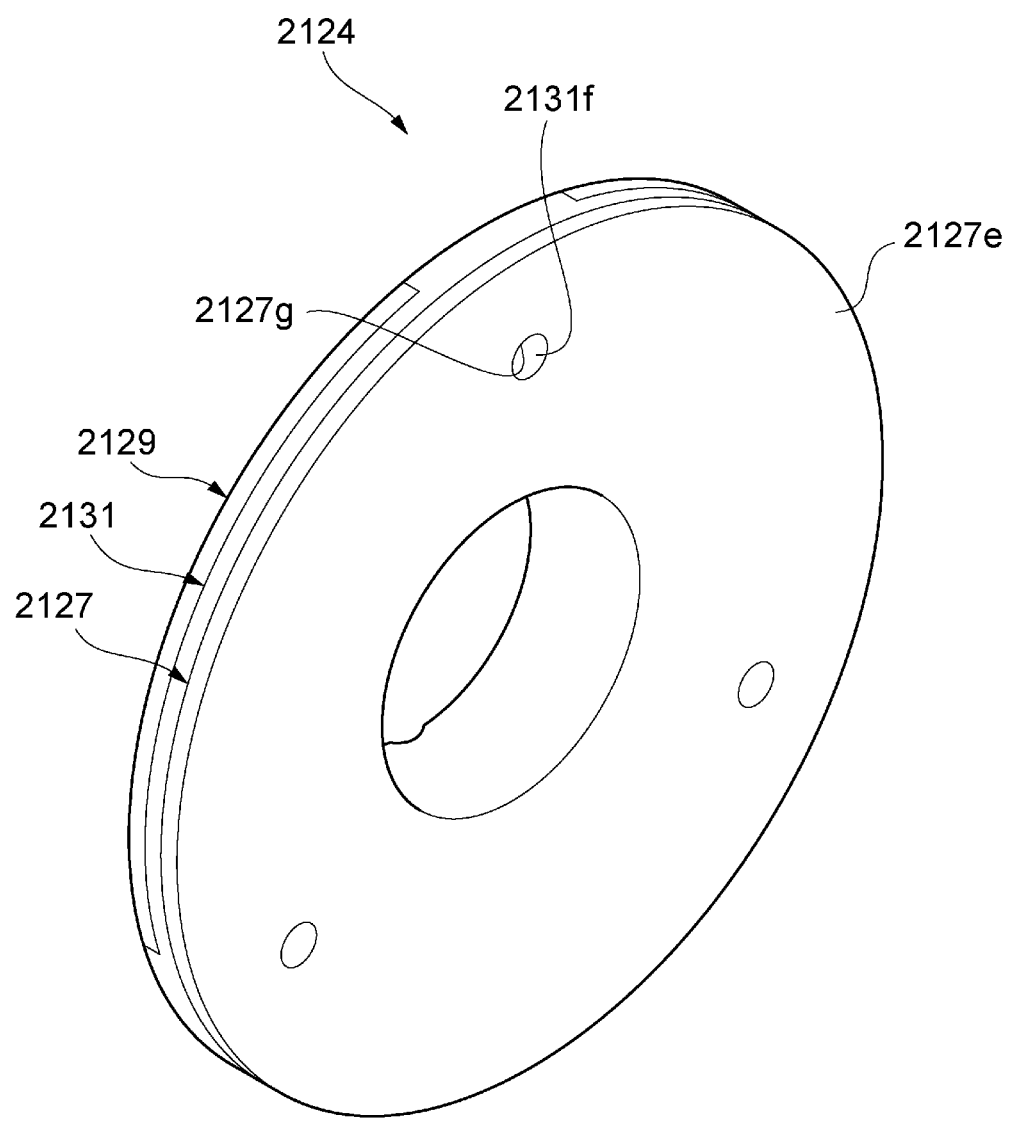
FIG. 43 is a perspective view of the second raceway ring illustrated in FIG. 42 as viewed from the front side.
Figure 44:
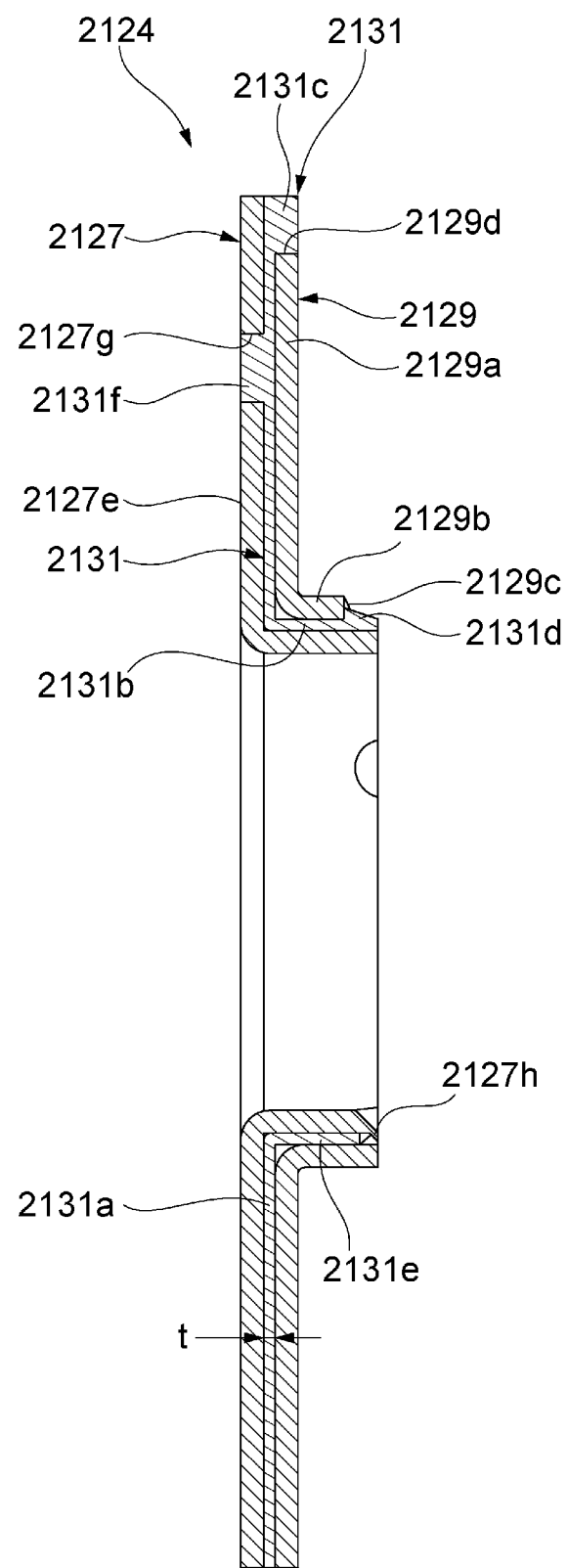
FIG. 44 is a cross-sectional view taken along line XLIV-XLIV illustrated in FIG. 42.
Figure 45:
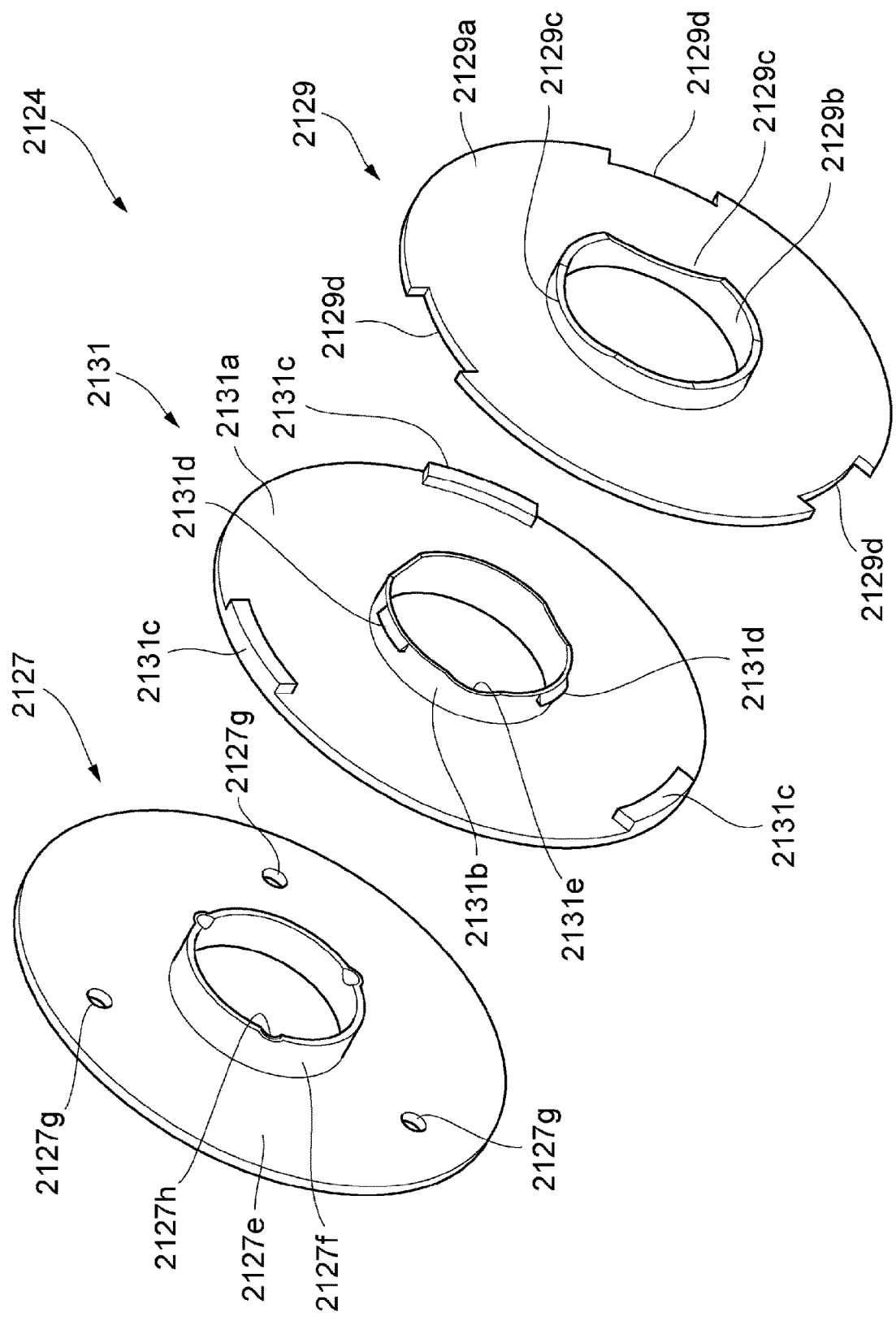
FIG. 45 is an exploded perspective view of the second raceway ring illustrated in FIG. 43.

FIG. 42 is a perspective view of the second raceway ring 2124 of the thrust roller bearing according to the twenty-first configuration example as viewed from the back side (the side of the first raceway ring), FIG. 43 is a perspective view of the second raceway ring 2124 illustrated in FIG. 42 as viewed from the front side (the side of the mating member 11), FIG. 44 is a cross-sectional view taken along line XLIV-XLIV illustrated in FIG. 42, and FIG. 45 is an exploded perspective view of the second raceway ring 2124 illustrated in FIG. 42.

The second raceway ring 2124 includes a first iron raceway ring 2129, a resin raceway ring 2131, and a second iron raceway ring 2127. The first iron raceway ring 2129 and the second iron raceway ring 2127 are disposed in a state of holding the resin raceway ring 2131 therebetween. That is, the iron raceway rings are disposed on the front and back surfaces of the resin raceway ring 2131, and the first iron raceway ring 2129, the second iron raceway ring 2127, and the resin raceway ring 2131 are integrally assembled.

The first iron raceway ring 2129 is formed by pressing a metal disk with a hole, and includes a circular ring-shaped annular plate portion 2129a provided with a raceway surface 2129c, on which the plurality of rollers 21 roll, and an inner cylindrical portion 2129b in which an inner peripheral edge of a metal disk is bent toward the raceway surface 2129c in the axial direction.

Arcuate cutouts 2129j are formed at three positions with equal intervals in the circumferential direction at a tip of the inner cylindrical portion 2129b. Further, three circumferential cutouts 2129d are formed at equal intervals in the circumferential direction on the outer peripheral edge of the annular plate portion 2129a.

Similarly to the first iron raceway ring 2129, the second iron raceway ring 2127 is formed by pressing a metal disk with a hole, and includes a circular ring-shaped annular plate portion 2127e and an inner cylindrical portion 2127f in which an inner peripheral edge of the annular plate portion 2127e is bent toward the raceway surface 2129c in the axial direction. Three locking holes 2127g are formed on the annular plate portion 2127e with equal intervals in the circumferential direction at positions in a radial direction that is radially outward of a region where the rollers are in contact with the raceway surface 2129c. Three projections (tabs) 2127h protruding outwards in the radial direction are formed at equal intervals in the circumferential direction at a tip in the axial direction of the inner cylindrical portion 2127f. The inner cylindrical portion 2127f has an outer diameter substantially equal to an inner diameter of an inner cylindrical portion 2131b of a resin raceway ring 2131 to be described below, is internally fitted to the inner cylindrical portion 2131b in an interference fit manner.

For the first iron raceway ring 2129 and the second iron raceway ring 2127 constituting the first raceway ring 2123 and the second raceway ring 2124, steel obtained by subjecting case-hardening steel such as an SCM material to carbonitriding treatment or steel obtained by quenching SK85 (JIS G 4401) or the like which is carbon tool steel can be used.

The resin raceway ring 2131 includes an inner cylindrical portion 2131b formed at the inner peripheral edge of the annular plate portion 2131a and is internally fitted to the inner cylindrical portion 2129b of the first iron raceway ring 2129 in an interference fit manner, and three locking claws 2131c protruding from the outer peripheral edge of the annular plate portion 2131a toward the first iron raceway ring 2129 in the axial direction and formed at equal intervals in the circumferential direction. Three locking projection 2131d protruding outwards in the radial direction are formed at equal intervals in the circumferential direction on the tip in the axial direction of the inner cylindrical portion 2131b.

In addition, three arcuate cutouts 2131e are formed at equal intervals in the circumferential direction at positions in the circumferential direction different from the locking projection 2131d, on the tip in the axial direction of the inner cylindrical portion 2131b.

Pins 2131f, which protrude in the axial direction corresponding to the locking hole 2127g of the second iron raceway ring 2127, are formed on the side of the second iron raceway ring 2127 of the resin raceway ring 2131.

Similarly to the resin raceway ring 26 (see FIG. 1) described above, the resin raceway ring 2131 is formed of a resin insulating material typified by PPS (polyphenylene sulfide) resin, 6-6 nylon, or 4-6 nylon. In addition, the resin raceway ring has a minimum plate thickness t of 0.1 mm or more in consideration of injection molding properties and insulating properties as described above. Although depending on the size of the thrust roller bearing 2120, the resin raceway ring 2131 has a maximum plate thickness t of 1 mm to 5 mm, and the plate thickness of the resin raceway ring 31 is set within this thickness.

In the second raceway ring 2124, while the locking claw 2131c of the resin raceway ring 2131 is engaged with the circumferential cutout 2129d of the first iron raceway ring 2129, the inner cylindrical portion 2131b of the resin raceway ring 2131 is internally fitted to the inner cylindrical portion 2129b of the first iron raceway ring 2129 in a light interference fit manner. For this reason, the three locking projections 2131d of the resin raceway ring 2131 are locked to the three arcuate cutouts 2129j formed in the inner cylindrical portion 2129b of the first iron raceway ring 2129, respectively, so that the movement in the rotation direction and the axial direction of the first iron raceway ring 2129 and the resin raceway ring 2131 is restricted, and both of them are integrally assembled.

In addition, while the pin 2131f of the resin raceway ring 2131 is engaged with the locking hole 2127g of the second iron raceway ring 2127, the inner cylindrical portion 2127f of the second iron raceway ring 2127 is inserted into the inner cylindrical portion 2131b of the resin raceway ring 2131. Thus, the projection 2127h of the second iron raceway ring 2127 is locked to the arcuate cutout 2131e of the resin raceway ring 2131, so that the movement in the rotation direction and the axial direction of the second iron raceway ring 2127 and the resin raceway ring 2131 is restricted, and both of them are integrally assembled.

The arcuate cutout 2129j and the locking projection 2131d, the circumferential cutout 2129d and the locking claw 2131c, the locking hole 2127g and the pin 2131f, and the projection 2127h and the arcuate cutout 2131e are engaged with each other at an arbitrary position other than the region where the rollers is in contact with the raceway surface.

Therefore, the first iron raceway ring 2129 and the second iron raceway ring 2127 are integrally assembled in a state of being disposed on the front and back surfaces of the resin raceway ring 2131 by holding the resin raceway ring 2131 therebetween. The first iron raceway ring 2129 and the second iron raceway ring 2127 are electrically insulated from each other by the resin raceway ring 2131.

The mating members 10 and 11 and the thrust roller bearing 2120 are electrically insulated from each other by the resin raceway ring 2131 of the second raceway ring 2124, so that electrolytic corrosion is prevented from occurring in the roller 21, the first raceway ring 2123 made of an iron, the first iron raceway ring 2129, and the second iron raceway ring 2127 is prevented. Further, the first iron raceway ring 2129, the second iron raceway ring 2127, and the resin raceway ring 2131 do not rotate relative to each other by integral assembling, and thus abrasion of the resin raceway ring 2131 is prevented.

As described above, according to the thrust roller bearing 2120 of the configuration example, the second raceway ring 2124 includes the resin raceway ring 2131 and the pair of iron raceway rings 2127 and 2129 disposed on the front and back surfaces of the resin raceway ring 2131, the pair of iron raceway rings 2127 and 2129 and the resin raceway ring 2131 are integrally formed to be engaged with each other, the rotation of the resin raceway ring 2131 relative to the pair of iron raceway rings 2127 and 2129 is suppressed, and thus abrasion of the resin raceway ring 2131 can be prevented. At the same time, the electrolytic corrosion can be prevented from occurring in the roller 21, the first raceway ring 2123, and the pair of iron raceway rings 2127 and 2129. In addition, since the pair of iron raceway rings 2127 and 2129 and the resin raceway ring 2131 are integrally formed, it is possible to easily handle just like the raceway ring according to the related art.

Twenty-Second Configuration Example

A bearing device 2200 according to a twenty-second configuration example will be described below.

Figure 46:
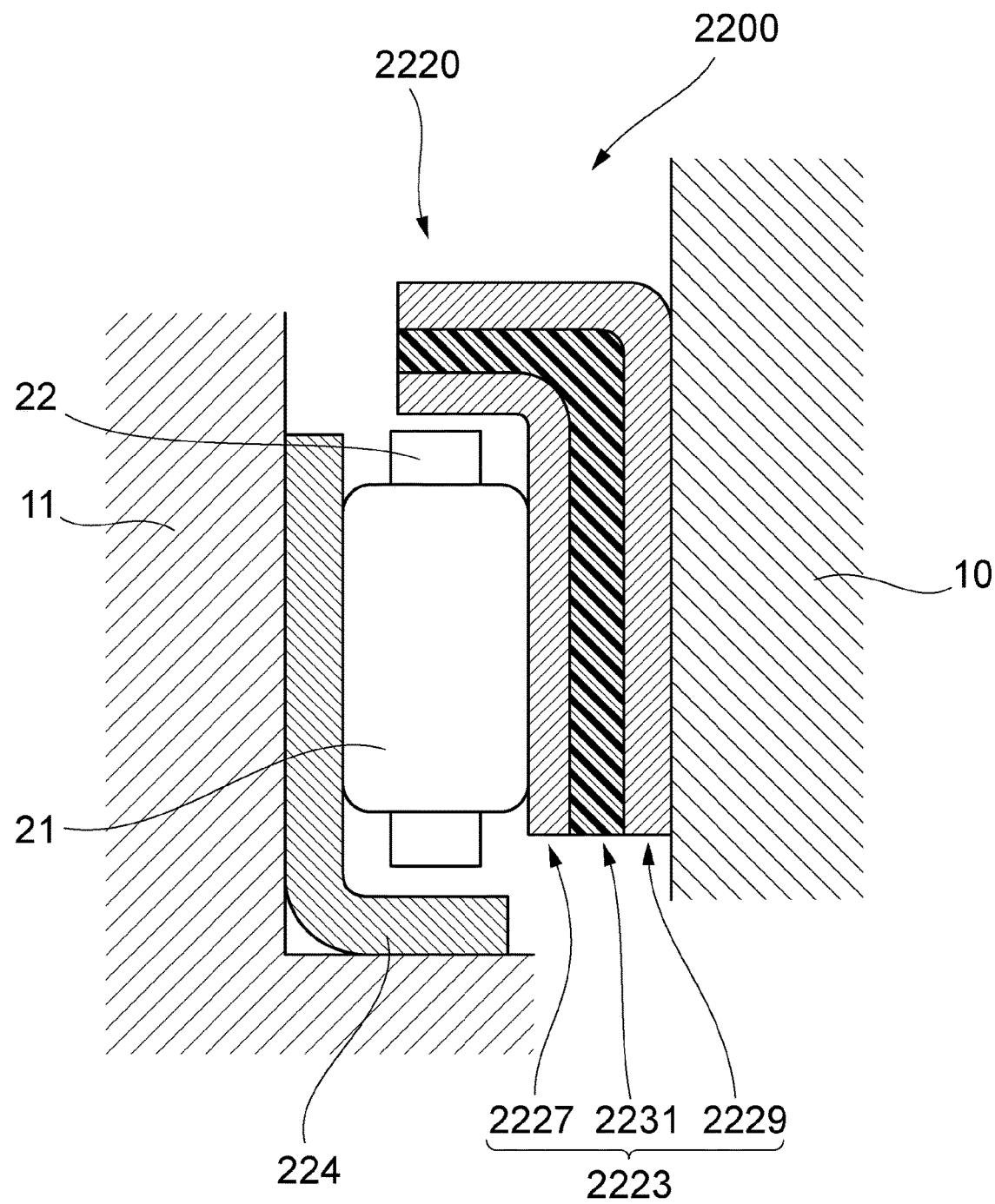
FIG. 46 is a cross-sectional view of a bearing device according to a twenty-second configuration example.

FIG. 46 is a cross-sectional view of the bearing device 2200 according to the twenty-second configuration example.

The bearing device 2200 includes mating members 10 and 11 such as a housing and a rotating shaft that rotate relative to each other, and a thrust roller bearing 2220 that is mounted to be relatively rotatable while bearing a thrust load between the mating members 10 and 11.

The thrust roller bearing 2220 includes a plurality of rollers 21 which is radially arranged, a retainer 22 having a pocket which is made in a circular ring shape as a whole and rollingly retains the plurality of rollers 21, and a first raceway ring 2223 and a second raceway ring 224 which hold the plurality of rollers 21 in an axial direction.

The first raceway ring 2223 includes a first iron raceway ring 2229, a resin raceway ring 2231, and a second iron raceway ring 2227. The first iron raceway ring 2229 and the second iron raceway ring 2227 are disposed in a state of holding the resin raceway ring 2231 therebetween. That is, the iron raceway rings are disposed on the front and back surfaces of the resin raceway ring 2231, and the first iron raceway ring 2229, the second iron raceway ring 2227, and the resin raceway ring 2231 are integrally assembled.

The specific configuration of the first iron raceway ring 2229, the resin raceway ring 2231, and the second iron raceway ring 2227 are similar to that in the twenty-first configuration example. With such a configuration, the same operational effects as those of the twenty-first configuration example are exhibited.

Twenty-Third Configuration Example

A bearing device 2300 according to a twenty-third will be described below. Similarly to the twenty-second configuration example, a first raceway ring or a second raceway ring may have a configuration in which a pair of iron raceway rings are provided on the front and back surfaces of the resin raceway ring or the resin raceway rings may be provided on both the first raceway ring and the second raceway ring.

Figure 47:
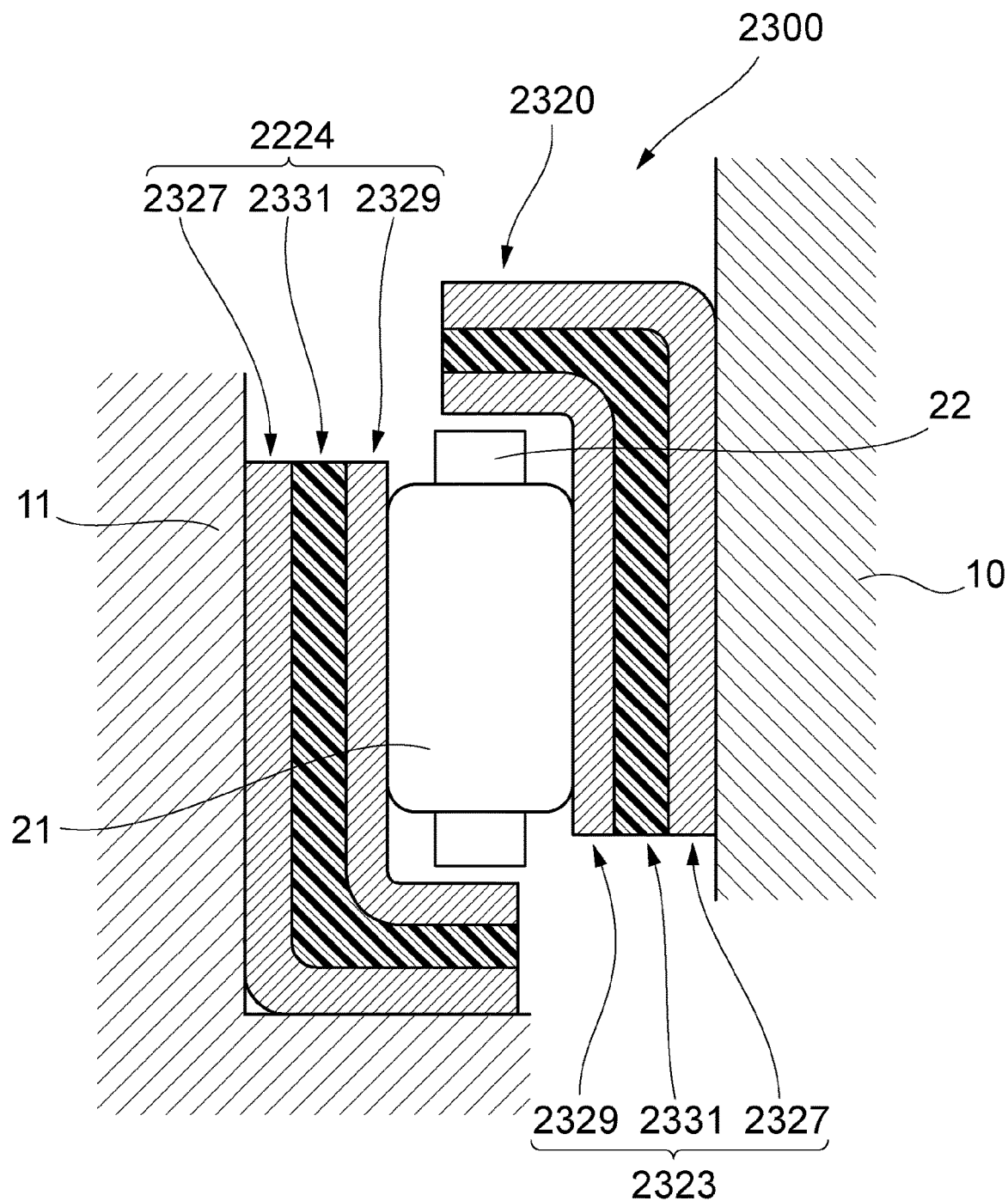
FIG. 47 is a cross-sectional view of a bearing device according to a twenty-third configuration example.

FIG. 47 is a cross-sectional view of a bearing device 2300 according to a twenty-third configuration example.

The bearing device 2300 includes mating members 10 and 11 such as a housing and a rotating shaft that rotate relative to each other, and a thrust roller bearing 2320 that is mounted to be relatively rotatable while bearing a thrust load between the mating members 10 and 11.

The thrust roller bearing 2320 includes a plurality of rollers 21 which is radially arranged, a retainer 22 having a pocket which is made in a circular ring shape as a whole and rollingly retains the plurality of rollers 21, and a first raceway ring 2323 and a second raceway ring 2324 which hold the plurality of rollers 21 in an axial direction.

The first raceway ring 2323 includes the first iron raceway ring 2229, the resin raceway ring 2231, and the second iron raceway ring 2227 according to the twenty-second configuration example described above. Further, the second raceway ring 2324 includes the first iron raceway ring 2129, the resin raceway ring 2131, and the second iron raceway ring 2127 according to the twenty-first configuration example described above.

According to such a configuration, it is possible to exhibit high insulating properties as compared with a configuration in which the resin raceway ring is provided in only one of the first raceway ring and the second raceway ring.

Twenty-Fourth Configuration Example

A bearing device according to a twenty-fourth configuration example will be described below. The bearing device according to this configuration example is similar to the bearing device 2100 according to the twenty-first configuration example except for a second raceway ring 2124.

Figure 48:
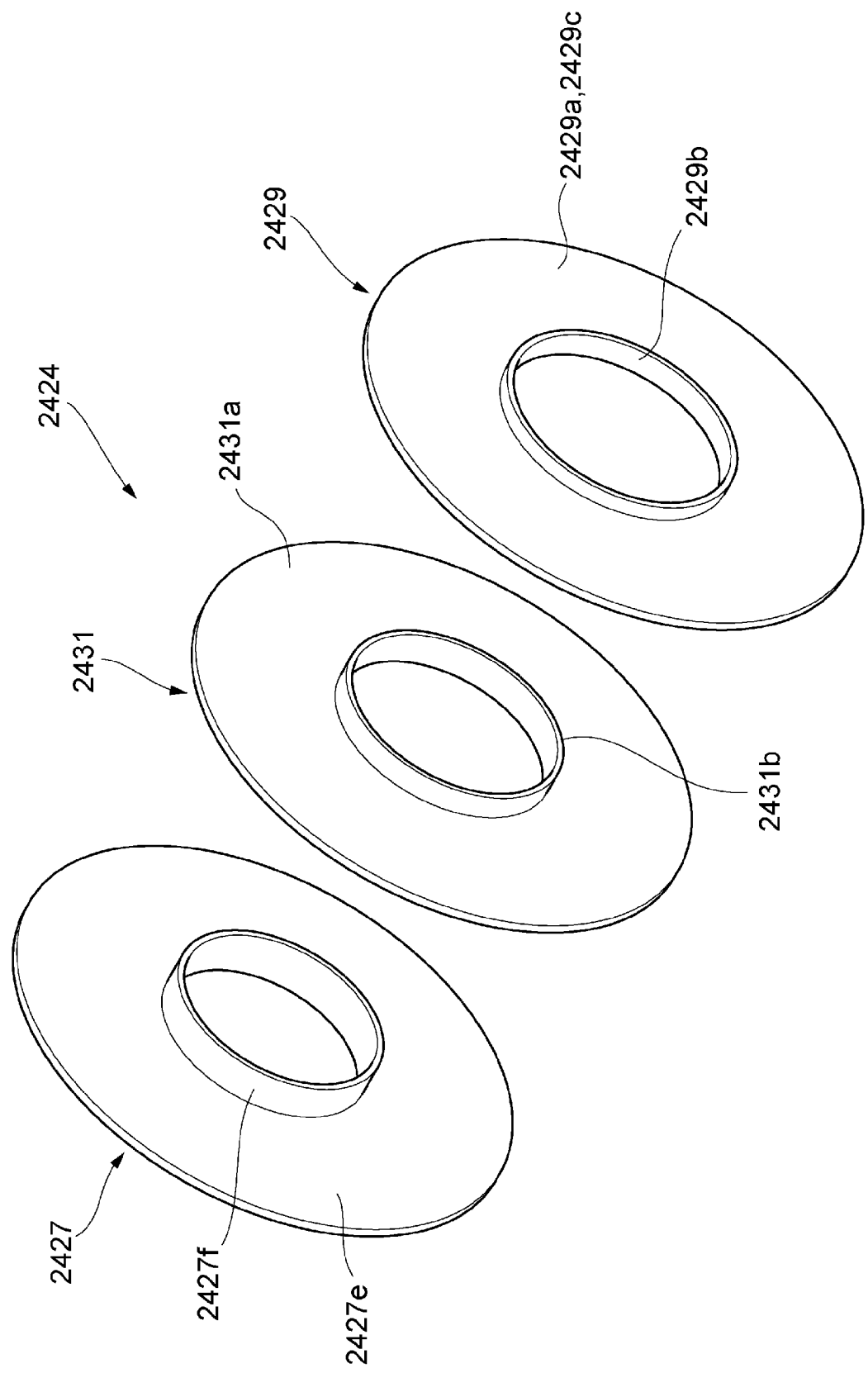
FIG. 48 is a fragmentary perspective view of a second raceway ring used in the bearing device according to a twenty-fourth configuration example.

FIG. 48 is a fragmentary perspective view of the second raceway ring 2424 used in the bearing device according to the twenty-fourth configuration example.

The second raceway ring 2424 according to this configuration example also includes a first iron raceway ring 2429, a second iron raceway ring 2427, and a resin raceway ring 2431 held between the first and second iron raceway rings 2429 and 2427, and these raceway rings are integrally assembled.

The first iron raceway ring 2429 is formed by pressing a metal disk with a hole, and includes a circular ring-shaped annular plate portion 2429a provided with a raceway surface 2429c, on which a plurality of rollers roll, and an inner cylindrical portion 2429b in which an inner peripheral edge of the annular plate portion 2429a is bent toward the raceway surface 2429c in the axial direction. Similarly to the first iron raceway ring 2429, the second iron raceway ring 2427 is formed by pressing a metal disk with a hole, and includes a circular ring-shaped annular plate portion 2427e and an inner cylindrical portion 2427f in which an inner peripheral edge of the annular plate portion 2427e is bent toward the raceway surface 2429c in the axial direction. The resin raceway ring 2431 includes an annular plate portion 2431a and an inner cylindrical portion 2431b formed on an inner peripheral edge of the annular plate portion 2431a.

The inner cylindrical portion 2431b of the resin raceway ring 2431 is internally fitted to the inner cylindrical portion 2429b of the first iron raceway ring 2429 in a light interference fit manner. Further, the inner cylindrical portion 2427f of the second iron raceway ring 2427 is internally fitted to the inner cylindrical portion 2431b in a light interference fit manner. Thus, the first iron raceway ring 2429, the second iron raceway ring 2427, and the resin raceway ring 2431 are integrally assembled by a fastening force due to the interference fit of the inner cylindrical portion 2429b, the inner cylindrical portion 2431b, and the inner cylindrical portion 2427f.

According to such a configuration, the first iron raceway ring 2429, the second iron raceway ring 2427, and the resin raceway ring 2431 are integrally assembled with a simple configuration. Other configurations and operations are the same as those of the thrust roller bearing 2120 according to the twenty-first configuration example.

Twenty-Fifth Configuration Example

A bearing device according to a twenty-fifth configuration example will be described below. The bearing device according to this configuration example is similar to the bearing device 2100 according to the twenty-first configuration example except for a second raceway ring 2124.

Figure 49:
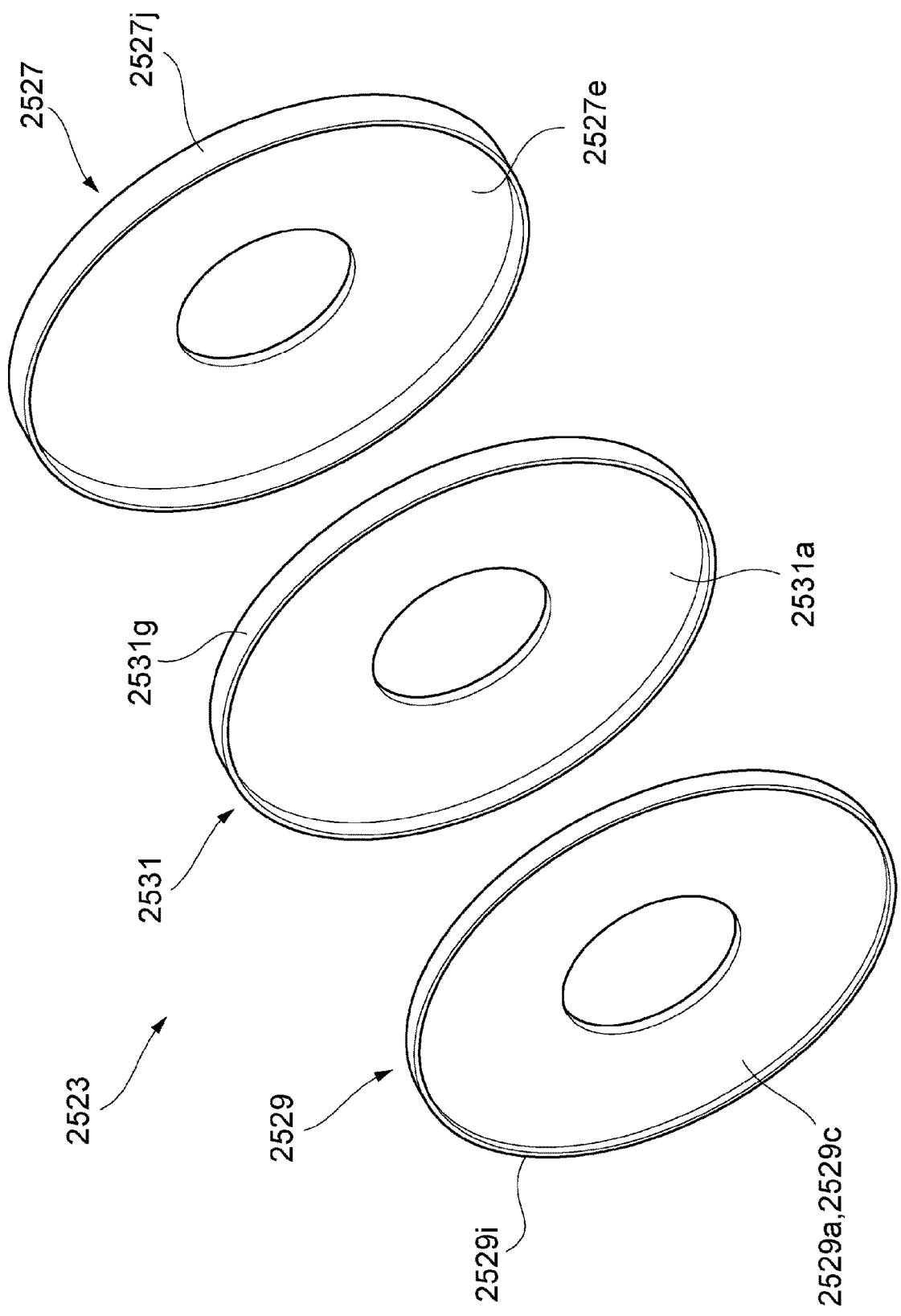
FIG. 49 is a fragmentary perspective view of a first raceway ring used in the bearing device according to a twenty-fifth configuration example.

FIG. 49 is a fragmentary perspective view of a first raceway ring 2523 used in the bearing device according to the twenty-fifth configuration example.

The first iron raceway ring 2529 is formed by pressing a metal disk with a hole, and includes a circular ring-shaped annular plate portion 2529a provided with a raceway surface 2529c, on which a plurality of rollers roll, and an outer cylindrical portion 2429i in which an outer peripheral edge of the annular plate portion 2529a is bent toward the raceway surface 2529c in the axial direction. The second iron raceway ring 2527 is formed by pressing a metal disk with a hole, and includes a circular ring-shaped annular plate portion 2527e and an outer cylindrical portion 2527j in which an outer peripheral edge of the annular plate portion 2527e is bent toward the raceway surface 2529c in the axial direction. The resin raceway ring 2531 includes an annular plate portion 2531a and an outer cylindrical portion 2531g formed on an outer peripheral edge of the annular plate portion 2531a.

An inner periphery of the outer cylindrical portion 2531g of the resin raceway ring 2531 is internally fitted to an outer periphery of the outer cylindrical portion 2529i of the first iron raceway ring 2529 in a light interference fit manner. Further, an outer periphery of the outer cylindrical portion 2531g is externally fitted to an inner periphery of the outer cylindrical portion 2527j of the second iron raceway ring 2527 in a light interference fit manner. Thus, the first iron raceway ring 2529, the second iron raceway ring 2527, and the resin raceway ring 2531 are integrally assembled by a fastening force due to the interference fit of the outer cylindrical portion 2579i, the outer cylindrical portion 2531g, and the outer cylindrical portion 2527j.

According to such a configuration, the first iron raceway ring 2529, the second iron raceway ring 2527, and the resin raceway ring 2531 are integrally assembled with a simple configuration. Other configurations and operations are the same as those of the thrust roller bearing 2120 according to the twenty-first configuration example.

The thrust roller bearing may be configured by a combination of the second raceway ring 2524 according to the twenty-fourth configuration example and the first raceway ring 2623 according to the twenty-fifth configuration example.

Twenty-Sixth Configuration Example

A bearing device according to a twenty-sixth configuration example will be described below. The bearing device according to this configuration example is similar to the bearing device 2100 according to the twenty-first configuration example except for the first raceway ring 2123.

Figure 50:
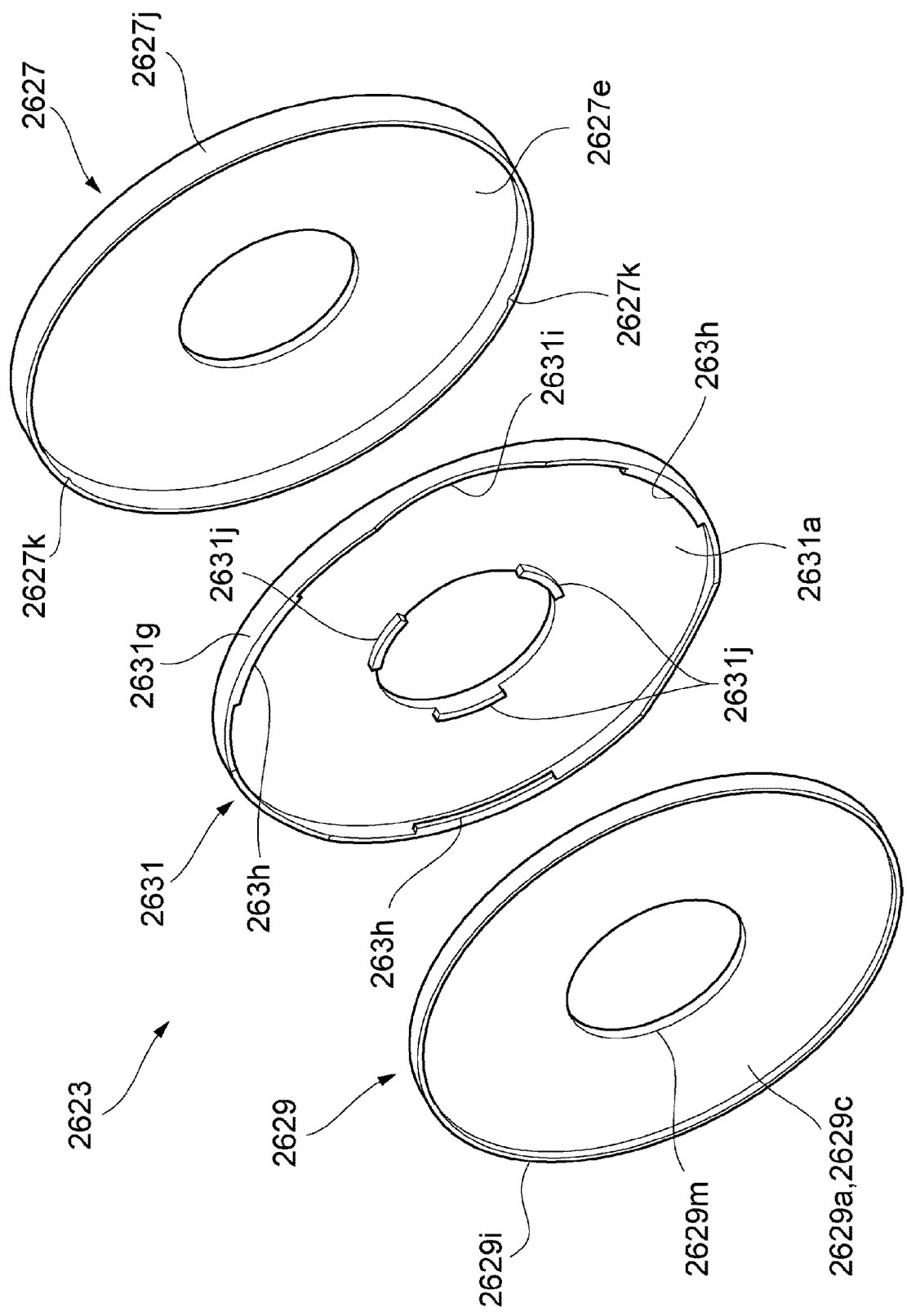
FIG. 50 is an exploded perspective view of a first raceway ring according to a twenty-sixth configuration example.
Figure 51:
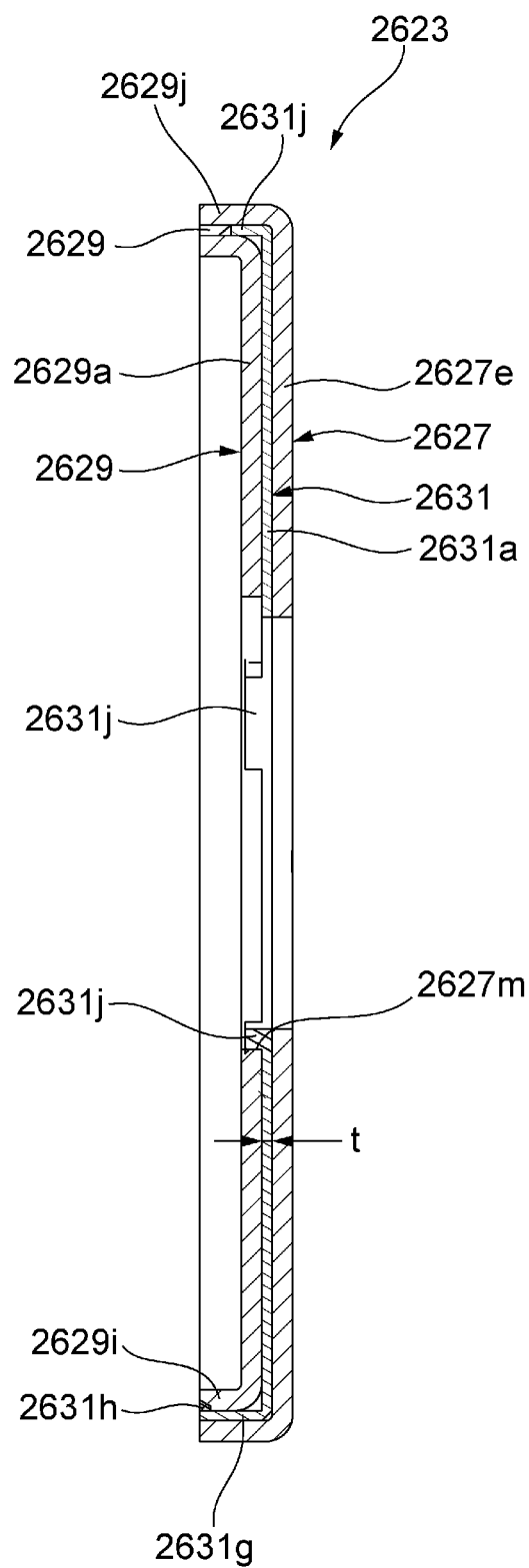
FIG. 51 is a cross-sectional view of the first raceway ring.

FIG. 50 is an exploded perspective view of a first raceway ring 2623 according to the twenty-sixth configuration example, and FIG. 51 is a cross-sectional view of the first raceway ring 2623. The first raceway ring 2623 according to this configuration example also includes a first iron raceway ring 2629, a second iron raceway ring 2627, and a resin raceway ring 2631 held between the first and second iron raceway rings 2629 and 2627, and these raceway rings are integrally assembled.

The first iron raceway ring 2629 is formed by pressing a metal disk with a hole, and includes a circular ring-shaped annular plate portion 2629a provided with a raceway surface 2629c, on which a plurality of rollers roll, and an outer cylindrical portion 2629i in which an outer peripheral edge of the annular plate portion 2629a is bent toward the raceway surface 2629c in the axial direction. The second iron raceway ring 2627 is formed by pressing a metal disk with a hole, and includes a circular ring-shaped annular plate portion 2627e and an outer cylindrical portion 2627j in which an outer peripheral edge of the annular plate portion 2627e is bent in the axial direction. Three locking projections 2627k are formed at equal intervals in the circumferential direction on an inner diameter side of a tip in the axial direction of the outer cylindrical portion 2627j.

The resin raceway ring 2631 includes an annular plate portion 2631a and an outer cylindrical portion 2631g formed on an outer peripheral edge of the annular plate portion 2631a. Three locking projection 2631h protruding inwards in the radial direction are formed at equal intervals in the circumferential direction on the tip in the axial direction of the outer cylindrical portion 2631g. In addition, three arcuate cutouts 2631i are formed at equal intervals in the circumferential direction at positions in the circumferential direction different from the locking projection 2631h, on the tip in the axial direction of the outer cylindrical portion 2631g. Further, three arcuate projections 2631j are formed at equal intervals in the circumferential direction along the inner peripheral edge of the resin raceway ring 2631.

The outer cylindrical portion 2631g of the resin raceway ring 2631 is externally fitted to the outer cylindrical portion 2629i of the first iron raceway ring 2629, so that the locking projection 2631h is engaged with an end in the axial direction of the outer cylindrical portion 2629i. At the same time, the three arcuate projections 2631j are press-fitted into an inner peripheral edge 2629m of the annular plate portion 2629a, and the resin raceway ring 2631 is assembled integrally with the first iron raceway ring 2629.

In addition, the outer cylindrical portion 2627j of the second iron raceway ring 2627 is externally fitted to the outer cylindrical portion 2631g of the resin raceway ring 2631, so that the locking projection 2627k of the second iron raceway ring 2627 is engaged with the arcuate cutout 2631i of the resin raceway ring 2631. Thus, the first iron raceway ring 2629 and the second iron raceway ring 2627 are disposed on the front and back surfaces of the resin raceway ring 2631 in a state of holding the resin raceway ring 2631 therebetween and are integrally assembled so as to be relatively non-movable.

Twenty-Seventh Configuration Example

A bearing device 2700 according to a twenty-seventh configuration example will be described below.

Figure 52:
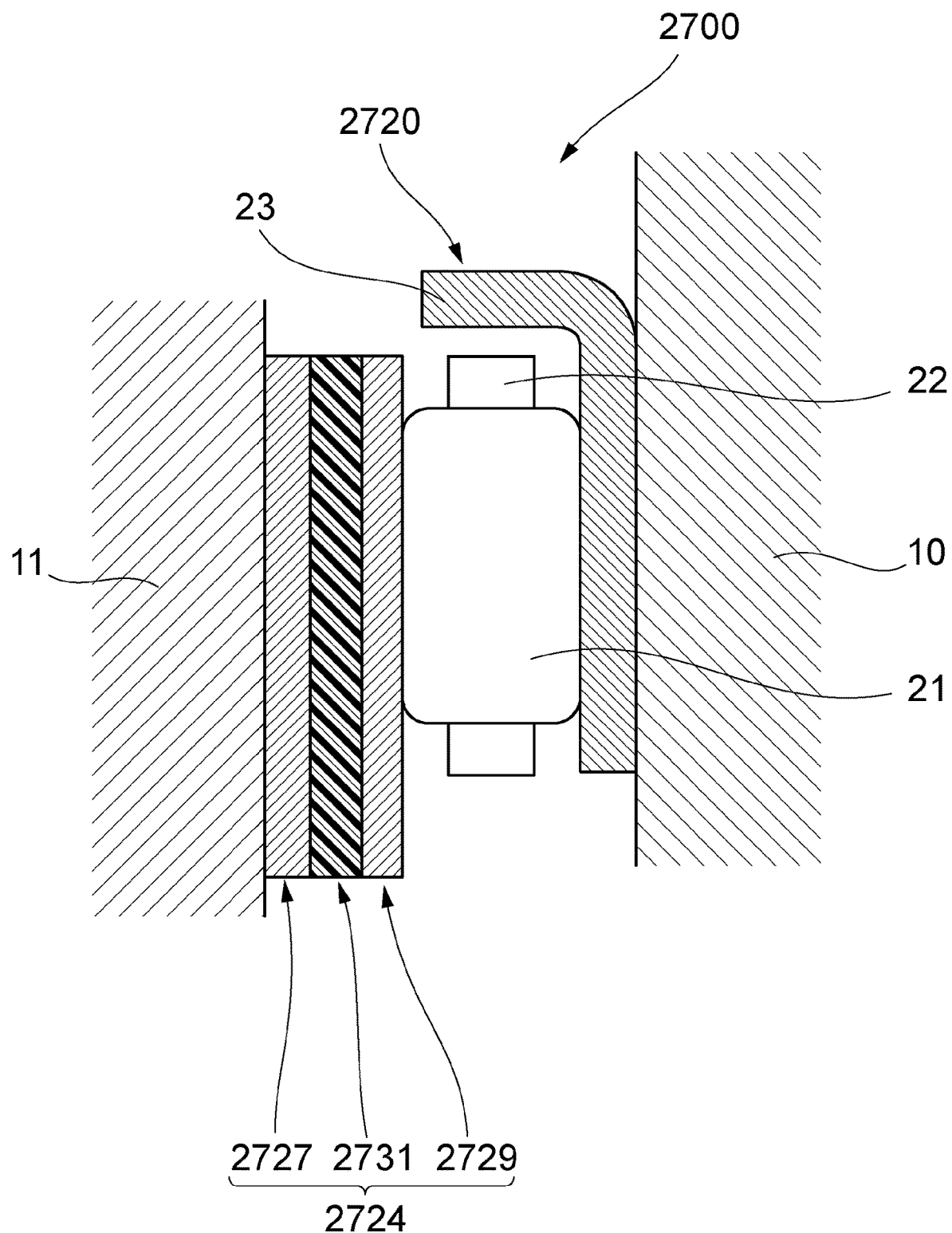
FIG. 52 is a cross-sectional view of a bearing device according to a twenty-seventh configuration example.

FIG. 52 is a cross-sectional view of the bearing device 2700 according to the twenty-seventh configuration example.

The bearing device 2700 includes mating members 10 and 11 such as a housing and a rotating shaft that rotate relative to each other, and a thrust roller bearing 2720 that is mounted to be relatively rotatable while bearing a thrust load between the mating members 10 and 11.

The thrust roller bearing 2720 includes a plurality of rollers 21 which is radially arranged, a retainer 22 having a pocket which is made in a circular ring shape as a whole and rollingly retains the plurality of rollers 21, and a first raceway ring 2723 and a second raceway ring 2724 which hold the plurality of rollers 21 in an axial direction.

The first raceway ring 2723 is formed by pressing a metal disk with a hole, and the bearing device 2700 of such a configuration is similar to the bearing device 2100 according to the twenty-first except for the first raceway ring 2123.

The second raceway ring 2724 includes a first iron raceway ring 2729, a resin raceway ring 2731, and a second iron raceway ring 2727. The first iron raceway ring 2729 and the second iron raceway ring 2727 are disposed in a state of holding the resin raceway ring 2731 therebetween. That is, the iron raceway rings are disposed on the front and back surfaces of the resin raceway ring 2731, and the first iron raceway ring 2729, the second iron raceway ring 2727, and the resin raceway ring 2731 are integrally assembled.

Figure 53:
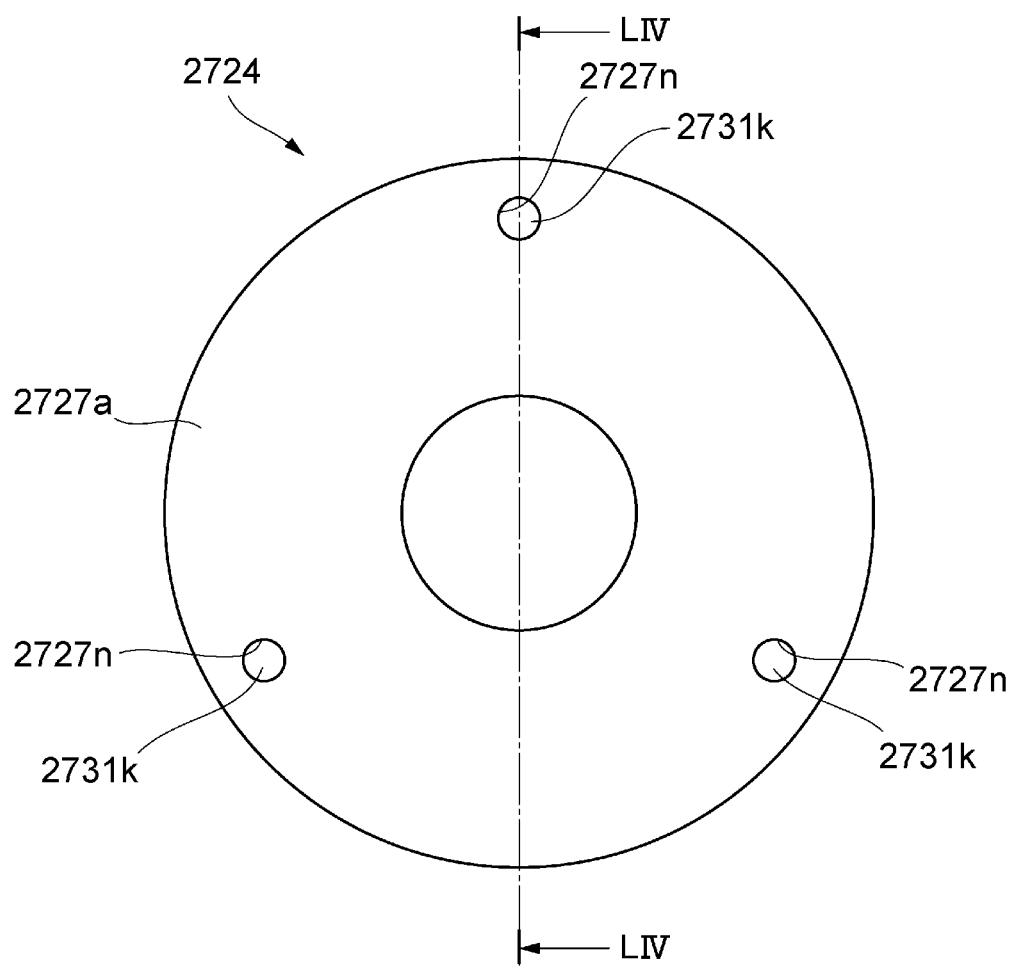
FIG. 53 is a front view of a second raceway ring according to the twenty-seventh configuration example.
Figure 54:
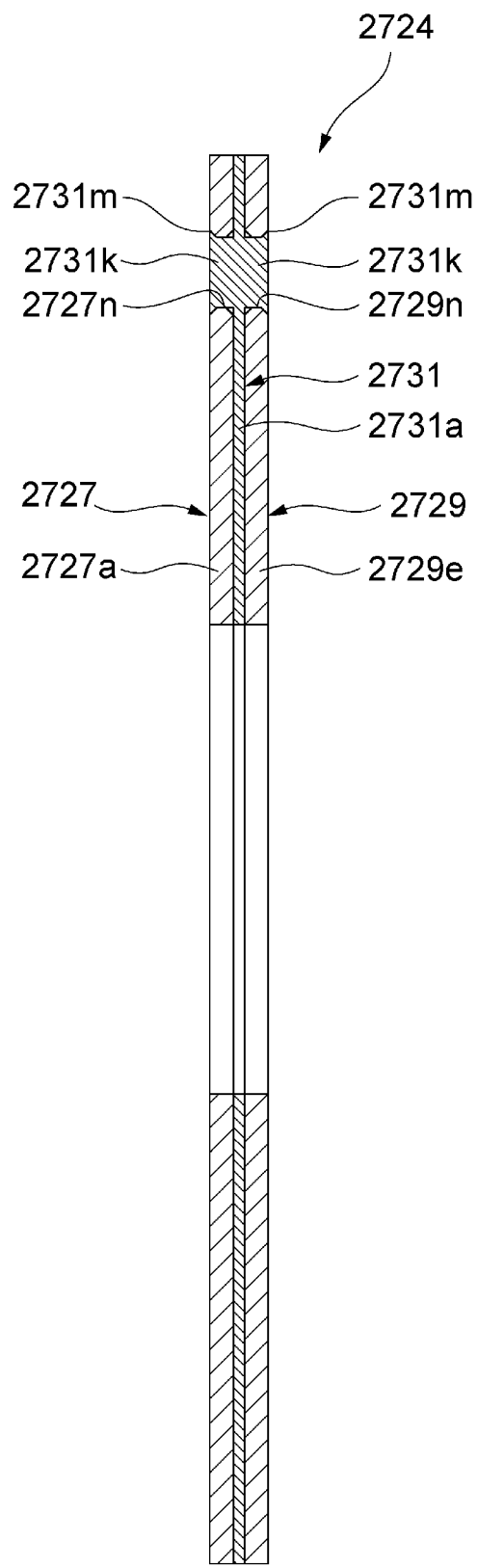
FIG. 54 is a cross-sectional view of the second raceway ring taken along line LIV-LIV illustrated in FIG. 53.

FIG. 53 is a front view of the second raceway ring 2724 according to the twenty-seventh configuration example, and FIG. 54 is a cross-sectional view of the second raceway ring 2724 illustrated in FIG. 53 taken along line LIV-LIV.

The first iron raceway ring 2729 and the second iron raceway ring 2727 include an annular plate portion 2727a and an annular plate portion 2729e formed in the same annular plate shape, and are respectively provided with locking holes 2727n and 2729n at outward positions (the same radial positions in the drawing) in the radial direction from the raceway surface 2729c on which the rollers 21 roll.

The resin raceway ring 2731 includes an annular plate portion 2731a formed in the same shape as the first iron raceway ring 2729 and the second iron raceway ring 2727. On the front and back surfaces of the annular plate portion 2731a, locking pins 2731k protruding toward both sides in the axial direction are formed corresponding to the locking holes 2727n and 2729n of the first and second iron raceway rings 2729 and 2727. Enlarged diameter portions 2731m are provided at tips of the locking pins 2731k, respectively.

The first iron raceway ring 2729 is assembled to one surface (right side surface in FIG. 54) of the resin raceway ring 2731 in a manner that the locking pin 2731k of the resin raceway ring 2731 is fitted into the locking hole 2729n. In addition, the second iron raceway ring 2727 is assembled to the other surface (left side surface in FIG. 54) of the resin raceway ring 2731 in a manner that the locking pin 2731k of the resin raceway ring 2731 is fitted into the locking hole 2727n. The enlarged diameter portions 2731m provided at the tips of the locking pins 2731k are locked to chamfered portions provided in the locking holes 2727n and 2729n to prevent disengagement, and the first and second iron raceway rings 2729 and 2727 and the resin raceway ring 2731 are integrally assembled.

Even in the configuration examples described above, the rotation of the resin raceway ring relative to iron raceway ring is suppressed, so that abrasion of the resin raceway ring can be prevented and electrolytic corrosion can be prevented from occurring in the roller and the iron raceway ring.

The invention is not limited to the above-described embodiments and the respective configurations of the embodiments can be combined with each other and can be changed and modified by one skilled in the art, based on the descriptions of the specification and the well-known technologies, which are also expected by the invention and included in the scope of the invention to be protected.

In each configuration example, the race-type thrust roller bearing disposed on both sides is exemplified, but a race-type thrust roller bearing may be used in which a first raceway ring including a resin raceway ring or a second raceway ring including a resin raceway ring is disposed on one side of the retainer on which rollers are arranged.

This application is based upon and claims the benefit of priority from Japanese Patent Application No. 2015-113534, filed Jun. 3, 2015 and No. 2015-113535, filed Jun. 3, 2015; the entire contents of which are incorporated herein by reference.

DESCRIPTION OF REFERENCE NUMERALS AND SIGNS 10, 11, 411, 610, 911, 1110, 1311, 1510, 1711, 1810, 1911: mating member
20, 220, 240, 320, 420, 520, 620, 720, 820, 920, 1020, 1120, 1220, 1320, 1420, 1520, 1620, 1720, 1820, 1920, 2020, 2120, 2220, 2320, 2720: thrust roller bearing
21: roller
22: retainer
223, 523, 623, 823, 1123, 1223, 1523, 1623, 1823, 2023, 2223, 2323, 2523, 2623: first raceway ring (raceway ring)
24, 324, 424, 724, 924, 1024, 1324, 1424, 1724, 1924, 2124, 2324, 2724: second2 raceway ring (raceway ring)
25, 225, 325, 525, 725, 825, 925, 1025, 1125, 1225, 1325, 1425, 1525, 1625, 1725, 1825, 1925, 2025: iron raceway ring
2127, 2227, 2327, 2627, 2727: second iron raceway ring (iron raceway ring)
2129, 2229, 2329, 2629, 2729: first iron raceway ring (iron raceway ring)
25a, 225a, 325a, 525a, 725a, 825a, 925a, 1025a, 1125a, 1225a, 1325a, 1425a, 1525a, 1625a, 1725a, 1825a, 1925a, 2025a, 2129a, 2429a, 2627a: annular plate portion
26, 226, 326, 426, 526, 626, 726, 826, 926, 1026, 1126, 1226, 1326, 1426, 1526, 1626, 1726, 1826, 1926, 2026, 2131, 2231, 2331, 2431, 2531, 2631, 2731: resin raceway ring
100, 200, 250, 300, 400, 500, 600, 700, 800, 900, 1000, 1100, 1200, 1300, 1400, 1500, 1600, 1700, 1800, 1900, 2000, 2100, 2200, 2300, 2700: bearing device
t: minimum plate thickness of resin raceway ring

The invention claimed is:

1. A thrust roller bearing comprising:
a plurality of rollers which are radially arranged;
a retainer having a pocket which is formed in a circular ring shape as a whole and rollingly retains the plurality of rollers; and
at least one raceway ring which is provided with a race surface on which the plurality of rollers roll, wherein
the raceway ring includes an iron raceway ring and a resin raceway ring having electrically insulating properties, and the iron raceway ring and the resin raceway ring are integrally assembled by being engaged with each other,
the iron raceway ring is formed of a metal disk with a hole and includes a circular ring-shaped annular plate portion provided with the race surface,
the annular plate portion is formed with a circumferential cutout in the circumferential direction on a first peripheral edge of the annular plate portion of the iron raceway ring,
the resin raceway ring includes: an annular plate portion made by resin and a locking claw protruding from a first peripheral edge of the annular plate portion made by resin toward the race surface,
the locking claw of the resin raceway ring is locked with the circumferential cutout of the iron raceway ring,
the iron raceway ring includes an iron cylindrical portion formed by bending a second peripheral edge which is different from the first peripheral edge where the circumferential cutout is formed,
the resin raceway ring includes a resin cylindrical portion extending from a second peripheral edge different from the first peripheral edge where the locking claw is formed toward the raceway surface,
the iron cylindrical portion of the iron raceway ring and the resin cylindrical portion of the resin raceway ring are fitted in an interference fit manner, and
the iron raceway ring and the resin raceway ring do not rotate relative to each other by integral assembling.

2. A bearing device in which a raceway ring of a thrust roller bearing according to claim 1 is engaged with a mating member so as not to rotate relative to the mating member,
the resin raceway ring includes a locking projection protruding from the second peripheral edge of the annular plate portion made by resin toward an opposite side of the iron raceway ring from the locking claw, the locking projection being engaged with the mating member.

3. A thrust roller bearing comprising:
a plurality of rollers which are radially arranged;
a retainer having a pocket which is formed in a circular ring shape as a whole and rollingly retains the plurality of rollers; and
at least one raceway ring which is provided with a race surface on which the plurality of rollers roll, wherein
the raceway ring includes a resin raceway ring having electrically insulating properties and a pair of iron raceway rings disposed on both front and back surfaces of the resin raceway ring, and the pair of iron raceway rings and the resin raceway ring are integrally assembled by being engaged with each other,
the pair of iron raceway rings includes a first iron raceway ring and a second iron raceway ring,
the first iron raceway ring is formed of a metal disk with a hole and includes a circular ring-shaped annular plate portion provided with the race surface,
the annular plate portion is formed with a circumferential cutout in the circumferential direction on a peripheral edge of the annular plate portion,
the resin raceway ring includes: an annular plate portion made by resin and a locking claw protruding from a peripheral edge of the annular plate portion made by resin toward the race surface, and
the locking claw of the resin raceway ring is locked with the circumferential cutout of the first iron raceway ring.

4. A bearing device in which a raceway ring of a thrust roller bearing according to claim 3 is engaged with a mating member so as not to rotate relative to the mating member.

5. A raceway ring for a thrust roller bearing provided with a raceway surface on which a plurality of rollers radially held in a retainer roll, wherein
the raceway ring includes an iron raceway ring and a resin raceway ring having electrically insulating properties, and the iron raceway ring and the resin raceway ring are integrally assembled by being engaged with each other,
the iron raceway ring is formed of a metal disk with a hole and includes a circular ring-shaped annular plate portion provided with the race surface, the annular plate portion is formed with a circumferential cutout in the circumferential direction on a first peripheral edge of the annular plate portion of the iron raceway ring, the resin raceway ring includes: an annular plate portion made by resin and a locking claw protruding from a first peripheral edge of the annular plate portion made by resin toward the race surface, the locking claw of the resin raceway ring is locked with the circumferential cutout of the iron raceway ring, the iron raceway ring includes an iron cylindrical portion formed by bending a second peripheral edge which is different from the first peripheral edge where the circumferential cutout is formed, the resin raceway ring includes an iron cylindrical portion extending from a second peripheral edge which is different from the first peripheral edge where the locking claw is formed toward the raceway surface, the iron cylindrical portion of the iron raceway ring and the resin cylindrical portion of the resin raceway ring are fitted in an interference fit manner, and the iron raceway ring and the resin raceway ring do not rotate relative to each other by integral assembling.

6. A raceway ring for a thrust roller bearing provided with a raceway surface on which a plurality of rollers radially held in a retainer roll, wherein the raceway ring includes a resin raceway ring having electrically insulating properties and a pair of iron raceway rings disposed on both front and back surfaces of the resin raceway ring, and the pair of iron raceway rings and the resin raceway ring are integrally assembled by being engaged with each other, the pair of iron raceway rings includes a first iron raceway ring and a second iron raceway ring, the first iron raceway ring is formed of a metal disk with a hole and includes a circular ring-shaped annular plate portion provided with the race surface, the annular plate portion is formed with a circumferential cutout in the circumferential direction on a peripheral edge of the annular plate portion, the resin raceway ring includes: an annular plate portion made by resin and a locking claw protruding from a peripheral edge of the annular plate portion made by resin toward the race surface, and the locking claw of the resin raceway ring is locked with the circumferential cutout of the first iron raceway ring.

* * * * *